US007461040B1

(12) United States Patent
Goldman et al.

(10) Patent No.: US 7,461,040 B1
(45) Date of Patent: Dec. 2, 2008

(54) STRATEGIC METHOD FOR PROCESS CONTROL

(75) Inventors: Arnold J. Goldman, Jerusalem (IL); Joseph Fisher, Jerusalem (IL); Jehuda Hartman, Rehovot (IL); Shlomo Sarel, Ma'Aleh Michmash (IL)

(73) Assignee: Insyst Ltd., Jerusalem (IL)

( * ) Notice: Subject to any disclaimer, the term of this patent is extended or adjusted under 35 U.S.C. 154(b) by 1732 days.

(21) Appl. No.: 09/633,824

(22) Filed: Aug. 7, 2000

Related U.S. Application Data

(63) Continuation-in-part of application No. 09/588,681, filed on Jun. 7, 2000.

(30) Foreign Application Priority Data

Oct. 31, 1999 (IL) ..................................... 132663

(51) Int. Cl.
*G06N 5/00* (2006.01)

(52) U.S. Cl. .......................... 706/45; 704/275; 715/727

(58) Field of Classification Search .................... 706/45; 701/41; 700/37; 318/800; 704/275; 715/727
See application file for complete search history.

(56) References Cited

U.S. PATENT DOCUMENTS

| | | | | | |
|---|---|---|---|---|---|
| 4,926,105 | A | * | 5/1990 | Mischenko et al. | 318/800 |
| 4,970,658 | A | | 11/1990 | Durbin et al. | |
| 5,325,466 | A | | 6/1994 | Kornacker | |
| 5,394,322 | A | * | 2/1995 | Hansen | 700/37 |
| 5,440,478 | A | | 8/1995 | Fisher et al. | |
| 5,479,340 | A | | 12/1995 | Fox et al. | |
| 5,483,468 | A | | 1/1996 | Chen et al. | |

(Continued)

FOREIGN PATENT DOCUMENTS

| | | |
|---|---|---|
| WO | WO 00/00874 | 1/2000 |

OTHER PUBLICATIONS

Constructivist Foundations of Modeling—A Kantian Perspective, Marco C. Bettoni, Internat. Journal of Intelligent Systems, vol. 12, No. 8, Aug. 1998, pp. 577-595.

(Continued)

*Primary Examiner*—Wilbert L Starks, Jr.

(57) ABSTRACT

A strategic method for process control wherein the method includes, for a predetermined process juncture, the steps of: (A) defining an interconnection cell having associated therewith (i) at least one set of input data or at least one set of process control parameters, and (ii) at least one set of output data; (B) assigning at least one boundary value to at least one set of the sets associated with the defined interconnection cell; (C) using the assigned at least one boundary value, forming a plurality of discrete respective set combinations, and (D) for the interconnection cell, processing data from the plurality of respective formed set combinations into respective corresponding data record clusters.

The strategic method for process control is a continuation-in-part of a Knowledge-Engineering Protocol-Suite, (U.S. patent application Ser. No. 09/588,681 filed on 7 Jun. 2000) incorporated herein by reference, that generally includes methods and systems, apparatus for search-space organizational validation, and appurtenances for use therewith. The protocol-suite includes a search-space organizational validation method for synergistically combining knowledge bases of disparate resolution data-sets, such as by actual or simulated integrating of lower resolution expert-experience based model-like templates to higher resolution empirical data-capture dense quantitative search-spaces. The protocol-suite includes facile algorithmic tools for use with the method.

73 Claims, 21 Drawing Sheets

U.S. PATENT DOCUMENTS

| | | | |
|---|---|---|---|
| 5,546,507 A | | 8/1996 | Staub |
| 5,787,425 A | | 7/1998 | Bigus |
| 5,828,971 A | * | 10/1998 | Diekhans et al. .............. 701/41 |
| 5,862,054 A | | 1/1999 | Li |
| 5,875,285 A | | 2/1999 | Chang |
| 6,032,146 A | | 2/2000 | Chadha et al. |
| 6,073,138 A | | 6/2000 | de l'Etraz et al. |
| 6,134,555 A | | 10/2000 | Chadha et al. |
| 6,240,329 B1 | | 5/2001 | Sun |
| 6,249,712 B1 | | 6/2001 | Boiquaye |
| 6,263,255 B1 | | 7/2001 | Tan et al. |

OTHER PUBLICATIONS

Knights Technology, Inc. at-a-Glance, http://www.knights.com/ktglance.htm, [18-pages].

Work in Progress: Visual Specification of Knowledge Bases, Gavrilova, et al http://www.csa.ru/Inst/gorb_dep/artific/IA/ben-last.htm [8-pages].

Object Space Solutions for a Connected World, http://www.ObjectsSpace.com/products/prodCatalyst.asp [11-pages].

Adventa Corporate Overview, http://www.adventact.com/corporat.htm [28 pages].

Domain Manufacturing, http://www.domainmfg.com/mfg/starfire/industry-specific-auto.htm [10 pages].

HPL Corporate http://www.hpl.com/Corporate/history.htm [6 pages].

SEMY Engineering Home Page http://www.semy.com [9 pages].

KLA-Tencor: Leading the Yield Management Market http://www.tencor.com [15 pages].

Yield Dynamics, Inc. http://www.ydyn.com/products/yield.htm [9 pages].

Triant Our Products http://www.triant.com/top.html [10 pages].

Artificial Intelligence and Manufacturing: A Research Planning Report, Leslie D. Interrante Aug. 8, 1997, http://sigmans.cs.umn.edu/sigmanwrk/report96.htm [34 pages].

On the Epistemology and Management of Electronic Design Automation Knowledge, Scott et al, http://www.azstarnet.com/_scottmc/medak/Epistermology.htm [17 pages].

Army Medical Knowledge Engineering System (AMKES)—A Three-Tier Knowledge Harvesting Environment, Merritt et al, Practical Applications of Java 1999 Conference Proceedings, http://amzi.harvard.net/articles/amkes_pajava99.htm [7 pages].

Final Model Business Case Report in the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbus1.htm [77 pages].

Computer Aided Knowledge Engineering, British Steel, Mackenzie, http://www.cogsys.co.uk/cake/CAKE-TestSite-BD.htm [12 pages].

Peters, Paul, "Open Solutions: A Strategic Approach", www.iac.honeywell.com/journal/feb97.

"About Industrial-Strength Networks", www.iac.honeywell.com/services Jun. 13, 2000.

"R & D in Manufacturing Technology", www.gintic.gov.sg Jun. 13, 2000.

Loos, Peter, "Production Management—Linking Business Applications to Process Control", World Batch Forum, Proc. Newtown Square, PA, May 22-24, 1995, pp. 2.1-2.16.

* cited by examiner

| Items or Batches | Measured Inputs from Previous Stage | | | | Outputs | | | | Control Parameters | | | | Monitored Parameters | | | |
|---|---|---|---|---|---|---|---|---|---|---|---|---|---|---|---|---|
| | $I_1$ | $I_2$ | ..... | $I_a$ | $O_1$ | $O_2$ | ..... | $O_b$ | $CP_1$ | $CP_2$ | ..... | $CP_c$ | $MP_1$ | $MP_2$ | ..... | $MP_d$ |
| 1 | | | | | | | | | | | | | | | | |
| 2 | | | | | | | | | | | | | | | | |
| 3 | | | | | | | | | | | | | | | | |
| ... | | | | | | | | | | | | | | | | |
| e | | | | | | | | | | | | | | | | |

→ A (306, from $O_2$ column)
→ B (307, from $CP_c$ column)

700

721
702
701
703
Stage 1
717
718
705
722
704
706
Stage 2
708
723
724
709
707
719
Stage 3a
711
712
713
710
720
Stage 3b
725
715
726
714
716
Stage 4
727

900

4000

4003
4002
4004
x1
y1
4001
10a.1
4005
x
4006
A1
C1
4008
B1
4007
4009
10a.2
x2
4011
4010
4012
A2
B2
4013
4015
4016
4017
4018
x3
y3
z3
4014
10a.3
4019
A3
25%
B3
50%
C3
75%
D3
4022
4020
4021

| Process Runs | Input | | | Output |
|---|---|---|---|---|
| | Constant | Variables | | |
| | 10a.1 | 10a.2 | 10a.3 | |
| | 5003 | 5004 | 5005 | |
| 1 | | | | |
| 2 | $B_1$ | $A_2$ | $D_3$ | $O_2$ — 5011 |
| 3 | | | | |
| ... | | | | |
| $e$ | $B_1$ | $A_2$ | $D_3$ | $O_e$ — 5012 |
| $e+1$ | $B_1$ | $A_2$ | $D_3$ | $O_{e+1}$ — 5013 |
| ... | | | | |
| $f$ | $B_1$ | $A_2$ | $D_3$ | $O_f$ — 5014 |
| ... | | | | |

| Data Vector 7001 | | | Output Constant O₁ Data 7002 | | |
|---|---|---|---|---|---|
| Constant | Variables | | Avg. | Stand Dev. | Pop. |
| 10a.1 | 10a.2 | 10a.3 | | | |
| $A_1$ | $A_2$ | $C_3$ | $\overline{O}_1$ | $\sigma(O_1)$ | 7 |
| $B_1$ | $A_2$ | $D_3$ | $\overline{O}_1$ | $\sigma(O_1)$ | 4 |
| $C_1$ | $A_2$ | $A_3$ | $\overline{O}_1$ | $\sigma(O_1)$ | 7 |
| $C_1$ | $A_2$ | $B_3$ | $\overline{O}_1$ | $\sigma(O_1)$ | 6 |
| $C_1$ | $A_2$ | $C_3$ | $\overline{O}_1$ | $\sigma(O_1)$ | 6 |
| $C_1$ | $A_2$ | $D_3$ | $\overline{O}_1$ | $\sigma(O_1)$ | 5 |
| $C_1$ | $B_2$ | $C_3$ | $\overline{O}_1$ | $\sigma(O_1)$ | 5 |

Figure 12

| Data Vector 8001 | | | Output Constant $O_1$ Data 8002 | | Output Constant $O_2$ Data 8003 | | |
|---|---|---|---|---|---|---|---|
| Constant 10a.1 | Variables 10a.2 | 10a.3 8006 | Avg. 8007 | Stand. Dev. 8008 | Pop. 8009 | Avg. 8010 | Stand. Dev 8011 | Pop. 8012 |

| Constant | Variables | | Avg. | Stand. Dev. | Pop. | Avg. | Stand. Dev | Pop. |
|---|---|---|---|---|---|---|---|---|
| $A_1$ | $A_2$ | $C_3$ | $\overline{O}_1$ | $\sigma(O_1)$ | 7 | $\overline{O}_2$ | $\sigma(O_2)$ | 7 |
| $B_1$ | $A_2$ | $D_3$ | $\overline{O}_1$ | $\sigma(O_1)$ | 4 | $\overline{O}_2$ | $\sigma(O_2)$ | 4 |
| $C_1$ | $A_2$ | $A_3$ | $\overline{O}_1$ | $\sigma(O_1)$ | 7 | $\overline{O}_2$ | $\sigma(O_2)$ | 7 |
| $C_1$ | $A_2$ | $B_3$ | $\overline{O}_1$ | $\sigma(O_1)$ | 6 | $\overline{O}_2$ | $\sigma(O_2)$ | 6 |
| $C_1$ | $A_2$ | $C_3$ | $\overline{O}_1$ | $\sigma(O_1)$ | 6 | $\overline{O}_2$ | $\sigma(O_2)$ | 6 |
| $C_1$ | $A_2$ | $D_3$ | $\overline{O}_1$ | $\sigma(O_1)$ | 5 | $\overline{O}_2$ | $\sigma(O_2)$ | 5 |
| $C_1$ | $B_2$ | $C_3$ | $\overline{O}_1$ | $\sigma(O_1)$ | 5 | $\overline{O}_2$ | $\sigma(O_2)$ | 5 |

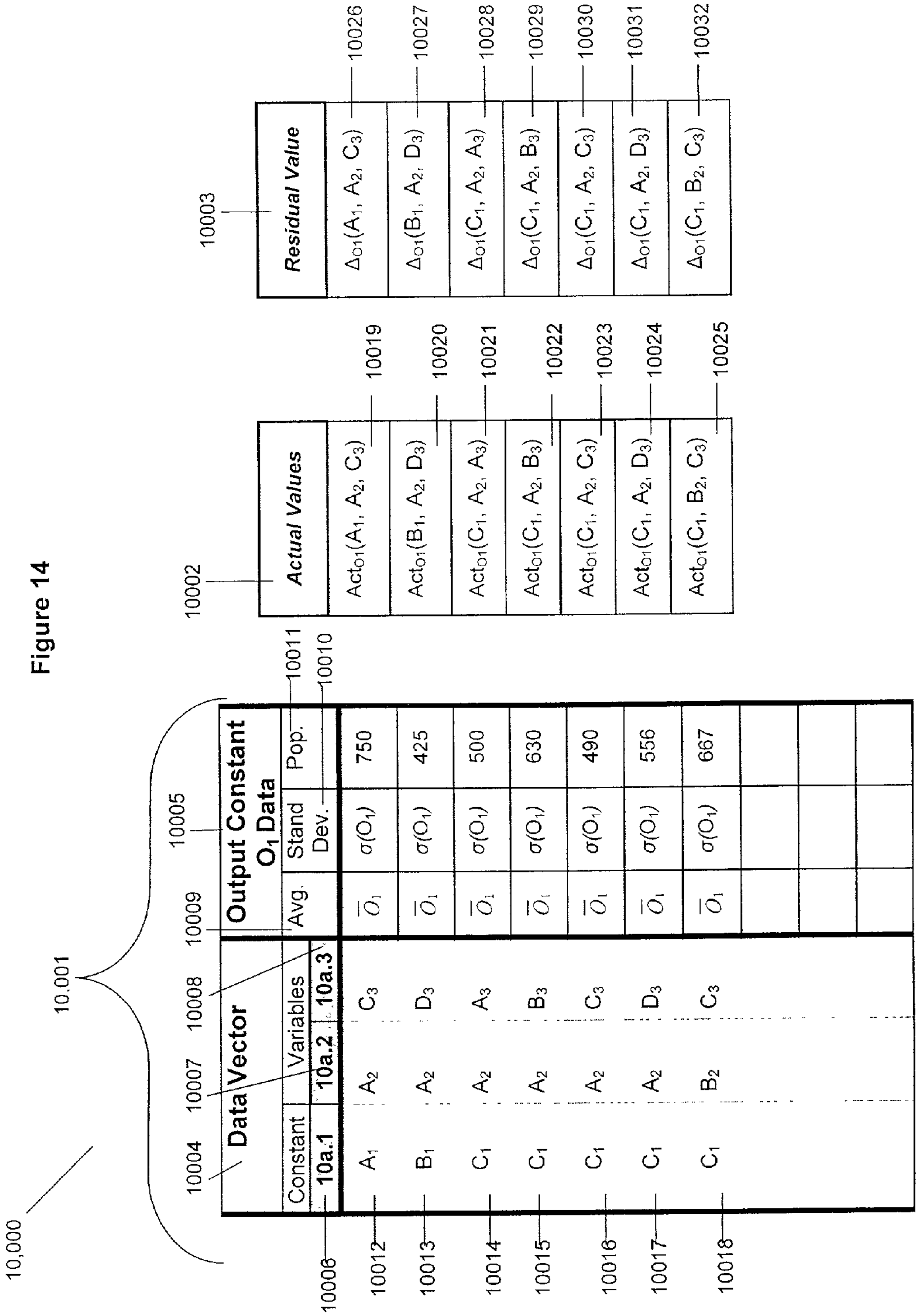

Figure 14

| Data Vector | | | Output Constant $O_1$ Data | | |
|---|---|---|---|---|---|
| Constant 10a.1 | Variables 10a.2 | 10a.3 | Avg. | Stand. Dev. | Pop. |
| $A_1$ | $A_2$ | $C_3$ | $\bar{O}_1$ | $\sigma(O_1)$ | 750 |
| $B_1$ | $A_2$ | $D_3$ | $\bar{O}_1$ | $\sigma(O_1)$ | 425 |
| $C_1$ | $A_2$ | $A_3$ | $\bar{O}_1$ | $\sigma(O_1)$ | 500 |
| $C_1$ | $A_2$ | $B_3$ | $\bar{O}_1$ | $\sigma(O_1)$ | 630 |
| $C_1$ | $A_2$ | $C_3$ | $\bar{O}_1$ | $\sigma(O_1)$ | 490 |
| $C_1$ | $A_2$ | $D_3$ | $\bar{O}_1$ | $\sigma(O_1)$ | 556 |
| $C_1$ | $B_2$ | $C_3$ | $\bar{O}_1$ | $\sigma(O_1)$ | 667 |

| Actual Values |
|---|
| $Act_{O_1}(A_1, A_2, C_3)$ |
| $Act_{O_1}(B_1, A_2, D_3)$ |
| $Act_{O_1}(C_1, A_2, A_3)$ |
| $Act_{O_1}(C_1, A_2, B_3)$ |
| $Act_{O_1}(C_1, A_2, C_3)$ |
| $Act_{O_1}(C_1, A_2, D_3)$ |
| $Act_{O_1}(C_1, B_2, C_3)$ |

| Residual Value |
|---|
| $\Delta_{O_1}(A_1, A_2, C_3)$ |
| $\Delta_{O_1}(B_1, A_2, D_3)$ |
| $\Delta_{O_1}(C_1, A_2, A_3)$ |
| $\Delta_{O_1}(C_1, A_2, B_3)$ |
| $\Delta_{O_1}(C_1, A_2, C_3)$ |
| $\Delta_{O_1}(C_1, A_2, D_3)$ |
| $\Delta_{O_1}(C_1, B_2, C_3)$ |

STRATEGIC METHOD FOR PROCESS CONTROL

This is a continuation in part of U.S. patent application Ser. No. 09/588,681 filed on 7 Jun. 2000, the specification of which is incorporated herein by reference.

FIELD OF THE INVENTION

The present invention generally relates to a method for controlling a manufacturing-type or like process, and to search-space organizational validation of inputs, outputs, and related factors therein.

More specifically, the present invention relates to synergistically combining disparate resolution data sets, such as by actual or simulated integrating of lower resolution expert-experience based model-like templates to higher resolution empirical data-capture dense quantitative search-spaces, and to establishing a process control strategy therewith.

Furthermore, given the inherent interdisciplinary nature of the present invention, from alternative technological vantages, the present invention may also be understood to relate to embodiments where this synergetic combining is beneficially accomplished, such as in control systems, command control systems, command control communications systems, computational apparatus associated with the aforesaid, and to quantitative measuring tools used therewith. Equivalently, the present invention may be understood to relate to domains in which this synergetic combining is applied, such as fabrication of semiconductors or of integrated circuits, medical treatment modalities, social engineering models, corporate management enterprise systems, transactional modifications for financial business practices, or substantially any other organized modality of practice or information; technological, bio-physical, mercantile, social, etc.

BACKGROUND OF THE INVENTION

Process control has historic origins in improving the yield and efficiency of manufacturing enterprises. Numerous methods for process control are used in countless domains of instantiation. Inclusive of their variations and combinations, process control techniques are presently finding application in improving the yield and efficiency of logical and physical processes; including technological, bio-physical, mercantile, and social enterprises. These diverse types of enterprises, along with classical manufacturing type enterprises are presently evolving into hyper-complex data management and optimization tasks.

Given the seemingly ever-increasing capacity of computer processing to perform tasks (e.g. data gathering, data storage, data management, and data related modeling), and given that this growth of task performance provides logical facilities for higher complexity modeling activities, there has arisen a pressing need in the art for facile tools that provide accurate strategies for managing process control activities. Furthermore, there is a continuously growing need for strategic methods for integrating a plurality of locally optimized processes into some presumptive better global optimization.

This need has stood as a substantial barrier to the broad application of process control, even in manufacturing enterprises that only have the seemingly straightforward tasks of unifying already process controlled tools into process controlled modules; and then into process controlled manufacturing enterprise systems (MES). Simply stated, there is a need in the art for a strategic process control method that will extend the known benefits of process control to higher order activities. There is an especially long felt need for a strategic process control method that is, on the one hand, conceptually facile for varying levels of process control professionals to use, and that is, on the other hand, facile for integration with higher order mathematical modeling theories.

There follows five Internet accessible references, which each independently attempts to articulate solutions to substantial sub-sets of the aforesaid outstanding needs. It should be appreciated that even if these references were combined into some hybrid system, there would still remain the aforesaid outstanding needs; especially since any such combination would decimate any operational expectation for conceptual simplicity.

http://www.iac.honeywell.com/journal/feb97/j29739.htm

Open solutions: a strategic approach—Paul Peters—Senior Process Control Engineer—Hoechst Celanese Bishop Plant—Bishop, Tx.

http://www.iac.honeywell.com/services/networks/about.htm

ABOUT INDUSTRIAL-STRENGTH NETWORKS—Overview—Manufacturers are recognizing the increasing value of integrating specific information embedded within the process control domain into the business information domain and vice versa. The availability and accuracy of this information is critical to the success of your enterprise.

http://www.gintic.gov.sg/recruit1.html

R&D in Manufacturing Technology—Gintic is a national research institute proactively involved in collaborative applied R & D projects with the industry and contract research. Funded by the National Science and Technology Board, Gintic's mission is to enhance the competitiveness of the Singapore industries through the generation and application of advanced manufacturing technology.

http://www.tu-chemnitz.de/wirtschaft/wi2/loos/wbf95/wbf95.htm

Production Management—Linking Business Applications to Process Control—Peter Loos—Institut fuer Wirtschaftsinformatik—University of Saarland, Saarbr?cken, Germany—published in: World Batch Forum 1995 (Proceedings, Newtown Square, PA, May 22-24, 1995), pp 2.1-2.16.

http://www.ece.orst.edu/~barreta/sme/sme.htm

A Software Architecture and Environment for Flexible Manufacturing—Spencer B. Barrett—Member of Technical Staff—Intelledex, Incorporated—Corvallis, Oreg.; CONFERENCE: Semiconductor Manufacturing—Oct. 30, 1990—Tempe Arizona—This paper describes a process control software system for manufacturing cell and cluster control. An object-oriented approach that permits on-line configuration of objects provides a simplistic, flexible and extendible system. Automated design tools help create, analyze, document, and maintain the different classes of objects used in the system.

Collectively, the preceding five Internet accessible references have numerous common factors. All of them are forced into some sort of multi-level approach in order to express the complexity of integrating an ensemble of interrelated process events into a single MES-type view. The parent application of the present invention was likewise forced into constructing a multi-layer model in order to express the complexity of integrating an ensemble of interrelated process events into a single MES-type view. However, the resultant integration, implementation, and process control method of the prior art (such as those described in these references) remain excessively cumbersome; and do not lend themselves to any proof of their respective efficacy. There remains a need in the art for improvement in process control, especially for a facile integration of any arbitrary plurality of interrelated process events.

ADVANTAGES, OBJECTS, AND BENEFITS OF THE INVENTION

Technological Need Issues: The present invention provides a process control methodology that is easy to reverse engineer with existing process control systems, including existing data capture systems, process management systems, and operational alert and alarm initiation systems. More specifically, the present invention provides a process control methodology wherein, on the one hand, professionals (e.g. process engineers, experts, consultants, managers, and even machine operators) may participate in providing a preliminary definition of factors worthy of consideration when implementing process control for a particular process juncture and, on the other hand, empirical data may be applied to objectively provide actual operational weightings between these multi-parametric factors. Ultimately, the present invention provides process control; yielding improved productivity and efficiency. Furthermore, the present invention provides analytical derivative result, in the form of a discrete empirical model of the process juncture; which is equivalent to or an improvement over that provided by the participating professionals.

Ergonomic Need Issues: In that the present invention is focused on developing a greatly simplified family of discrete combinatorial cases for a process juncture; both expressing concepts of relationships affecting the performance at that juncture and subsequently appreciating the actual performance at that juncture. Furthermore, this simplification extends to integrating process junctures into aggregates; such as integrating tools into a module or integrating modules into an MES.

Economic Need Issues: Notwithstanding the aforesaid technological and ergonomic need issues, the present invention provides at least an equal improvement in process control performance as existing systems; with an added value of being able to be further integrated into larger units of process control. It is however likely that for most application the method of the present invention will also provide an improved process control performance to known general-purpose process control methods.

Notices

The present invention will forthwith be described with a certain degree of particularity, however those versed in the art will readily appreciate that various modifications and alterations may be carried out without departing from either the spirit or scope, as hereinafter claimed.

By way of reference, it should be noted that many broad aspects of the present application have their antecedent basis in the parent application —Knowledge-Engineering Protocol-Suite, (U.S. patent application Ser. No. 09/588,681 filed on 7 Jun. 2000). In order to provide the reader with a coherent transition from the parent application to the present application, the following observations may be useful:

The term ‘input set combination’ in the present application should be understood as substantially equivalent to the term ‘n-tuple’ from the parent application.

The term ‘interconnection cell at a predetermined process juncture’ in the present application should be understood as a combination of the terms ‘first plurality of correlated data sets’ and ‘second plurality of interrelated nodes of graph-directed expertise-suggested data-set relationships’ from the parent application.

The term ‘validating’ in the present application should be understood as a specific embodiment of the term ‘simulating a validity-metric’ from the parent application.

The concepts of updating the vector look-up table and the self-correcting feature of the vector look-up table in the present application should be understood as an embodiment of the concept of ‘improving the weighted component’ in the parent application.

One of the descriptions for ‘validating’ in the parent application is ‘generating a conditional statistical process-control distribution function and convoluting the conditional distribution function with the present weightings’. The preferred embodiment of validation according to this description is the strategic method of the present invention.

Due to constraints and goals that affect obtaining a process recipe, it is sometimes beneficial to use a representational search-space that differs from the simple vectors and the vector look-up table described in the present application, such as empirical manifolds or multi-dimensional manifolds as described in the parent application.

In order for the reader to further appreciate these correspondences between the parent application and present application, the references to and descriptions of FIGS. 30, 31a, 31b, 32, and 33 in the parent application are noteworthy.

Furthermore, it should generally be appreciated by the man of the art that the present invention, in whole or in part, may be used independently of the Knowledge-Engineering Protocol-Suite or may be used as a part of the preferred integral embodiment of the Knowledge-Engineering Protocol-Suite.

GENERAL OVERVIEW OF THE INVENTION

The present invention relates to a strategic method for process control wherein said method includes the steps of: for a predetermined process juncture defining an interconnection cell having associated therewith firstly at least one set of input data or at least one set of process control parameters, and secondly at least one set of output data;

assigning at least one boundary value to at least one set of the sets associated with the defined interconnection cell;

using the assigned at least one boundary value, forming a plurality of discrete respective set combinations, and for the interconnection cell, processing data from the plurality of respective formed set combinations into respective corresponding data record clusters.

Various embodiment of the present invention relate to aspects of the step of defining an interconnection cell.

According to an embodiment of the present invention, defining an interconnection cell includes representing the interconnection cell as corresponding to a single stage in a process map.

According to another embodiment of the present invention, defining an interconnection cell includes representing the interconnection cell as corresponding to a group of contiguous stages in a process map.

According to a further embodiment of the present invention, defining an interconnection cell includes representing the interconnection cell as corresponding to a group of discontiguous stages in a process map.

According to a different embodiment of the present invention, defining an interconnection cell includes representing the interconnection cell as corresponding to a group of cells in a process map; which includes therein substantially every stage in the process map.

According to yet another embodiment of the present invention, defining an interconnection cell includes representing the interconnection cell as corresponding to at least two interrelated interconnection cells in a process map.

According to still a further embodiment of the present invention, defining the interconnection cell includes associating therewith derived data.

According to a different embodiment of the present invention, defining the interconnection cell includes associating therewith values generated by a Design-Of-Experiments assessment of the predetermined process juncture; to be used for initialization of a like-process.

According to a similar embodiment of the present invention, defining the interconnection cell includes associating therewith values computed using at least one predetermined formula.

According to the preferred embodiment of the present invention, defining the interconnection cell includes validating at least one set of the at least one set of input data to the interconnection cell as respectively having a substantially significant correlation with a set of the at least one set of output data.

Furthermore, according to the preferred embodiment of the present invention, said validating includes calculating a correlation coefficient between a selected set of the at least one set of input data, and the at least one set of output data; for the interconnection cell.

Likewise, according to the preferred embodiment of the present invention, assigning at least one boundary value includes analyzing data in the respective set wherein the at least one boundary value is to be assigned.

Also, according to the preferred embodiment of the present invention, analyzing data in the respective set includes examining the data according to at least one predetermined criterion.

In addition, according to the preferred embodiment of the present invention, examining the data according to at least one predetermined criterion includes electing a criterion selected from any one or more of the following lists: input constraints, process constraints, or output goals.

Input constraints: within a specification limit, within a range of values, below an upper limit, above a lower limit, closest to a mid-range value, closest to a previously used value. Process constraints: closest recipe to most recent recipe, within a specification limit, within a range of values, below an upper limit, above a lower limit, closest to a mid-range value. Output goals: within a specification limit, within a range of values, a predetermined target value, an upper specification limit, a lower specification limit, below an upper limit, above a lower limit, closest to a mid-range value.

In that the method of the present invention relates to a step of—for a predetermined process juncture—defining an interconnection cell having associated therewith firstly at least one set of input data or at least one set of process control parameters, and secondly at least one set of output data, various embodiments of the present invention relate to sources or origins of the contents of each of these sets; be they containing data or be they containing parameters.

According to one such variation of the present invention, said at least one input data set includes historical empiric data obtained from a previously performed like-process.

According to another such variation of the present invention, said at least one input data set includes data currently being obtained from a substantially presently ongoing like-process.

Independently, various embodiment of the present invention relate to aspects of the step of processing data from the plurality of respective formed set combinations into respective corresponding data record clusters.

According to an embodiment of the present invention, processing includes summarizing data in each respective corresponding data record cluster.

According to another embodiment of the present invention, processing includes implementing a Run-to-Run process control mode.

According to a further embodiment of the present invention, processing includes running a feed back closed control loop.

According to yet another embodiment of the present invention, processing includes running a feed forward closed control loop. According to the preferred variation of this embodiment, running a feed forward closed control loop includes substantial optimization of multiple outputs According to a different embodiment of the present invention, processing includes transforming each summarized respective corresponding data record cluster into a sub-manifold of a multi-variate data manifold.

According to still a further embodiment of the present invention, processing includes transforming each summarized respective corresponding data record cluster into a search-space vector. According to the preferred variation of this embodiment, transforming each summarized respective corresponding data record cluster into a search-space vector includes arranging at least one search-space vector into a vector look-up table. Furthermore, according to the preferred variation of this embodiment, the at least one search-space vector—having been arranged into a vector look-up table—is updated by using a self-correcting adaptive system.

According to still another different embodiment of the present invention, processing includes:

A. for at least one process control parameter of the at least one set of process control parameters, prescribing at least one process control recipe-element for use in the predetermined process juncture; and B. designating the prescribed at least one process control recipe-element for use in the predetermined process juncture.

According to still another embodiment of the present invention, processing includes using robust optimization.

According to still another further embodiment of the present invention, said processing includes characterizing data in substantially each respective corresponding data record cluster by using a statistical calculation. According to a variation of this embodiment, said using a statistical calculation includes calculating a process capability ratio. According to another variation of this embodiment, characterizing data in substantially each respective corresponding data record cluster by using a statistical calculation includes arranging the characterized data into a look-up table. Furthermore, according to the preferred implementation of this variation, arranging the characterized data into a look-up table includes using the look-up table and therewith designating at least one process control recipe for use at the predetermined process juncture. In the context of this preferred variation, it is further provided to preferably implement that using the characterized data in the look-up table includes smoothing the data. In the context of the immediately preceding variation in its most preferred form, arranging the smoothed characterized data into a look-up table includes using the look-up table for designating at least one process control recipe for use at the predetermined process juncture. Furthermore according to a different implementation of this variation, using the look-up table for designating at least one process control recipe for use at the predetermined process juncture includes selecting a best (recipe optimum) available vector and therewith deriving a process control recipe. According to another preferred implementation of this multifaceted variation, using the look-up table for designating at least one process control recipe for use at the predetermined process juncture includes updating said look-up table by using a self-correcting adaptive system. Furthermore, it is preferred to implement selecting a best available vector for use with the process control recipe by therein including running a feed forward closed control loop.

According to another embodiment of the present invention, processing includes—to the predetermined process juncture associated with the interconnection cell—applying at least one of the respective corresponding data record clusters to the process occurring at that juncture. In this context, it is preferred that at least one of the respective corresponding data record clusters is updated by using a self-correcting adaptive system. In this context, it is alternatively preferred that applying at least one of the respective corresponding data record clusters includes reporting a process status, and that said reporting is initiated according to predetermined conditions.

Also, according to an embodiment of the present invention, processing data from the plurality of respective formed set combinations into respective corresponding data record clusters includes installing at least one data record cluster correspondence as a front end to a neural network, wherein the neural network is used for controlling an aspect of the process at the predetermined process juncture.

According to another embodiment of the present invention, the steps of the method are applied for optimizing a Chemical/Mechanical Polishing processing of silicon wafers.

The present invention also relates to a substantially equivalently defined strategic method for process control wherein said method includes the steps of: using a mapped plurality of graph-directed expertise-suggested interconnection cell relationships, defining a map referenced interconnection cell therein having associated therewith firstly at least one set of input data or at least one set of process control parameters, and secondly at least one set of output data; and using the map referenced interconnection cell, designating at least one process control recipe.

According to an embodiment of the substantially equivalently defined method of the present invention, defining includes, for the map referenced interconnection cell, validating at least one of the mapped plurality of graph-directed expertise-suggested interconnection cell relationships.

According to another embodiment of the substantially equivalently defined method of the present invention, defining the map referenced interconnection cell includes validating the map referenced interconnection cell by simulating a validity-metric for an n-tuple of directed graph components of the map referenced interconnection cell.

According to a further embodiment of the substantially equivalently defined method of the present invention, defining the map referenced interconnection cell includes, for an n-tuple of directed graph components of the mapped interconnection cell, validating the map referenced interconnection cell by measuring if each of the at least one set of input data to the map referenced interconnection cell significantly contributes to that map referenced interconnection cell's output, wherein a predetermined convolution of these measurings constitutes an acceptable validity-metric.

According to a different embodiment of the substantially equivalently defined method of the present invention, designating at least one process control recipe includes choosing another process control recipe whenever a particular obtained output value differs from a predetermined target value, by at least a predetermined value, thereby obtaining a new subsequent offset goal value closer to a predetermined target value.

Optimally, in the context of this embodiment, obtaining a new offset goal value includes basing the value upon at least one output value from a previous similar process. Furthermore, in the context of this embodiment it is preferred that basing a new offset goal value includes analyzing the at least one output value from a previous similar process by running a feed back closed control loop.

According to yet another embodiment of the substantially equivalently defined method of the present invention, defining a map referenced interconnection cell includes forming at least two search-space vectors.

The present invention also relates to an article of manufacture including a computer usable medium having computer readable program code embodied therein for performing strategic process control at a predetermined process juncture, the computer readable program code in said article of manufacture including:

first computer readable program code for causing a computer to define an interconnection cell having associated therewith firstly at least one set of input data or at least one set of process control parameters, and secondly at least one set of output data;

tied to the first computer readable program code, second computer readable program code for causing a computer to assign at least one boundary value to at least one set of the sets associated with the defined interconnection cell; and tied to the second computer readable program code, third computer readable program code for causing a computer to form a plurality of discrete respective set combinations, using the assigned at least one boundary value.

The preferred embodiment of the article of manufacture further includes having computer readable program code embodied therein for causing a computer to arrange the respective corresponding data record clusters into a look-up table, for the interconnection cell. Also the preferred embodiment of the article of manufacture is furthermore including a computer usable medium having computer readable program code embodied therein for performing strategic process control at a predetermined process juncture, the computer readable program code in said article of manufacture including: tied to the third computer readable program code, fourth computer readable program code for causing a computer to process data from the plurality of respective formed set combinations into respective corresponding data record clusters, for the interconnection cell.

The present invention also relates to a program storage device readable by machine, tangibly embodying a program of instructions executable by the machine to perform method steps for performing strategic process control, said method steps including:

for a predetermined process juncture, defining an interconnection cell having associated therewith firstly at least one set of input data or at least one set of process control parameters, and secondly at least one set of output data;

for the predetermined process juncture, assigning at least one boundary value to at least one set of the sets associated with the defined interconnection cell;

for the predetermined process juncture, using the assigned at least one boundary value, forming a plurality of discrete respective set combinations, and for the predetermined process juncture, for the interconnection cell, processing data from the plurality of respective formed set combinations into respective corresponding data record clusters.

The preferred embodiment of the program storage device is further including therein a method step whereby respective corresponding data record clusters are arranged into a look-up table.

The present invention also relates to a system for performing strategic process control at a predetermined process juncture including:

A. apparatus for delineating an interconnection cell, said interconnection cell having associated therewith firstly at least one set of input data or at least one set of process control parameters, and secondly at least one set of output data;

B. a computer having therein software for assigning at least one boundary value to at least one set of the at least one set of input data or to at least one set of the at least one set of output data; and having attached thereto data storage apparatus for storing the assigned data sets;

C. a compressor for performing multi-dimensional representing, ordering, and combining of a plurality of discrete respective set combinations from the stored assigned data sets; and D. a processor for processing data from the plurality of discrete respective set combinations into respective corresponding data record clusters.

According to the preferred embodiment of the system of the present invention, the processor includes attached thereto an applier for applying at least one of the respective corresponding data record clusters. Also, according to the preferred embodiment of the system of the present invention, the computer includes attached therewith at least one sensor for providing an input or output datum to the respective set of input or output data. Likewise, according to the preferred embodiment of the system of the present invention, the computer includes attached therewith at least one actuator for providing a process control parameter setting from the respective set of process control parameters, and the provided process control parameter setting is assigned according to a predetermined discrete respective set combination. In addition, according to the preferred embodiment of the system of the present invention, the processor includes attached therewith at least one actuator for providing a process control parameter setting from the respective set of process control parameters, and the provided process control parameter setting is assigned according to a predetermined discrete respective set combination.

The present invention also relates to an article of manufacture including a computer usable medium having computer readable program code embodied therein for performing strategic process control at a predetermined process juncture, the computer readable program code in said article of manufacture including:

I. first computer readable program code for causing a computer to define a map referenced interconnection cell having therein a mapped plurality of graph-directed expertise-suggested interconnection cell relationships and further having associated therewith firstly at least one set of input data or at least one set of process control parameters, and secondly at least one set of output data;

II. tied to the first computer readable program code, second computer readable program code for causing a computer to use the map referenced interconnection cell to designate at least one process control recipe.

Furthermore, the present invention relates to a program storage device readable by machine, tangibly embodying a program of instructions executable by the machine to perform method steps for performing strategic process control, said method steps including:

for a predetermined process juncture, using a mapped plurality of graph-directed expertise-suggested interconnection cell relationships, defining a map referenced interconnection cell therein having associated therewith firstly at least one set of input data or at least one set of process control parameters, and secondly at least one set of output data; and for the predetermined process juncture, using the map referenced interconnection cell, designating at least one process control recipe.

SUMMARY OF DEFINITIONS AS GLEANED FROM THE PRIOR ART

Closed control loop—a process run with process control methods applied to it.

Controllable Input—input at a process step whose value is determined directly by the user. In the context of the present invention, controllable input is also referred to as a control parameter.

Control parameter—see controllable input.

Feed Back Closed Control Loop—A Feed Back Closed Control Loop refers to determining values for controllable input at a given process stage that will optimize one or more characteristics of the output at that stage based on values of those output characteristics from one or more previous process runs. The Feed Back Closed Control Loop is a form of run-to-run control.

Feed Forward Closed Control Loop—The Feed Forward Closed Control Loop refers to determining values for controllable input at a given process stage that will optimize process output at that stage based on the values of measurable input(s) at that stage for the current process run. The Feed Forward Closed Control Loop is a form of run-to-run control.

Input—Input at a given process stage is anything that influences output at that process stage.

Input constraint—a limitation on the possible range of values for a given input.

Measurable Input—input at a process step whose value can be measured but cannot be controlled directly by the user.

Manufacturing Execution (alternatively Enterprise) System (MES)—In a graph theoretic process map representation, a collection of nodes and edges representing tools and subtool process steps, MES is a highest level process control view of integration of tools into modules and modules into meta-modules.

Module—a set of one or more tools that are configured to execute a part of a process.

Open loop—a process run without process control methods applied to it.

Output—the object or objects produced by a process for which the process is being carried out. A process divided up into stages can have output at any of its given stages.

Output constraint—when applying process control to optimize more than one output characteristic at a given process step, an output constraint exists when the optimization of one output characteristic inhibits the optimization of at least one other output characteristic at that process step.

Robust optimization—optimization of an output characteristic by reducing variability around a target value for that output characteristic.

Run—A run refers to one execution of a process with resulting output.

Run-to-Run Control—a method of process control where the process is adjusted between runs for the purpose of optimizing one or more output characteristics.

Process Step—a single stage in a process with measurable and/or controllable input and output. In the context of the present invention, a process step is also referred to as a tool.

Search-Space—the conceptualized universe of data structures (including the broad class of data-manifolds) and their respective and collective transformations—such as is appreciated by data-base theorists and artificial-intelligence theorists.

Target value—the desired value for an output characteristic for which process control optimization is being applied.

Tool—See "Process Step" (above); also a constituent part of a Module.

DEFINITIONS FOR TERMS USED IN THE CONTEXT OF THE PRESENT INVENTION

Boundary value—a value assigned to a continuous range of possible values for a control parameter, monitored parameter, input constant, output constant, or outside influence in order to create discrete values corresponding to that continuous range. Alternatively, in the case where the range of values is discrete, then the boundary value logically divides the range of values into constituent subsets, at least one having therein a plurality of discrete values.

Boundary value range—a section of a continuous range of possible values for a control parameter, monitored parameter, input constant, output constant, or outside influence bounded by one or more boundary values.

Data array—a set of values recorded for one process run for any combination of control parameters, monitored parameters, input constants, output constants, and outside influences.

Data set—a set of values for a given control parameter, monitored parameter, input constant, output constant, or outside influence recorded over a series of consecutive process runs.

Data vector—A unique combination of boundary value ranges selected for the purposed of process control optimization with embodiments of the present invention. The preferred embodiment of the present invention uses data vectors with boundary value ranges for input variables and constants. In the context of the present invention, a data vector is often referred to as simply a vector.

Design of Experiment—a procedure preferably including interpolating and extrapolating output values for any possible combination of input values based on a limited sample population representing the spectrum of possible input values.

Input set combination—The combination of data sets of input constants and data sets of input variables at a given interconnection cell.

Interconnection Cell—An interconnection cell is an information unit describing the non-quantitative mutual dependency between one output and one or more inputs of a process step.

Interrelationship—An alleged or validated relationship between two process stages such that when a particular control parameter is set at an earlier stage in the process, a certain resulting output is received at a later stage in the process.

Model Predicted Value—In the preferred embodiment of the present invention, the model predicted value is the predicted value for an output constant according to the vector look-up table. The model predicted value for an output constant could also be understood as a vector's average value of that output constant.

Next best optimal vector—The next best optimal vector is used together with the optimal vector by the smoothing algorithm when optimizing an output constant in the Feed Forward Closed Control Loop. The next best optimal vector must have boundary value ranges for input constants that include the values of the current run's input constants. If the optimal vector's model predicted value is greater than the output constant target value, then the next best optimal vector will have the model predicted value is usually closest to but less than the output constant target value; and if the optimal vector's model predicted value is less than the output constant target value, then the next best optimal vector will have the model predicted value that is usually closest to but greater than the output constant target value.

Optimal vector—When optimizing an output constant in the Feed Forward Closed Control Loop, the optimal vector for that output constant is usually the vector with the closest model predicted value highest Process Capability Ratio ($C_{pk}$) for that output constant to that output constant's target value and with boundary value ranges for input constants that include the values of the current run's input constants.

Output Constant—an output constant is any user-defined characteristic of process output for which optimization is being applied.

Outside Influence—a factor that is not considered input at any stage in a process and that is alleged or validated to influence output at a given stage in the process is an outside influence.

Preferable vector—When optimizing multiple output constants and common vectors are found for the multiple output constants, a preferable vector for an output constant is usually the one vector from amongst the common vectors with the highest Process Capability Ratio ($C_{pk}$) model predicted value closest to the target value for that output constant. Due to output constraints, a preferable vector is not necessarily an optimal vector, because one output constant's optimal vector may not be a common vector shared by the other one or more output constants.

Process Juncture—a general nomenclature for designating where the method of the present invention is applied. In its simplest and most widely applicable form, a process juncture is any node or edge in a graph-theoretic representation of a flow of information, goods, or services such as the knowledge tree in the parent application or a process map in the present application.

Recipe—A recipe is a set of values for input constants and/or variables at a given process step for achieving an optimal value or values for one or more output constants at that process step.

Smoothing algorithm—in the context of optimizing an output constant, smoothing refers to the procedure for finding a process recipe based on the optimal vector and the next best optimal vector. The smoothing algorithm uses either piecewise linearization, or linear regression, or the like to determine recipe values.

Vector look-up table—The table (or a like representation) stores data vectors. In the context of the present invention, a vector look-up table is often referred to as simply a look-up table.

Weighting algorithm—when optimizing multiple output constants and more than one common vector is found, a weighting algorithm is applied to each output constant's preferable vector whereby the vectors are weighted (i.e. prioritized) and the weighting algorithm uses these weightings to provide a recipe for optimizing the multiple output constants. When optimizing multiple output constants and no common vector is found, the weighting algorithm is applied to each output constant's optimal vector whereby the vectors are weighted (i.e. prioritized) and the weighting algorithm uses these weightings to provide a recipe for optimizing the multiple output constants.

ACRONYMS

APC—Advanced Process Control (a variation or alternative to SPC)
CMP—Chemical Mechanical Polishing
DOE—Design of Experiment
IPC—Intelligent Process Control (a form of APC)
MES—Manufacturing Execution System (alternately Manufacturing Enterprise System)
R2R—Run-to-Run (a process control resolution metric)
SPC—Standard Process Control (also often Statistical Process Control)

SYNONYMS, IN THE CONTEXT OF THE PRESENT INVENTION input variable=control parameter=controllable input measurable input=input constant process step=tool data array=data record model predicted value=output constant vector's average value Note: The semiotic nomenclature "step", "stage", "juncture", "cell", and "node" are generally interchangeable. Use of two or more of these terms in the context of any example may be for the purpose of expressing parts of a larger unit. For example, a stage may be composed of constituent steps. Likewise, use of two or more of these terms in the context of any example may be for expressing a correspondence between different representations. For example, a process map may be made of graph directed stages, and each stage may correspond to an interconnection cell dealing with data related to a juncture in an actual manufacturing operation. Substantially, there are a number of related representations that borrow from the generally interchangeable nomenclature. For example, there is the referent location where a manufacturing or like-process event is performed; there is a graph theoretic representation of the event in the context of previous, subsequent, and related events; there is a information theoretic representation related to transformations or comparisons between data captured in the performing of the referent process event or the symbolic information structure representation thereof; there are then "procedures" that attempt to deal with optimizing the referent process and likewise that attempt to deal with optimizing the information processing. Simply stated, it should be apparent to the man of the art, from the context and construction of each example, that the intent of these generally interchangeable terms is to differentiate between at least two different aspects (often corresponding to parallel aspects in the seven layer knowledge-engineering protocol-suite of the parent application).

SUMMARY OF THE INVENTION

Simply stated, the present invention comes to "teach" a strategic method for process control which, for any juncture in a representation of a process (according to diverse topological definitions for the notion "juncture"), considers disparate quality "guesses" (recommendations) about what factors to consider when trying to optimize the juncture; and likewise unifies disparate quality definitions about what constitutes an optimization. In the course of performing the steps of the strategic method of the present invention, conceptually useful intermediary representations are developed. Probably, the most interesting of these representations is a lookup table, organized according to discrete combinations of "cases" that can occur at the juncture; which either presents the most probable best configuration (recipe) of process control "settings" to use at this time at the juncture or presents two such cases from which a best configuration may be interpolated.

The invention presents a strategic method for process control for use at a given process juncture, and includes defining an interconnection cell. This interconnection cell has on one hand associated with it one or more sets of input data or one or more sets of process control parameters, and on the other hand at least one set of output data.

Defining this interconnection cell entails delineating and designating a "block" (arbitrary unit) consisting of data associated with a given process at the given process juncture (sub-step, interconnection cell, group of cells, group of groups of cells, groups of groups of cells, or any higher level MES), and stratifying this data into a number of sub-groups. These subgroups may represent a particular item, batch, or combination thereof in a process. This collection of subgroups allows data analysis to be performed according to respective sub-group-relevant metrics.

Data collected for a given item or batch in a process is called a data vector. Data vectors are sorted and grouped into data vector clusters according to similar input set combinations. (The sorting process includes storing the data vectors that represent combinatorials of input and output process control parameters.) Data vector clusters may be stored in tabular form. The table in which the data vectors are stored is called a vector look-up table.

The vector chosen, used for process control includes the recipe for the process; because the values of the control parameters in that vector are used as the values for the control parameters for a current process run. Processing includes, for a given process control parameter, prescribing at least one process control recipe-element; that is, some portion of the current recipe, for use in a predetermined process juncture. Processing may further include summarizing data in each respective corresponding data set cluster. Selecting a best available vector for use with the process control recipe preferably includes running a feed forward closed control loop.

According to the preferred embodiment, a feed forward closed control loop involves the steps of process control (described below) of analyzing data and vector selection. In a feed forward closed control loop, the data evaluation (also described below), is usually performed according to the criterion of apparently being substantially closest to a predetermined target value.

Analyzing data in any given respective data set includes examining or evaluating the data relevant to at least one predetermined criterion selected from the list of:

a predetermined target value;
an upper specification limit;
a lower specification limit;
within a specification limit;
within a range of values;
below an upper limit;
above a lower limit;
closest to a predetermined target value;
closest to a previously used value;

closest to a mid-range value; or closest to most recent recipe.

Specific examples of criteria selected from the above list include:

an average calculated from values collected during a previously performed single manufacturing process run from data relevant to the interconnection cell, a value incremented at least one standard deviation from a single manufacturing process run average value, an average calculated from values collected from at least two previously performed manufacturing process runs regarding data relevant to the interconnection cell, or a value incremented at least one standard deviation from said average value as calculated from values collected from at least two previously performed manufacturing process runs.

Furthermore, a value may be selected because it is closest to a value of some particular interest. For example, an expert suggested value, or a value used as an "offset" or over-correction technique. This method is used to correct a previously obtained output value that was, for example higher than desired, by selecting a new value that is theoretically lower than desired, on the presumption that the result will fall in the desired middle range.

Likewise, a value may be excluded because of some restriction placed on an item, run, or other collection of data in the data set. In addition, values may be selected to reflect a growing refining of "discretization" levels in choosing values. For example, previous runs may have used a High/Low demarcation type sorting process, whereas present considerations may include at least three groupings. In such cases, the groups in the "middle" ranges will be referred to as intermediate values. Previous and subsequent intermediate values may be classified, that is discretized, by a predetermined fractional value interval.

It should be emphasized that discretization can be done by making as many arbitrary categories or intervals as needed or desired. The only limit being the fact that above a certain level of discretization, further differentiations cease to have meaningful effects on actual output.

It should be understood that the various criteria will vary depending upon whether the data currently being analyzed are relevant to input constraints, process constraints, or output goals.

In certain situations, historical empirical data and/or data obtained from monitoring the input of a currently running performance of a process are either insufficient, or not preferable, for implementing process control with the present invention. In these situations, derived data are used. Derived data are obtained through a number of methods, and can be values chosen for Design of Experiments, values computed by a predetermined formula, values formulated from information that is expert suggested, or values formulated by synthesizing methods.

Further alternate embodiments of the method include utilizing on-line, current, manufacturing data in a dynamic, adaptive manner; and including this data in performing the process control. This embodiment therefore includes a "learning" in real-time ability in the method for performing process control.

The present invention also allows for a simulation process in which the "derived data" are theoretical, and substantially all steps relevant to gathering and analyzing of data are skipped. Instead, a simulated function or algorithm is synthesized and used as if derived data contributing to the formation of this simulated function had been obtained. The system then uses the simulated algorithm—or the results of functions fabricated by simulation methods—for performing the process control method.

An embodiment algorithm of the present invention makes extensive use of boundary values for input and output when optimizing process control. In the simplest case, a boundary value can be a demarcation point. That is, a cut-off point for assigning data values to a particular discrete group category. For example, above or below the boundary value constitutes two respective discrete categories.

The system—using the assigned at least one boundary value—forms a number of set combinations. These sets are stored in such a manner so as to be discrete separate representations of differing associated input data groups. The sets can then be evaluated in relation to the boundary value.

Analysis may be done strictly from outputs for the purpose of assigning boundary values for a given specific input set. The invention is also capable of doing analysis strictly from inputs and/or control parameters to the outputs.

Preferably, before the present invention can implement its unique algorithms for optimizing process control, the preferred embodiment algorithm initiates validating whether there is a significant correlation between input sets of data and output sets of data at a given stage in a process. A validated significant correlation is a precondition to properly carrying out process control with the present invention. That is, validating a supposed correlation between two steps in the manufacturing process must first be done, so that the subsequently formulated algorithmic function can better perform improved yield or improved efficiency Automated Process Control.

The validity of a correlation—between at least one input data set of an interconnection cell and at least one output set of this interconnection cell—is determined by calculating a correlation coefficient between the minimum two respective input and output sets; or a larger group of respective input and output sets. Calculating this correlation coefficient may include characterizing the data by calculating a process capability ratio.

A further purpose of the present invention is applying the results of the analysis for actual process control. This analysis can be done in any given chosen mathematical manner. The preferred embodiment of the invention uses piece-wise linearization for refining the value or vector obtained for subsequent process control performance. The actual use of the analysis is a further extension of the broad purpose.

According to the present invention, the actual process control performance may include reporting a process status; and this reporting may be initiated according to a variety of predetermined conditions or means.

In a further alternative embodiment of the invention, a mapped plurality of graph-directed expertise-suggested interconnection cell relationships is used to define the interconnection cell. Using the map referenced interconnection cell, a process control recipe can then be designated; as heretofore described.

In this embodiment of the invention, the validation portion (validity correlation performance) of the process control procedure is carried out upon n-tuples of directed graph components of the interconnection cell. Subsequent refining of the definition of the interconnection cell is done by "measuring" to see whether a particular set of input data significantly contributes to that map referenced interconnection cell's output. A predetermined convolution of these measurings constitutes an acceptable validity-metric correlation.

Further, in this embodiment of the invention, choosing a different process control recipe sometimes becomes necessary; for example, whenever a particular obtained output value differs from a predetermined target value by at least a certain predetermined value. This, in turn facilitates the obtaining a new subsequent offset goal value closer to the predetermined target value.

The obtaining of a new subsequent offset goal value may be based upon an output value from a previous like-manufacturing process; or, in addition, by analyzing this output value by running a feed back closed control loop.

In a feed back closed control loop, optimal correction of offset goal values, at a given stage in a process, is achieved through data analysis of the values of output constants at that stage as obtained and/or compared to values obtained from at least one previous performance of the process.

An additional embodiment of the invention includes processing data by transforming a summarized respective corresponding data record cluster into a sub-manifold of a multivariate data manifold.

A sub-manifold is defined as an n-tuple of data points, organized into a multi-dimensional surface. This surface may be described by functionally orthogonal variables, and the data manipulated by ordinary mathematical treatment. This treatment may include, but is not limited to, algebraic, calculus, differential equations, n-dimensional polynomials, regression analysis, combinatorial techniques, and/or statistical means.

A related embodiment of the invention includes a method for representing a multi-dimensional surface by displaying the organized data elements as discrete volumes of an n-dimensional polynomial solid as this solid is intersected by orthogonals of a finite number: “n”; of input, output, constant, variable or some combination thereof, of process control parameters, in n-dimensional space.

A further embodiment of the invention includes processing data by transforming a summarized respective corresponding data record cluster into a search-space vector.

A search-space vector in this context indicates that the invention will transform the summarized respective corresponding data record clusters into loci in a multi-dimensional vector search-space. The invention then selects the desired vector to move along to a new cluster based upon the properties of the vector. For example, when searching for a value stored in a cluster that represents the value “closest to the most recent used recipe” the invention might focus on the vector having the smallest empirical magnitude.

In a further alternative embodiment, the invention includes a method for sorting data which includes organizing a search-space organization, the method steps including: a search-space for a first grouping or set of correlated empirical data-sets, by mapping a second grouping or set of interrelated specific locations in the search-space of graph-directed expertise-suggested data-set relationships onto the first grouping or set of correlated empirical data-sets, and wherein data-set resolution of particulars in the first grouping or set is greater than or equal to that of particulars in the second grouping or set; and validating the search-space so organized from a vantage point of a presumption of validity for the first plurality of data-sets, by i. simulating a valid variable input parameter for a particular combinatorial of directed graph components in the mapped second plurality, or ii. measuring if each input to a locus of the particular combinatorial significantly contributes to that location’s output, wherein a predetermined convolution of these measurings constitutes a validity-metric for the combinatorial.

In this embodiment, mapping includes defining substantially every locus—i.e. location—in the second plurality to have either: 1) at least one graph-directed input and at least one graph-directed output, or 2) only one graph-directed output.

The method wherein organizing includes mapping a second set of interrelated specific locations in the search-space of graph-directed expertise-suggested data-set relationships onto the first grouping or set of correlated empirical data-sets, and wherein data-set resolution of particulars in the first grouping or set is greater than or equal to that of particulars in the second grouping or set.

Further in this embodiment of the invention validating includes, for at least one weighted directed graph component from those in the directed graph of second plurality components, improving the weighted component using an input or output, proportional, empirical parameter setting, directed graph component weighting.

The method wherein validating includes generating a conditional statistical process-control distribution function and convoluting the conditional distribution function with the present weightings.

In a further alternative embodiment, the invention includes a method for sorting data which includes organizing a search-space organization, the method steps including: mapping a second plurality of interrelated nodes of graph-directed expertise-suggested data-set relationships onto the first plurality of transformed empirical data-sets, at least until there is a predetermined measure of inclusion by the second plurality of nodes and relationships of particulars in the first plurality data-sets, wherein the data-set resolution of particulars in the first plurality is greater than or equal to that of particulars in the second plurality; and validating the search-space from a vantage of a presumption of validity for the first plurality of data-sets, by simulating a validity-metric for an n-tuple of directed graph components in the mapped second plurality, or by measuring if each input to a node of the n-tuple significantly contributes to that node’s output, wherein a predetermined convolution of these measurings constitutes a validity-metric for the n-tuple.

In a further alternative embodiment, the invention includes a system for performing strategic process control at a predetermined process juncture. This system includes apparatus for delineating an interconnection cell. The interconnection cell so delineated has associated with it at least one set of input data or at least one set of process control parameters, and at least one set of output data.

This system further includes a computer which has therein software for assigning at least one boundary value to at least one set of the at least one set of input data or to at least one set of the at least one set of output data. The computer further has attached thereto data storage apparatus for storing the assigned data sets.

The system further includes a compressor for performing multi-dimensional representing, ordering, and combining of a plurality of discrete respective set combinations from the stored assigned data sets; and a processor for processing data from the plurality of discrete respective set combinations into respective corresponding data record clusters. The processor applies at least one of the respective corresponding data record clusters.

The computer includes attached therewith at least one sensor for providing an input or output datum to the respective set of input or output data. The computer further includes attached therewith at least one actuator for providing a process control parameter setting from the respective set of process control parameters. The provided process control parameter setting is assigned according to a predetermined discrete respective set combination.

In a further alternative embodiment, the invention includes a system for process control including apparatus for delineating an interconnection cell, the interconnection cell having at least one input set of data or at least one set of process control parameters, and at least one output set of data;

a validator for establishing that at least one input set of data respectively as having a substantially significant correlation with an output set of the at least one output sets;

software for assigning at least one boundary value to at least one validated set of the at least one input sets or to at least one set of the at least one output sets;

data storage apparatus for storing the assigned data sets; and a sorter for performing multi-dimensional orderings of stored data sets, and wherein the orderings are performed either concurrently, sequentially, heuristically, recursively, in parallel, asynchronously, synchronously, and/or synchronously with an accompanying time delay.

Further aspects of this embodiment of the invention include an article of manufacture, which in turn includes a computer usable medium having computer readable program code embodied therein for performing strategic process control. An additional aspect of the invention includes a program storage device readable by machine, tangibly embodying a program of instructions executable by the machine to perform method steps for performing strategic process control.

In an additional further alternative embodiment of the invention, processing data from the respective formed set combinations into respective corresponding data record clusters may include installing at least one data record cluster correspondence as a front end to a neural network. In such an instance, the neural network is used for controlling an aspect of the process at the predetermined process juncture.

BRIEF DESCRIPTION OF THE FIGURES

In order to understand the invention and to see how it may be carried out in practice, embodiments including the preferred embodiment will now be described, by way of non-limiting example only, with reference to the accompanying drawings, in which:

FIG. 6 illustrates a schematic diagram of a process stage "Stage X" with all the various process control relationships that "Stage X" participates in;

FIG. 11 illustrates a vector look-up table for an output constant $O_1$ at a given process stage;

FIG. 12 illustrates a vector look-Up table for output constants $O_1$ and $O_2$ at a given process stage;

FIG. 14 illustrates a vector look-up table for output constant $O_1$ at a given process stage, an Actual Values column which is not part of the vector look-up table, and a Residual Values column which is not part of the vector look-up table;

DETAILED DESCRIPTION OF THE INVENTION

Understanding Process Control

Figure 1:
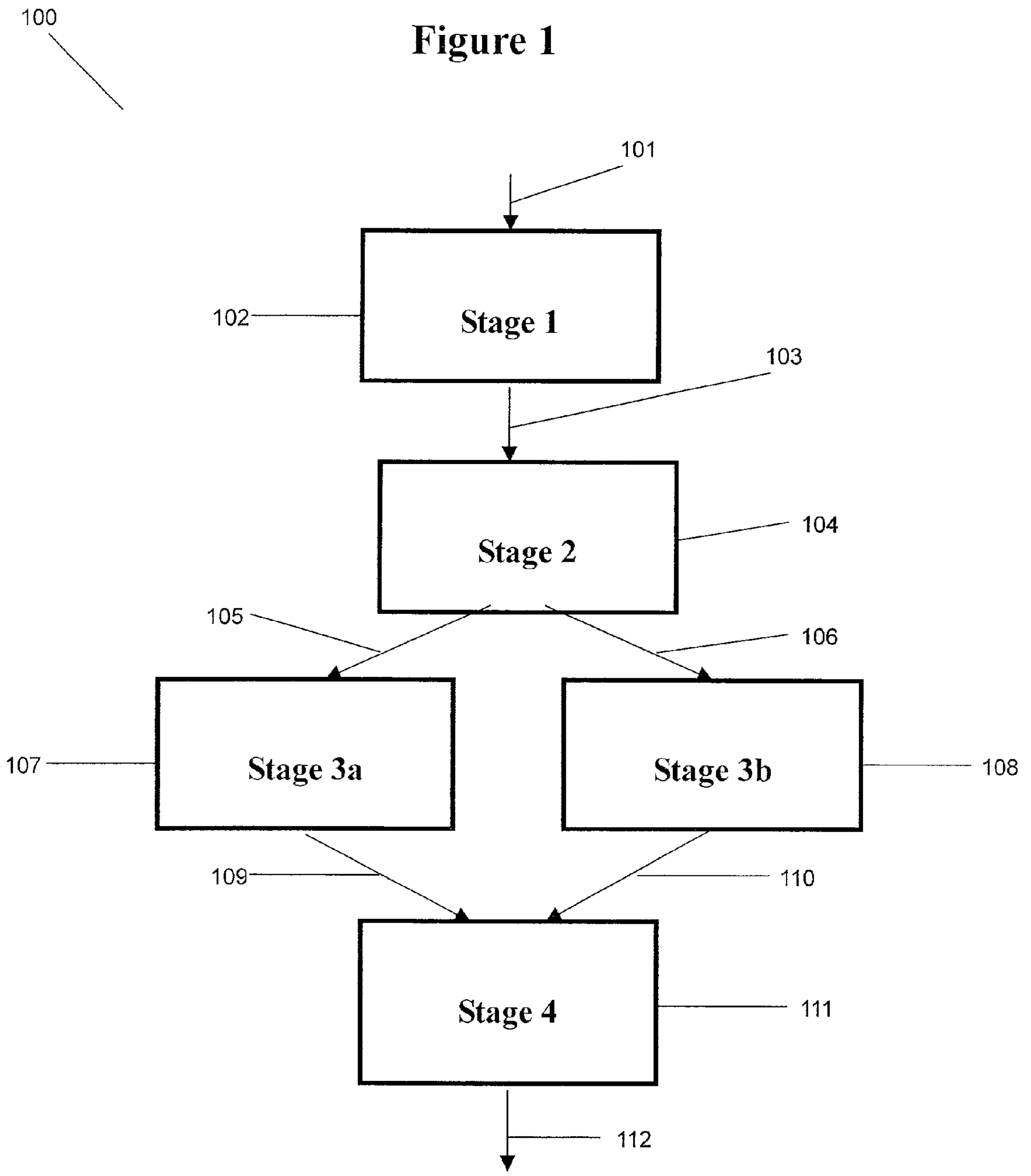
FIG. 1 illustrates a schematic diagram of a portion of a simple process map showing substantially sequential stages.

FIG. 1 illustrates a schematic diagram of a portion 100 of a simple process map showing substantially sequential stages; "Stage 1" 102, "Stage 2" 104, "Stage 3*a*" 107, "Stage 3*b*" 108 and "Stage 4" 111 of a process, and the inputs and outputs that connect them—starting with the initial measured input to the process 101 and sequentially: measured output 103 from "Stage 1" which is measured input to "Stage 2", measured output 105 from "Stage 2" which is measured input to "Stage 3*a*", measured output 106 from "Stage 2" which is measured input to "Stage 3*b*", measured output from "Stage 3*a*" 109 which is measured input to "Stage 4", measured output from "Stage 3*b*" 110 which is measured input to "Stage 4", and measured output 112 from "Stage 4".

Referring to FIG. 1, depicted is an example simple process map. The boxes in the diagram represent sequential stages in a portion of a typical process, and the arrows indicate the direction in which output from one stage flows as input to the next stage. Often, this input or output is measured for purposes of process control. Simply stated, process control generally relates to determining the optimal values for control parameters at a stage in a process to improve quality or quantity of yield at that stage in the process. Stages 3*a* and 3*b* represent parallel stages, which can run simultaneously or in an alternating manner. For example, a process would utilize such stages when an operation carried out at Stage 3 is slower in relation to actions carried out at other stages in the process. When a stage in a process is slower in relation to the rest of the process, it is advantageous to break down the slower stage into parallel stages as seen in FIG. 1; to speed up process time at the that stage. Another example of when parallel stages are used would be for one process that produces two types of output. Such a process will elect which of the different operations will be carried out at the "parallel stage".

Figure 2:
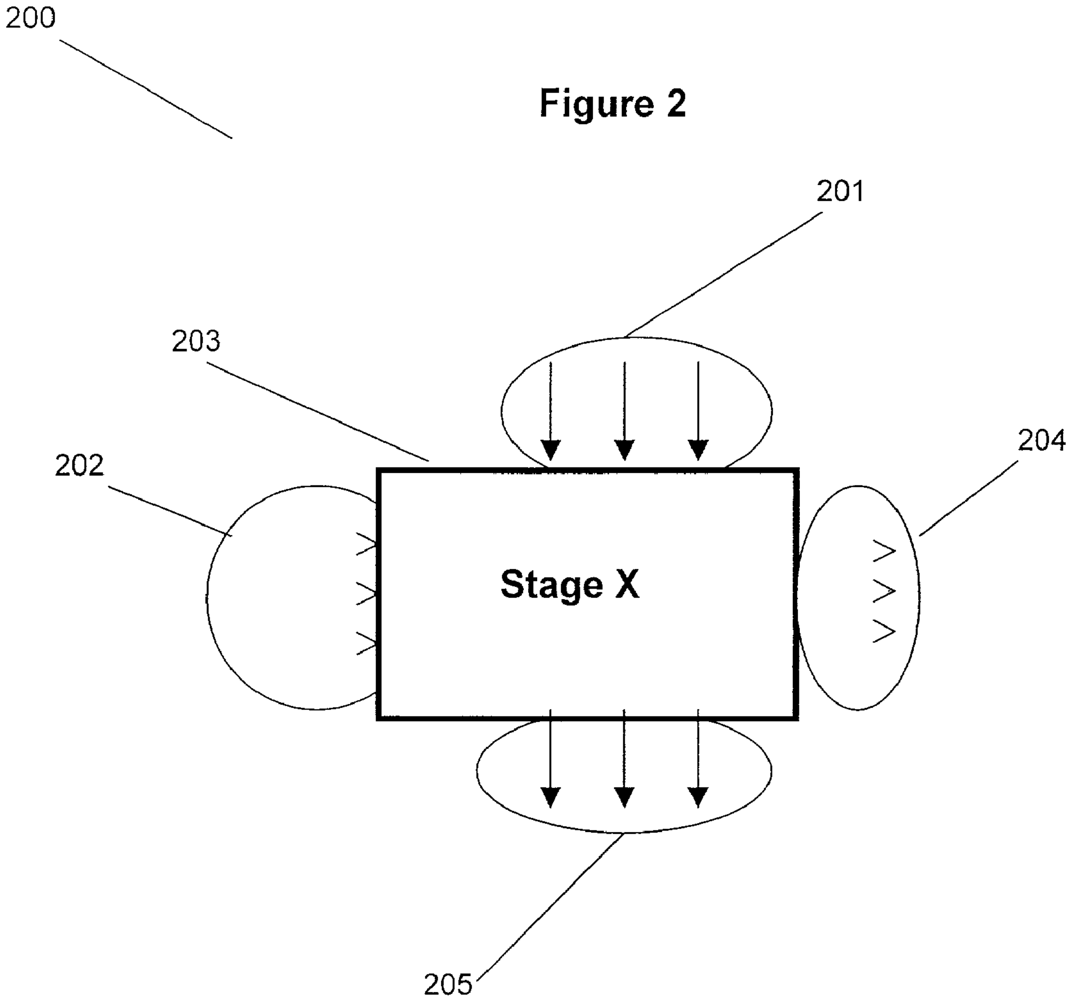
FIG. 2 illustrates a schematic diagram of a process stage, i.e. any single stage in a process.

FIG. 2 illustrates a schematic diagram of a process stage 200, i.e. any single stage in a process (such as those shown in FIG. 1) represented here as "Stage X" 203. There is measured input from "Stage X−1" 201 and measured output to "Stage X+1" 205. Also included in the process are control parameters measured by actuators at "Stage X" 202 and monitored parameters from sensors at "Stage X" 204.

Referring to FIG. 2, depicted is a typical stage of the process represented in FIG. 1, referred to in FIG. 2 as Stage X. To the left of Stage X are shown control parameters for actuators in the process conducted in Stage X; to the right of Stage X are shown sensors for monitoring parameters of the input to or output from Stage X, or the process conducted during Stage X. Actuators perform actions in the context of a specific process step. Sensors perform measurements relevant to the process. The data coming from sensors and control parameter data sent to actuators constitute fundamental dynamic aspects that are required for the purposes of process control.

Figure 2A:
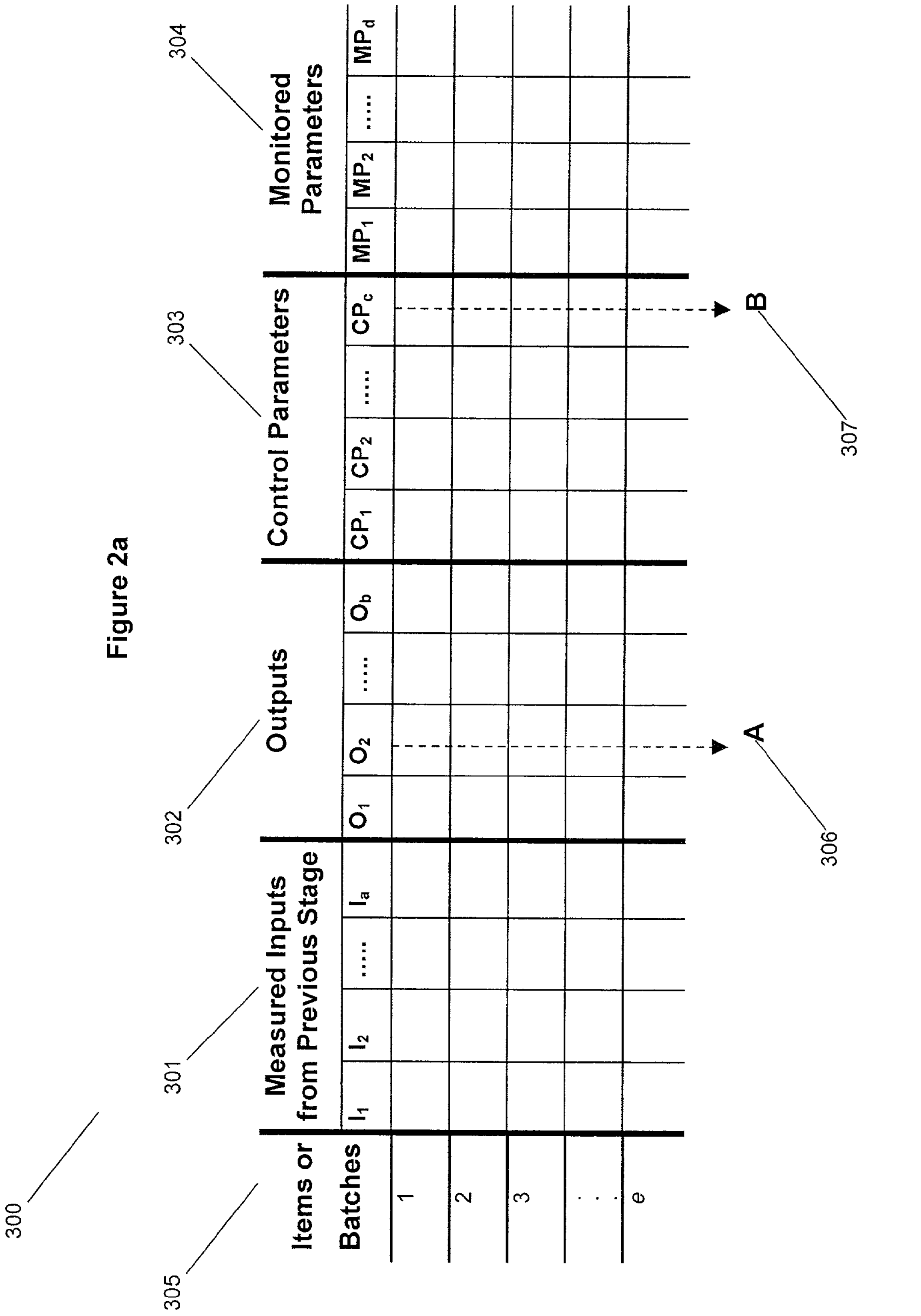
FIG. 2*a* illustrates a data set table for a given stage in a process.

FIG. 2*a* illustrates a data set table 300 for a given stage in a process. There are four families of data represented for any given number of items or batches 305 produced in the process: measured inputs from previous stage 301, outputs 302, control parameters 303, and monitored parameters 304. "Arrow A" 306 represents a data set for a process output $O_2$ at the given stage and "Arrow B" 307 represents a data set for a control parameter $CP_C$ at the given stage.

Substantially associated with every set of control parameters, monitored parameters, input, and output at any given stage in a process are data sets, as illustrated in FIG. 2*a*. The control parameters, monitored parameters, input, and output at any given stage represent four families of data sets. Within the control parameters, monitored parameters, and output families, there can be from 1 to any number of data sets. Within the input family, there can be from 0 to any number of data sets. In FIG. 2*a*, the input family has a data sets (where a is any integer greater than 0), the output family has b data sets (where b is any integer greater than 1), the control parameters family has c data sets (where c is any integer greater than 1), and the monitored parameters family has d data sets (where d is any whole number greater than 1).

A data set for the input or output families consists of quantities or measurements of that given input or output, for a given number of items or batches produced in a process. For example, arrow A in FIG. 2*a* represents a data set for $O_2$, where $O_2$ is the length of an item that is output from the given process stage, and this data is recorded for 50 times that the item is produced on a given day, where e is 50.

A typical data set for the control parameters family consists of data for a given parameter setting for an operation occurring at the given process stage, for a given number of items or batches produced in a process. For example, arrow B in FIG. 2*a* represents a data set for $CP_C$, where $CP_C$ is the pressure setting of an item produced at the given process stage, and this data is recorded for 50 times that the item is produced on a given day, where e is 50. A data set for the monitored parameters family consists of data for a given parameter monitored at the given process stage, for a given number of items or batches produced in a process.

Figure 3:
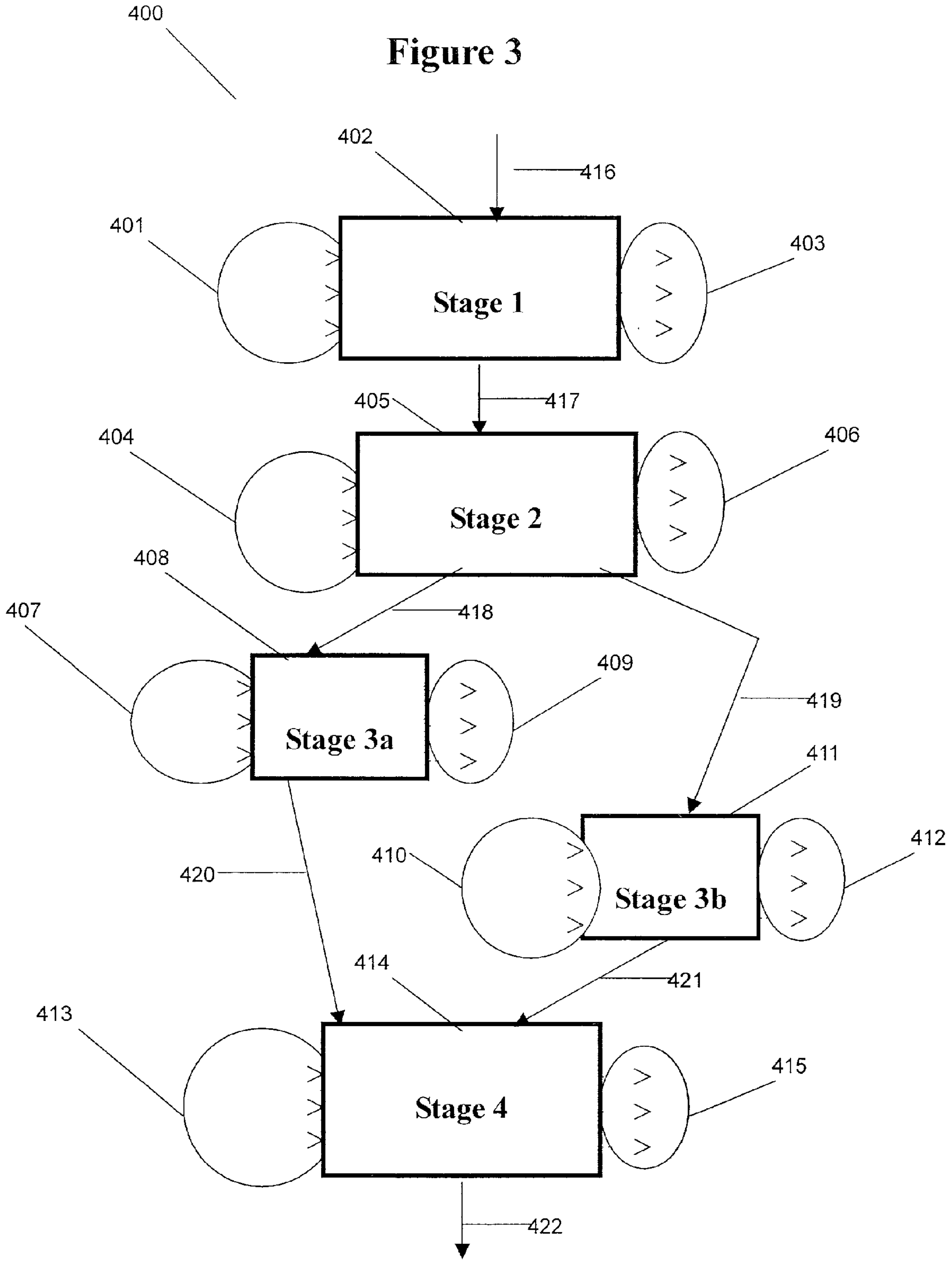
FIG. 3 illustrates a schematic diagram of the process map from FIG. 1 with control parameters and monitored parameters added to each stage in the process.

FIG. 3 (generally referenced as) 400 illustrates a schematic diagram of the process map from FIG. 1 and now added to each stage in the process are the control parameters and monitored parameters that were depicted in Stage X of FIG. 2. "Stage 1" 402 has control parameters measured by actuators 401, monitored parameters from sensors 403, initial measured input to the process 416, and measured output 417 which is measured input to "Stage 2" 405; "Stage 2" 405 has control parameters measured by actuators 404, monitored parameters from sensors 406, and measured output 418 which is measured input to "Stage 3*a*" 408; "Stage 3*a*" 408 has control parameters measured by actuators 407, monitored parameters from sensors 409, and measured output 420 which is measured input to "Stage 4" 414; "Stage 3*b*" 411 has control parameters measured by actuators 410, monitored parameters from sensors 412, measured output 421 which is measured input to "Stage 4"; and "Stage 4" 414 has control parameters measured by actuators 413, and monitored parameters from sensors 415, and measured output 422.

Referring to FIG. 3, depicted is the process map from FIG. 1, and now added to each stage in the process are the control parameters and monitored parameters that were depicted in Stage X of FIG. 2.

Figure 4:
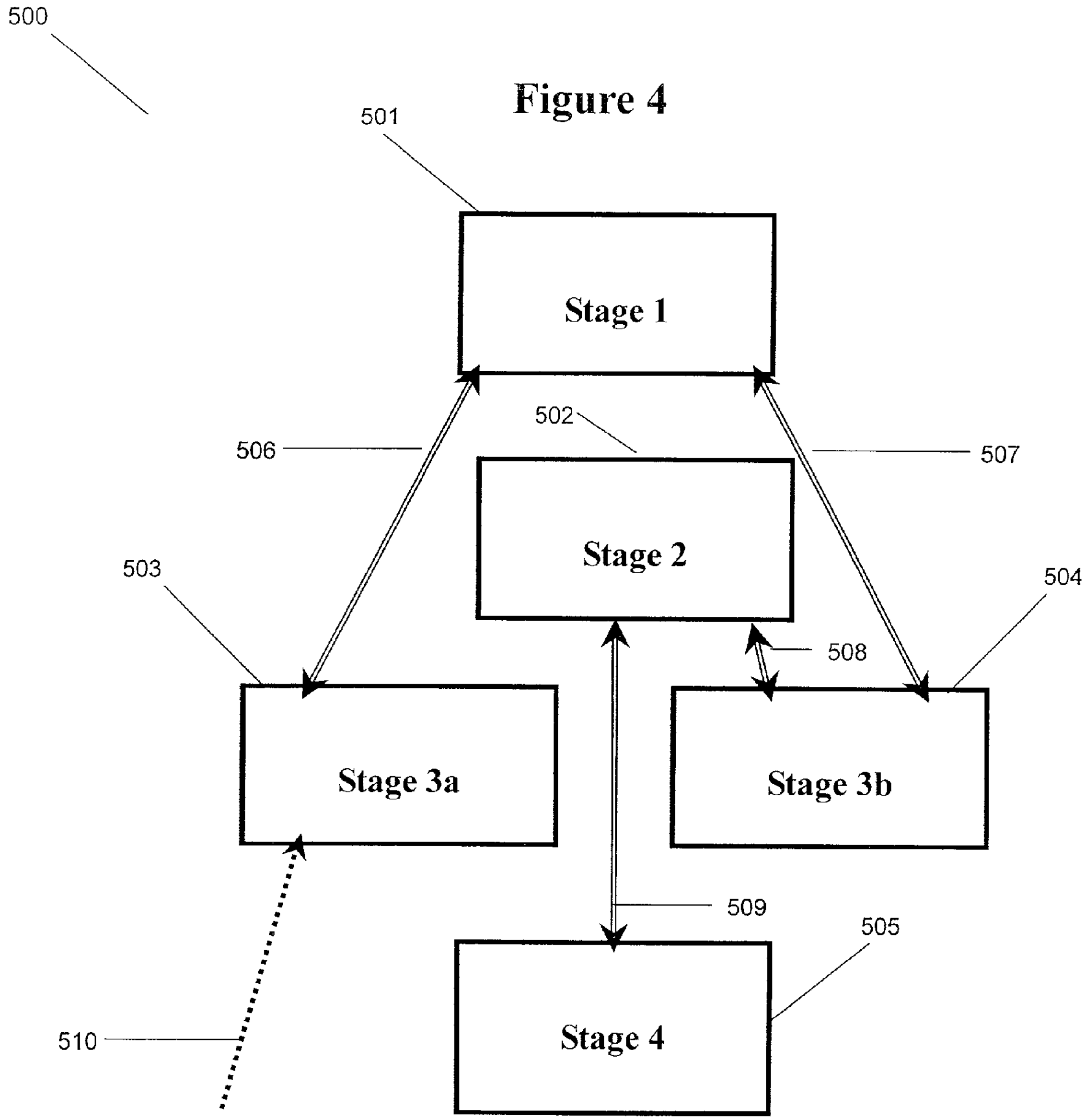
FIG. 4 illustrates a schematic diagram of interrelationships and outside influences for stages in a process.

FIG. 4 illustrates a schematic diagram of interrelationships and outside influences for stages in a process 500. "Stage 1" 501 has an interrelationship 506 with "Stage 3*a*" 503 and an interrelationship 507 with "Stage 3*b*" 504; "Stage 2" 502 has an interrelationship 508 with "Stage 3*b*" 504 and an interrelationship 509 with 509 with "Stage 4" 505. There is an outside influence 510 on "Stage 3*a*" 503.

Referring to FIG. 4, depicted is an interrelationship and outside influences map for the stages in the process map of FIG. 1. An interrelationship between two stages exists when there is alleged or validated information that when a particular control parameter or parameters are set at an earlier Stage X, a certain resulting output is received at a later Stage X+n (where n is any integer greater than 0). In FIG. 4, interrelationships exist between Stage 1 and Stages 3*a* and 3*b*, between Stage 2 and Stage 3*b*, and between Stage 2 and Stage 4. An outside influence exists when there is alleged or validated information that some factor outside of a process influences output at a given stage in the process. In FIG. 4, we see an outside influence exists on Stage 3*a*.

Figure 4A:
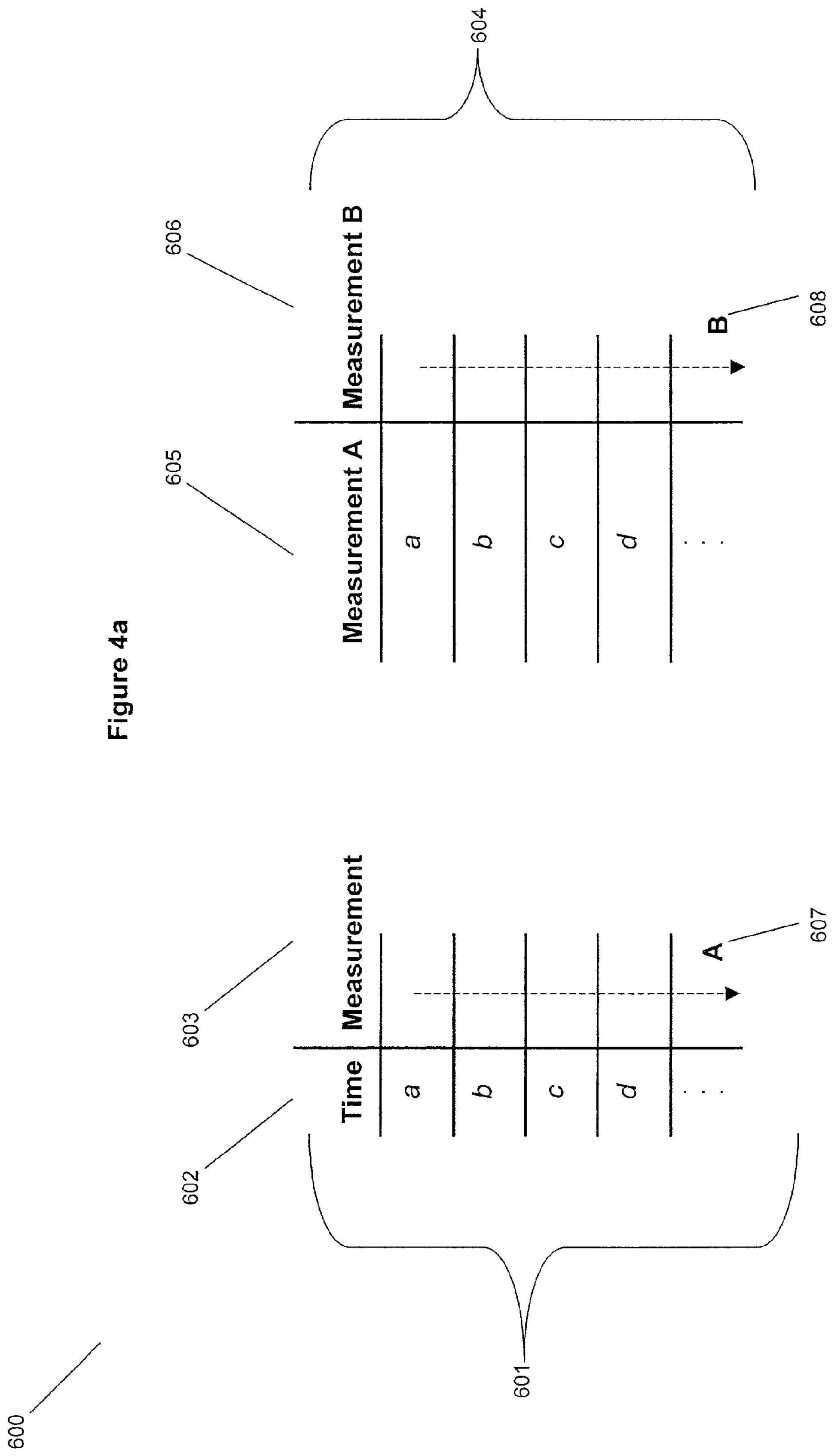
FIG. 4*a* presents two data set tables and for two types of outside influences.

FIG. 4*a* (generally referenced as) 600 presents two data set tables 601 and 604 for two types of outside influences. The first data set, represented by "arrow A" 607, consists of data for any type of metric or discrete parameter 603 monitored in a time-dependent manner 602. The second data set, represented by "arrow B" 608, consists of data for any type of metric or discrete parameter 606 monitored according to another metric scale 605.

Referring to FIG. 4*a*, like the relationships described in FIG. 2, outside influences also have data sets. Data sets for outside influences can be one of two types. The first type is data for any type of metric or discrete parameter monitored in a time-dependent manner (arrow A), when the metric or discrete parameter is either suggested to affect or confirmed to affect output at a given stage. The second type is data for any type of metric or discrete parameter monitored according to another metric scale (arrow B), when the first metric or discrete parameter is either suggested to affect or confirmed to affect output at a given stage.

Figure 5:
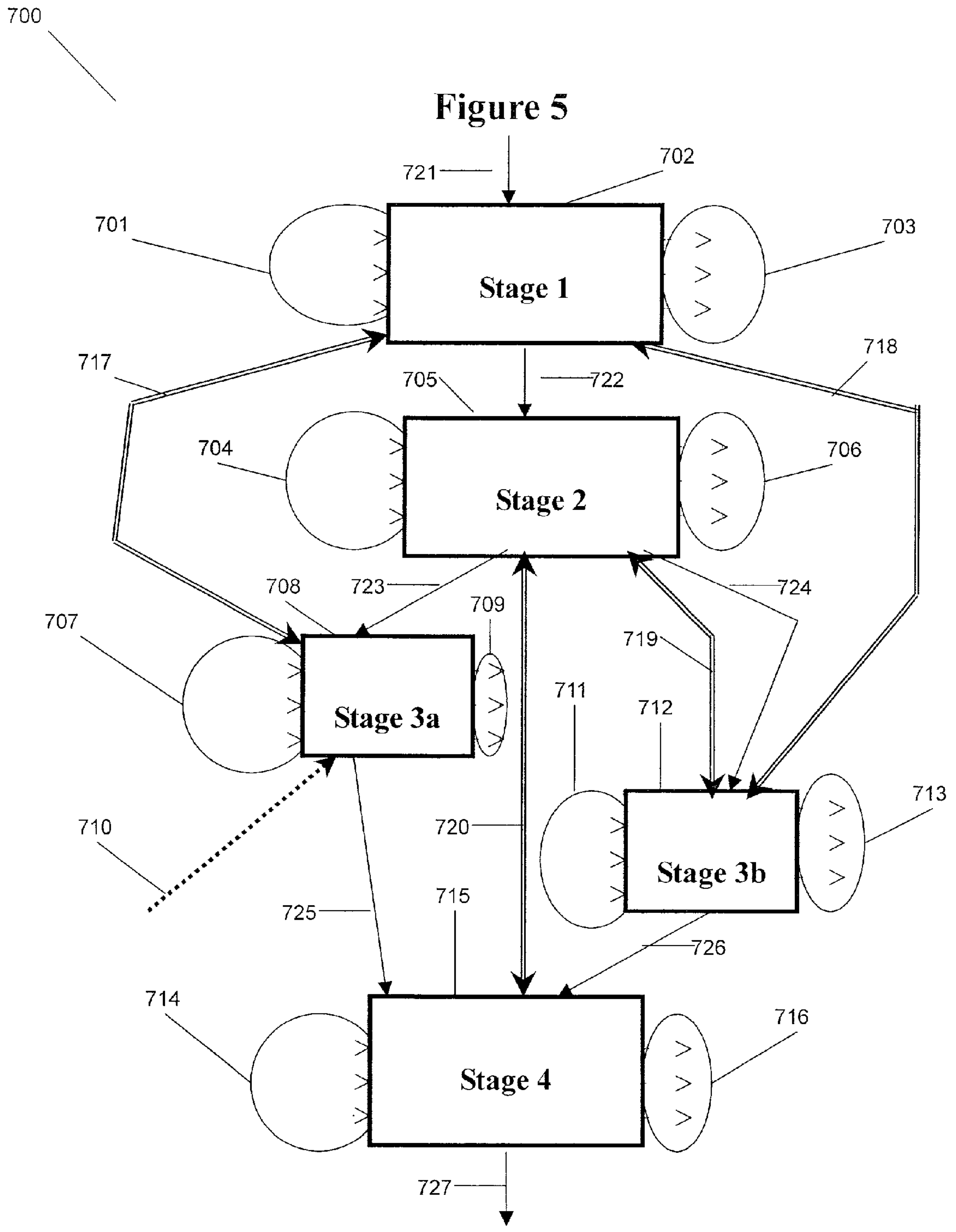
FIG. 5 illustrates a schematic diagram of the process map from FIG. 3 with the interrelationship and outside influences map of FIG. 4.

FIG. 5 (generally referenced as) 700 illustrates a schematic diagram of the process map from FIG. 3 with the interrelationship and outside influences map of FIG. 4. "Stage 1" 702 has initial measured input to the process 721, control parameters measured by actuators 701, monitored parameters from sensors 703, an interrelationship 717 with "Stage 3*a*" 708, and an interrelationship 718 with "Stage 3*b*" 712, and measured output 722 which is measured input to "Stage 2" 705. "Stage 2" 705 which has control parameters measured by actuators at "Stage 2" 704, and monitored parameters from sensors at "Stage 2" 706, an interrelationship 719 with "Stage 3*b*" 712, an interrelationship 720 with "Stage 4" 715, measured output 723 which is measured input to "Stage 3*a*" 708, and measured output 724 which is measured input to "Stage 3*b*" 712., "Stage 3*a*" 708 which has control parameters measured by actuators at "Stage 3*a*" 707, monitored parameters from sensors at "Stage 3*a*" 709, and an outside influence 710, and measured output 725 which is measured input to "Stage 4" 715. "Stage 3*b*" 712 which has control parameters measured by actuators at "Stage 3*b*" 711, and monitored parameters from sensors at "Stage 3*b*" 713, measured output 726 which is measured input to "Stage 4" 715; and "Stage 4" 715 with has control parameters measured by actuators at "Stage 4" 714, and monitored parameters from sensors at "Stage 4" 716, and measured output 727.

Referring to FIG. 5, depicted is the process map of FIG. 3 merged with the interrelationship and outside influences map of FIG. 4. The different relationships between and at stages in FIG. 5 illustrate various factors that may be involved in process control.

Figure 6:
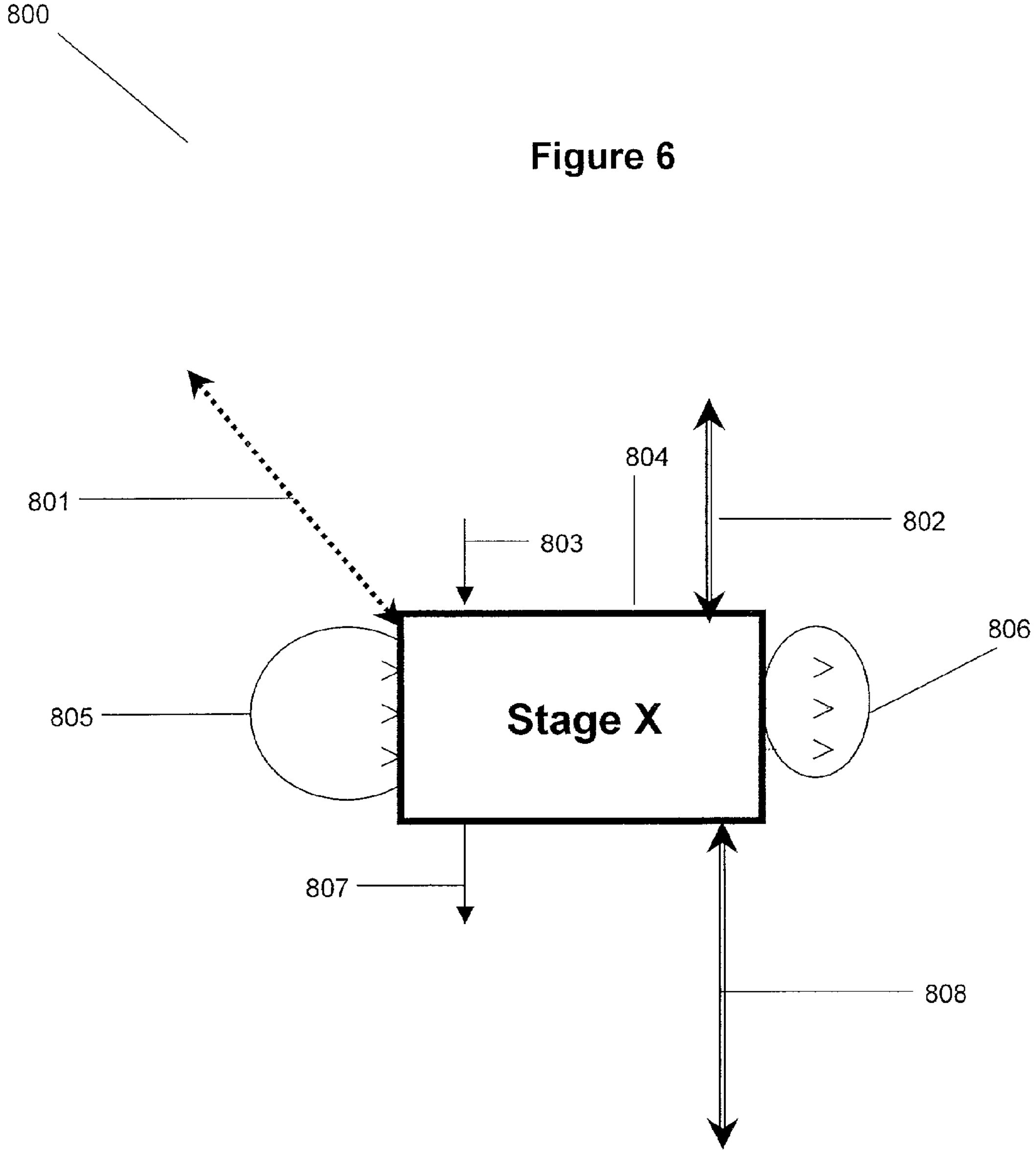

FIG. 6 (generally referenced as) 800 illustrates a schematic diagram of a process stage "Stage X" 804 with all the various process control relationships that "Stage X" participates in. These relationships include: measured input from "Stage X−1" 803, measured output to "Stage X+1" 807, an outside influence 801, control parameters measured by actuators at "Stage X" 805, monitored parameters from sensors at "Stage X" 806, an interrelationship with a process stage before "X" 802, and an interrelationship with a process stage after "X" 808.

Referring to FIG. 6, depicted is one stage in a given process, Stage X, with all of the various relevant process relationships that have been depicted in FIGS. 1-5. Stages prior to Stage X are hereinafter referred to as Stages X−1, X−2, . . . , X−n, etc. Stages following Stage X are hereinafter referred to as Stages X+1, X+2, . . . , X+n, etc. Stages which may be substantially simultaneous to Stage X can be arbitrarily assigned the nomenclature X−1 or X+1. FIG. 6 illustrates various process control relationships in which Stage X participates.

Figure 7:
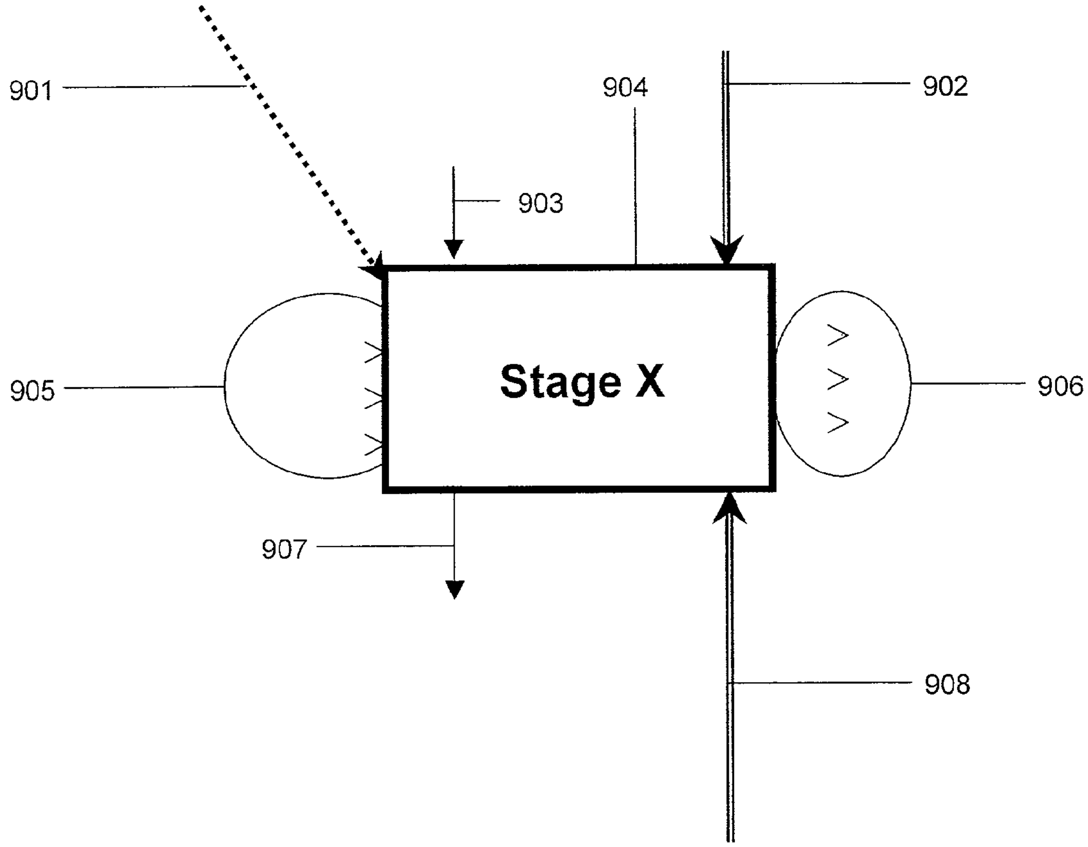
FIG. 7 illustrates a schematic diagram of "Stage X" with process control relationships that are relevant to applying process control only at "Stage X"

FIG. 7 (generally referenced as) 900 illustrates a schematic diagram of "Stage X" 904 with process control relationships that are relevant to applying process control only at "Stage X". These relationships include: measured input from "Stage X−1" 903, measured output to "Stage X+1" 907, an outside influence 901, control parameters measured by actuators at "Stage X" 905, monitored parameters from sensors at "Stage X" 906, an interrelationship with a process stage before "X" 902, and an interrelationship with a process stage after "X" 908.

Figure 8:
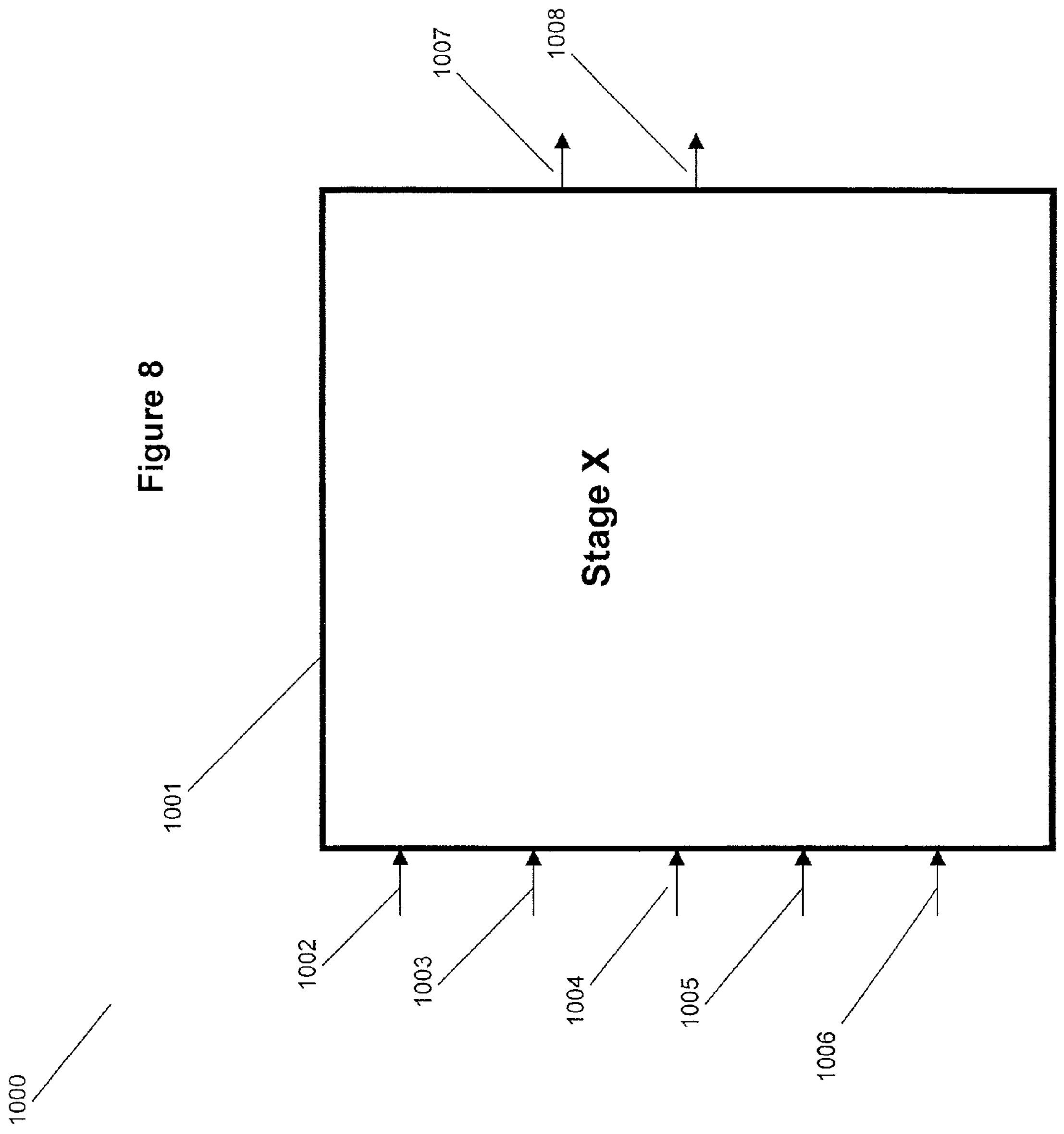
FIG. 8 illustrates a schematic diagram of a process control algorithm standard frame of reference for Stage "X" in a process.

FIG. 8 (generally referenced as) 1000 illustrates a schematic diagram of a process control algorithm standard frame of reference for Stage "X" in a process 1000. The relevant factors herein are: control parameter(s) 1002, input from "Stage X−1" 1003, interrelationship(s) with stage(s) before "X" 1004, interrelationship(s) with stage(s) after "X" 1005, outside influence(s) 1006, with the resultant output to "Stage X+1" 1007, and monitored parameters from sensors 1008.

Referring to FIG. 7, FIG. 7 depicts Stage X with relationships relevant to applying process control only at Stage X.

Referring to FIG. 8, FIG. 8 takes the relationships depicted in FIG. 7 and presents them from the perspective of how to implement an algorithm for standard process control at Stage X, and what factors must be considered when implementing that algorithm.

The following figures more specifically relate to benefits of the present invention above those that can be achieved from the vantage of the prior art. For example, it will be appreciated, from the forthcoming figures and description, that the method of the present invention relates to process control for a juncture in a process wherein there are no a priori notions regarding predominant influences to the process at that juncture. Furthermore, that process control recipes can be found, calculated or chosen using decision criteria that could not be directly articulated using prior art methods. More specifically, the present invention leads to the development of a well-defined search-space or ensemble of process control vectors whereby multiple goal optimizations may be realized.

Figure 9:
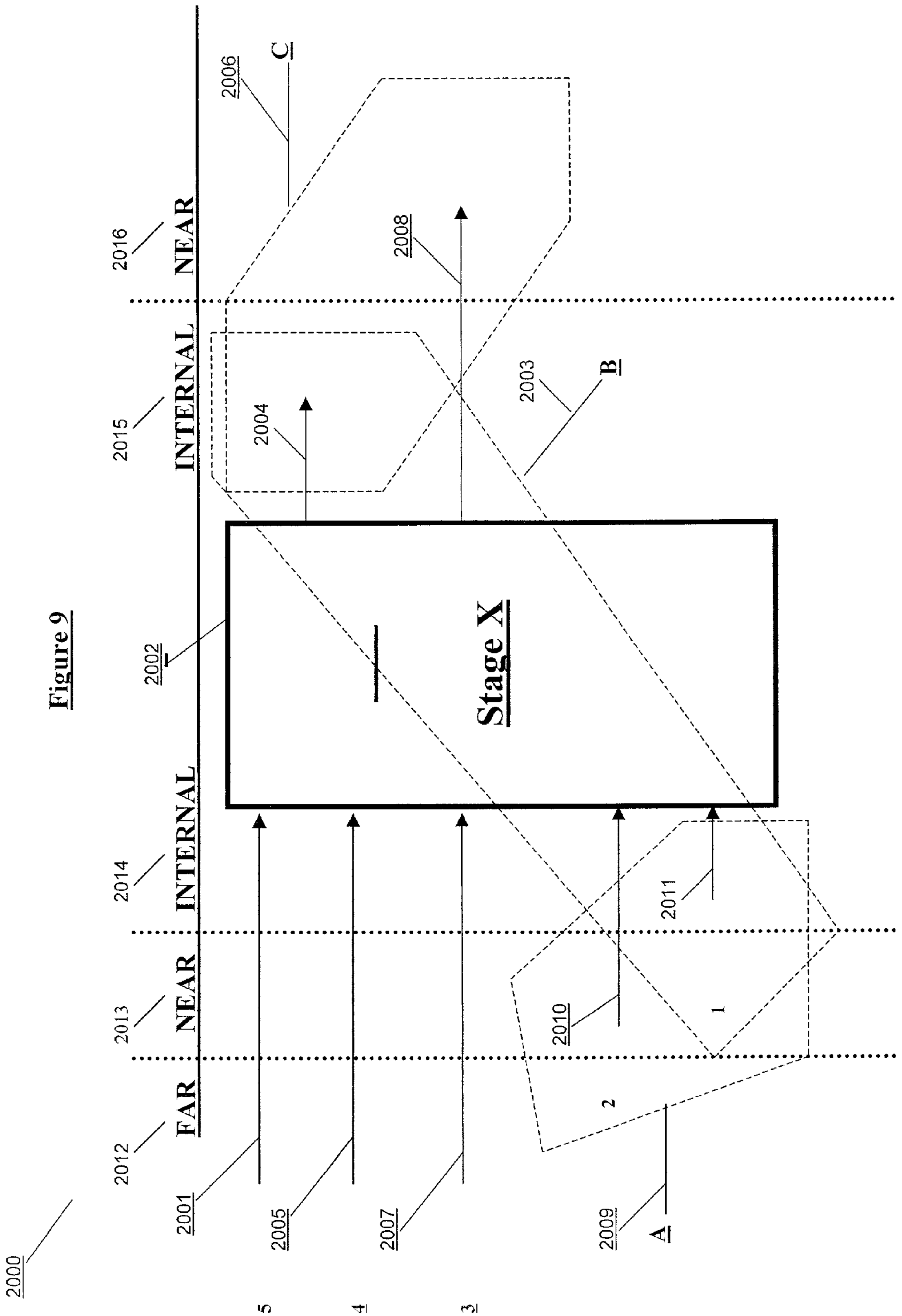
FIG. 9 illustrates the relative importance according to classical thinking, per se, of relationships relevant to applying process control at Stage X.

FIG. 9 (generally referenced as) 2000 illustrates the relative importance according to classical thinking, per se, of relationships relevant to applying process control at Stage X 2002. These relationships include: control parameter(s) 2011 which are "internal" 2014; input from "Stage X−1" 2010 which is "near" 2013; interrelationship(s) with stage(s) before "X" 2007, interrelationship(s) with stage(s) after "X" 2005, and outside influence(s) 2001 which are all "far" 2012; monitored parameters 2004 which are "internal" 2015; and output to "Stage X+1" 2008 which is "near" 2016. Polygons "A" 2009, "B" 2003, and "C" 2006" depict the standard types of relationships that are examined when applying standard process control at Stage X. The polygons: "A" 2009, "B" 2003, "C" 2006 show types of relationships between Input from "Stage X−1", Control Parameter(s), Monitored Parameters from sensors 2004 (of Internal 2015) and the Output to "Stage X+1" 2008 (of Near 2016) which are examined when applying process control at "Stage X".

FIG. 9 illustrates the relative importance according to classical thinking, per se, of relationships relevant to applying process control at Stage X. Relative importance is classically determined by the proximity of a relationship to Stage X. That is, the closer the relationship, the greater significance is attributed to it when implementing process control at Stage X. Relationships labeled INTERNAL (control parameters) have the greatest significance, relationships labeled NEAR (input from Stage X−1) have the next greatest significance, and relationships labeled FAR (interrelationships with stages before X, interrelationships with stages after X, and outside influences) have the least significance. Within the FAR relationships, interrelationships with stages before X have the greatest significance, interrelationships with stages after X have the next greatest significance, and outside influences have the least significance.

Polygons A, B, and C in FIG. 9 depict the standard types of relationships that are examined when applying standard process control at Stage X. That is, standard process control at Stage X looks for a correlation between the input from Stage X−1 and control parameters at Stage X (polygon A), a correlation between control parameters at Stage X and the monitored parameters at Stage X (polygon B), and a correlation between monitored parameters at Stage X and the output to Stage X+1 (polygon C).

At this juncture, some additional notes about nomenclature are appropriate. Constants relate to measurements that reflect physical aspects measured in a process; such as weight of an object coming into a process juncture, height of an object coming out of a process juncture, etc. In this sense, constants are constraints that are outside of the scope of control of the process control engineer. Therefore, even though these aspects are called constants, on an item-to-item basis they may contribute to describing a broad distribution of values. For example, each egg that arrives at an egg-sorting machine has a specific size and weight that is constant for that egg. Nevertheless, one can describe a distribution of weights and sizes for eggs arriving at the sorter. Variables relate to aspects of the process at the process juncture that may be elected by command of a process control engineer, or by his proxy in the form of process control software (such as that of the present invention) setting process control parameters at the process juncture.

Figure 10:
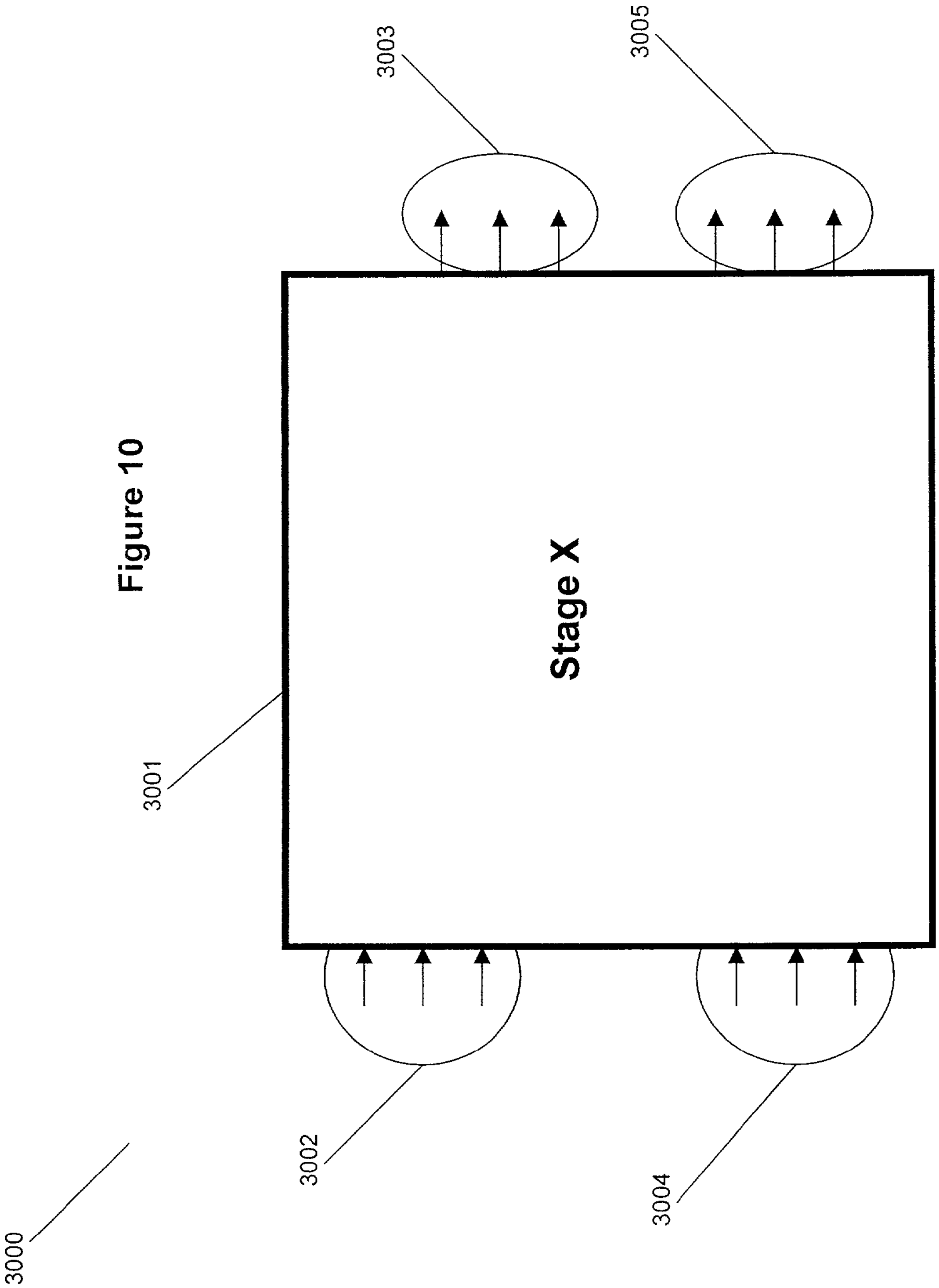
FIG. 10 illustrates a simple schematic diagram of the various process control input and output relationships of FIGS. 8 and 9 in terms of constants and variables.

FIG. 10 (generally referenced as) 3000 illustrates a simple schematic diagram of the various process control input and output relationships of FIGS. 8 and 9 in terms of constants and variables, which is the way an embodiment of the present invention addresses process control at "Stage X" 3001. An Interconnection Cell (according to an embodiment of the present invention) 3000 at process "Stage X" 3001, and its constant/variable relationships. These relationships include: input constant(s) 3002, input variables 3004, output constants 3005, and monitored parameters 3003; and by calculating a correlation coefficient between it and an Output Constant(s) 3005. As well, ideally, there should be no discrepancy between Input Variable(s) i.e. Control Parameters 3004 and their output values i.e. Monitored Parameter(s) 3003.

Referring to FIG. 10, FIG. 10 displays the various process control input and output relationships of FIGS. 8 and 9 in terms of constants and variables, which is the way an embodiment of the present invention addresses process control at Stage X. In the present invention, there are no a priori notions regarding predominant influences at Stage X. The input constants in FIG. 10 consist of interrelationships that Stage X has with other stages (before or after Stage X), outside influences, and input from Stage X−1. Input variables consist of control parameters at Stage X. Constants and variables can further be understood in terms of data sets. That is, each constant or variable is one of the types of data sets described in FIGS. 2*a* and 4*a*. The influences on Stage X numbered 2-5 in FIG. 9 are depicted in FIG. 10 as having equal potential significance until empirical weighting proves otherwise. It should be noted that this facilitates a significant departure from the normal means of standard process control, where relative importance is classically determined by the proximity of a relationship to Stage X as depicted in FIG. 9.

In the context of the present invention, the process stage and constant/variable relationships depicted in FIG. 10 are referred to as an interconnection cell. At the highest level of resolution and in the preferred conception, the interconnection cell represents a single process stage, hereinafter a tool. An interconnection cell can also represent two (or more) contiguous stages in a process, hereinafter a module. Further, an interconnection cell can represent a plurality of discontiguous stages, hereinafter a virtual module, or a plurality of contiguous or discontiguous modules.

According to an embodiment of the present invention, an algorithm is used to determine validity of input constants by calculating a correlation coefficient between an input constant with an output constant. This algorithm may be any well-known and accepted algorithm for calculating a correlation coefficient between two data sets, or any algorithm that produces a substantially equivalent result. We will use the convention that a high correlation coefficient (i.e. a number with an absolute value close to 1 on the scale of 0 to 1) means that the input constant has a relatively valid relationship with an output constant at Stage X and should be considered when implementing process control at Stage X for that output constant. Likewise, we will use the convention that a low correlation coefficient means that there is relatively no valid relationship between the input constant and the output constant at Stage X. It is often desirable in process control to consider the most valid relationships to process stages. The choice of how many relationships and which relationships is partially determined by computational capacity and partially determined by data availability.

Those input constants that were found to have high correlation coefficients with output constants at Stage X, together with the input variables at Stage X, serve as an input set combination for carrying out process control optimization at Stage X with preferred embodiments of the present invention. This input set combination is the basis for carrying out process control optimization at Stage X with the preferred embodiments of the present invention.

In addition, according to an embodiment of the present invention, an algorithm is used to determine correlation coefficients for input variables (i.e. control parameters at Stage X) with monitored parameters at Stage X. Ideally, the correlation coefficient should have a value of 1.0, meaning that there is no discrepancy between control parameters and their monitored output values. A deteriorating correlation coefficient for an input variable with its corresponding monitored parameter means that intended values for control parameters are not properly received or implemented at Stage X and that serious correction is needed.

While the many embodiments of the present invention can be used for improving the yield of Stage X according to relationships between input variables and monitored parameters, the immediately following discussion will deal with the issue of process control for Stage X without addressing the issues of discrepancies between input variables and monitored parameters.

Boundary Values

It is an object of Stage X to achieve a maximum measurable output yield. In order to do this, embodiments of the method of the present invention can be implemented in one of two general manners. The more straightforward embodiment focuses on assigning boundary values to the input constants and variables of the input set combination at Stage X to optimize yield for a given output constant at Stage X yield. Another, more convoluted embodiment first assigns boundary values to output constants, then uses an analysis according to output boundary values in order to assign boundary values to the input set combination at Stage X constants.

The more convoluted embodiment first considers assigning at least one boundary value to at least one dividing data for data set of output constant data set and thereby forming at least two discrete sub-sets into at least two discrete sub-sets, and then discovering how to assign boundary values to the input set combination at least one input data set by analyzing portions of the input set(s) one or more data sets in the input set combination that contributed to each of the discrete subsets or to more than one of the discrete subsets. Once the contributing portions of the input data sets have been discovered, then the more simple straightforward methods, for assignment of boundary values to input constants and variables, may be applied. A simple example should suffice to disclose this convolution. A data set of an output constant (for a process juncture) shows a clear bimodal distribution of measured articles being manufactured at that juncture. Accordingly, a boundary value is assigned to the minima between the two apparent modes of the distribution. A data set for an input constant associated with this same juncture shows a relatively uniform "flat" distribution of variation. When the two modes of the output set are "reverse projected" back from this input set, one discloses three discrete regions. A first region that resulted in the first output mode, a second region that resulted in the second output mode, and a third region that resulted from elements contributed from both modes. Accordingly, one resultant idea for assigning boundary values to this input set combination would be according to these three disclosed regions.

The following discussion will deal with the more simple straightforward methods for assignment of boundary values to input constants and variables in the input set combination, and with uses thereof.

There are also variations of the more straightforward embodiment for optimizing output yield, wherein boundary values are assigned to: 1) input constants only, 2) input constants and monitored parameters together, 3) input constants, input variables, and monitored parameters together 4) input variables only, 5) monitored parameters only, and 6) input variables and monitored parameters together. Likewise, there are variations of the more convoluted embodiment, wherein boundary values are assigned to: 1) output constants and input variables, 2) output constants and monitored parameters, and 3) output constants, input variables, and monitored parameters. Furthermore, monitored values for some purposes are considered a preliminary output value, for other purposes it is a supplement to input values. However, most often monitored values are used as a corrective feedback to maintain desired input variable values.

Boundary values can be determined and assigned according to various criteria. More specifically, the selection of boundary values may significantly affect the quality of results achieved by using the method of the present invention. In some circumstances, selection of a boundary value is done subjectively by a process control engineer according to his judgment and experience. Other times, boundary values are selected according to specifications inherent to the actual goals of the process. More often, boundary values are set according to measurable characteristics of the population of values in a given data set.

Figure 10A:
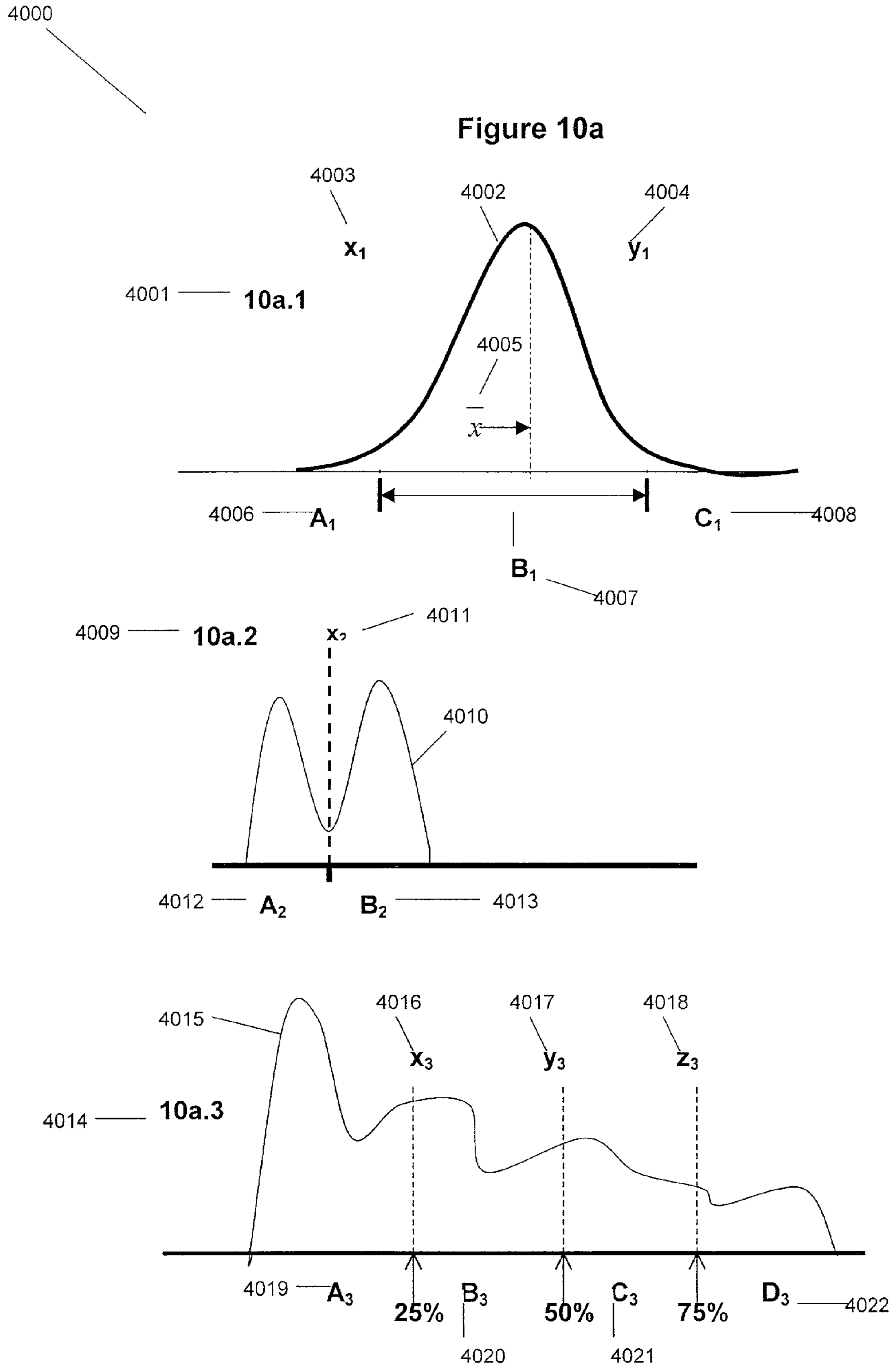
FIG. 10*a* illustrates the assignment of boundary values to three inputs represented by diagrams 10*a*.1, 10*a*.2, and 10*a*.3.

FIG. 10*a* (generally referenced as) 4000 illustrates the assignment of boundary values to three inputs represented by diagrams 10*a*.1 (generally referenced as) 4001, 10*a*.2 (generally referenced as) 4009, and 10*a*.3 (generally referenced as) 4014. Diagram 10*a*.2 (generally referenced as) 4009 in FIG. 10*a* (generally referenced as) 4000 illustrates the assignment of one boundary value $x_2$ 4011 to a population of data measurements for an input, where the population of data measurements divides according to a bimodal distribution curve 4010. $A_2$ 4012 represents the lower boundary value range for this input and $B_2$ 4013 represents the upper boundary value range for this input.

A simple example of an input constant with one assigned boundary value is an egg-sorting machine that sort eggs according to egg diameter. In such a case, a boundary value of 2.50 cm is set as the minimum diameter for eggs to be cleaned and boxed for the consumer market. An egg with a diameter of less than 2.50 cm will be sent to the frozen egg line to be frozen and used for powdered eggs. Another example of an input constant or variable with one boundary value is illustrated in diagram 10*a*.2 of FIG. 10*a*. The population of data measurements from some process is shown in the figure. This population substantially divides according to an obvious bimodal distribution. Line $x_2$ indicates the minimum value between two modes. This minimum value is a boundary value for the input constant, and $A_2$ represents the range of input values less than the boundary value represented by line $x_2$ The range of input values represented by $A_2$ is referred to as a boundary value range. Similarly, $B_2$ represents the boundary value range of input values greater than or equal to the boundary value represented by line $x_2$ Diagram 10*a*.1 (generally referenced as) 4001 in FIG. 10*a* (generally referenced as) 4000 illustrates the assignment of two boundary values $x_1$ 4003 and $y_1$ 4004 to a population of data measurements for an input, where the population of data measurements divides according to normal distribution curve 4002. The average of this normal distribution is represented by $\bar{x}$ 4005. $A_1$ 4006 represents the lower boundary value range for this input, $B_1$ 4007 represents the in-specification boundary value range for this input, and $C_1$ 4008 represents the upper boundary value range for this input.

An example of an input variable with two boundary values could be the percentage of salinity in sardines. Consumer engineers determine that a range of 7%-9% salinity in sardines is an acceptable range for consumer tastes. Thus, 7% and 9% are the assigned boundary values. Sardines produced with a salinity percentage that falls within that range are considered acceptable, and percentages below or above that range are respectively unacceptable. Another example of an input constant or variable with two boundary values is illustrated in diagram 10*a*.1 of FIG. 10*a*. The population of data measurements from some process is shown in the figure. This population substantially divides according to an obvious normal distribution. Line $x_1$ represents a lower boundary value of $\bar{x}-2\sigma$ and line $y_1$ represents an upper boundary value of $\bar{x}+2\sigma$. $A_1$ represents the boundary value range of input values less than $\bar{x}-2\sigma$, $B_1$ represents the boundary value range of input values between $\bar{x}-2\sigma$ and $\bar{x}+2\sigma$ inclusively, and $C_1$ represents the boundary value range of input values greater than $\bar{x}+2\sigma$. Input values within the $B_1$ range are considered within a specification range, input values within the $A_1$ range are considered below the specification range, and input values within $C_1$ range are considered above the specification range.

Diagram 10*a*.3 (generally referenced as) 4014 in FIG. 10*a* (generally referenced as) 4000 illustrates the assignment of three boundary values $x_3$ 4016, $y_3$ 4017, and $z_3$ 4018 to a population of data measurements for an input, where the population of data measurements divides according to a decaying distribution curve 4015. $A_3$ 4019 represents the lowest boundary value range for this input, $B_3$ 4020 represents the next lowest boundary value range for this input, $C_3$ 4021 represents the second highest boundary value range for this input, and $D_3$ 4022 represents the highest boundary value range for this input.

Diagram 10*a*.3 in FIG. 10*a* depicts an input constant or variable with three boundary values. The population of data measurements from some process is shown in the figure. This population substantially divides according to an obvious decaying distribution. According to one judgment, the boundary values have been determined according to 25% of the total population in the distribution ($x_3$), 50% of the total population in the distribution ($y_3$), and 75% of the total population in the distribution ($z_3$). For example, if 1,000 measurements are represented in diagram 10*a*.3, then $A_3$ represents the boundary value range of the lowest 250 measurements below a boundary value $x_3$, $B_3$ represents the boundary value range of the next 250 measurements between boundary values $x_3$ and $y_3$, $C_3$ represents the boundary value range of the next 250 measurements between boundary values $y_3$ and $z_3$, and $C_3$ represents the boundary value range of the 250 highest measurements above the boundary value $z_3$.

According to another judgment, the boundary values in diagram 10*a*.3 have been determined according to 25% of the total of the possible domains of measurements with equidistant segments in the distribution ($x_3$), 50% of the total of the possible domains of measurements with equidistant segments in the distribution ($y_3$), and 75% of the total of the possible domains of measurements with equidistant segments in the distribution ($z_3$). For example, the domain allows measurements between 0% and 100% mixtures of two materials. Therefore, the measurements can never have a value less than 0% or greater than 100%. While it is understood that this value has a significant effect on the process, there is no a priori understanding of what the preferred range for this value should be in order to optimize the yield from the process. Therefore, the measurement scale is divided into the following boundary value ranges: $A_3$ representing the range from 0-25%, $B_3$ representing the range from 25-50%, $C_3$ representing the range from 50-75%, and $D_3$ representing the range from 75-100%.

It should be clear that the use of boundary values and boundary value ranges are used in the context of the present invention as a means to create discrete values for data with values that fall within a continuous range. However, certain types of input constants and variables by their inherent nature have values that fall within a discrete range. For example, parallel tools in a given process are discrete values and can be considered as input. Assume that a given process has three parallel tools, where process input flows into any one of the three tools and the same types of input constants and variables exist at each tool. For the purposes of process control, it has been decided to monitor into which tool process input flows and that the tool location at this parallel stage is to be considered as an input to the process. The three parallel tools are therefore categorized by the discrete values A, B, and C. For the purposes of the present invention, these discrete values are applied in the same manner as boundary value ranges.

In the event that there are large numbers of values in a discrete range, then the equivalent of boundary values can be applied; thereby forming discrete groups.

It should be noted that the ability for this embodiment of the present invention to use input data whose values fall into either continuous or discrete ranges is a versatile feature; as methods of standard process control today are primarily designed to handle input data whose values fall only within a continuous range, while methods for handling input data whose values fall only within a discrete range are less common. However, methods of process control for dealing with both input values in a continuous range and input values in a discrete range such as this embodiment of the present invention are potentially of great use in countless diverse applications.

Data Vectors and the Vector Look-Up Table

An embodiment of the present invention uses the boundary value ranges assigned to input constants and variables to form data vectors for a given stage in a process. Each input constant or variable is a component entry of the vector. Given the inputs depicted in the three diagrams in FIG. 10*a* and their respective boundary values, it is seen that the following 24 data vectors exist for the output produced by the inputs depicted in FIG. 10*a*: $\{(A_1, A_2, A_3), (A_1, A_2, B_3), (A_1, A_2, C_3), (A_1, A_2, D_3), (A_1, B_2, A_3), (A_1, B_2, B_3), (A_1, B_2, C_3), (A_1, B_2, D_3), (B_1, A_2, A_3), (B_1, A_2, B_3), (B_1, A_2, C_3), (B_1, A_2, D_3), (B_1, B_2, A_3), (B_1, B_2, B_3), (B_1, B_2, C_3), (B_1, B_2, D_3), (C_1, A_2, A_3), (C_1, A_2, B_3), (C_1, A_2, C_3), (C_1, A_2, D_3), (C_1, B_2, A_3), (C_1, B_2, B_3), (C_1, B_2, C_3), (C_1, B_2, D_3)\}$ Referring again to FIG. 10*a*, for the sake of example, assume that 10*a*.1 represents an input constant, and that 10*a*.2 and 10*a*.3 represent input variables at a given stage in a process. The boundary values for 10*a*.1 are $x_1$=24.98 mm and $y_1$=25.02 mm, where $B_1$ is the preferred boundary value range for values between 24.98-25.02 mm inclusively, $A_1$ is the boundary value range for values less than 24.98 mm, and $C_1$ is the boundary value range for values greater than 25.02 mm. For 10*a*.2, there is one boundary value $x_2$=10.00 mm. $A_2$ is the boundary value range for values less than or equal to 10.00 mm, and $B_2$ is the boundary value range for values greater than 10.00 mm. For 10*a*.3, there are three possible boundary values, denoted $x_3$, $y_3$, and $z_3$ $A_3$, $B_3$, $C_3$, and $D_3$ represent four possible boundary value ranges for the height of an item. The possible range of the height of the item varies from 0.00 mm to 10.00 mm. $A_3$ is the boundary value range for values greater than 0.00 mm and up to and including 2.50 mm, $B_3$ is the boundary value range for values greater than 2.50 mm and up to and including 5.00 mm, $C_3$ is the boundary value range for values greater than 5.00 mm and up to and including 7.50 mm, and $D_3$ is the boundary value range for values greater than 7.50 mm and up to and including 10.00 mm.

Figure 10B:
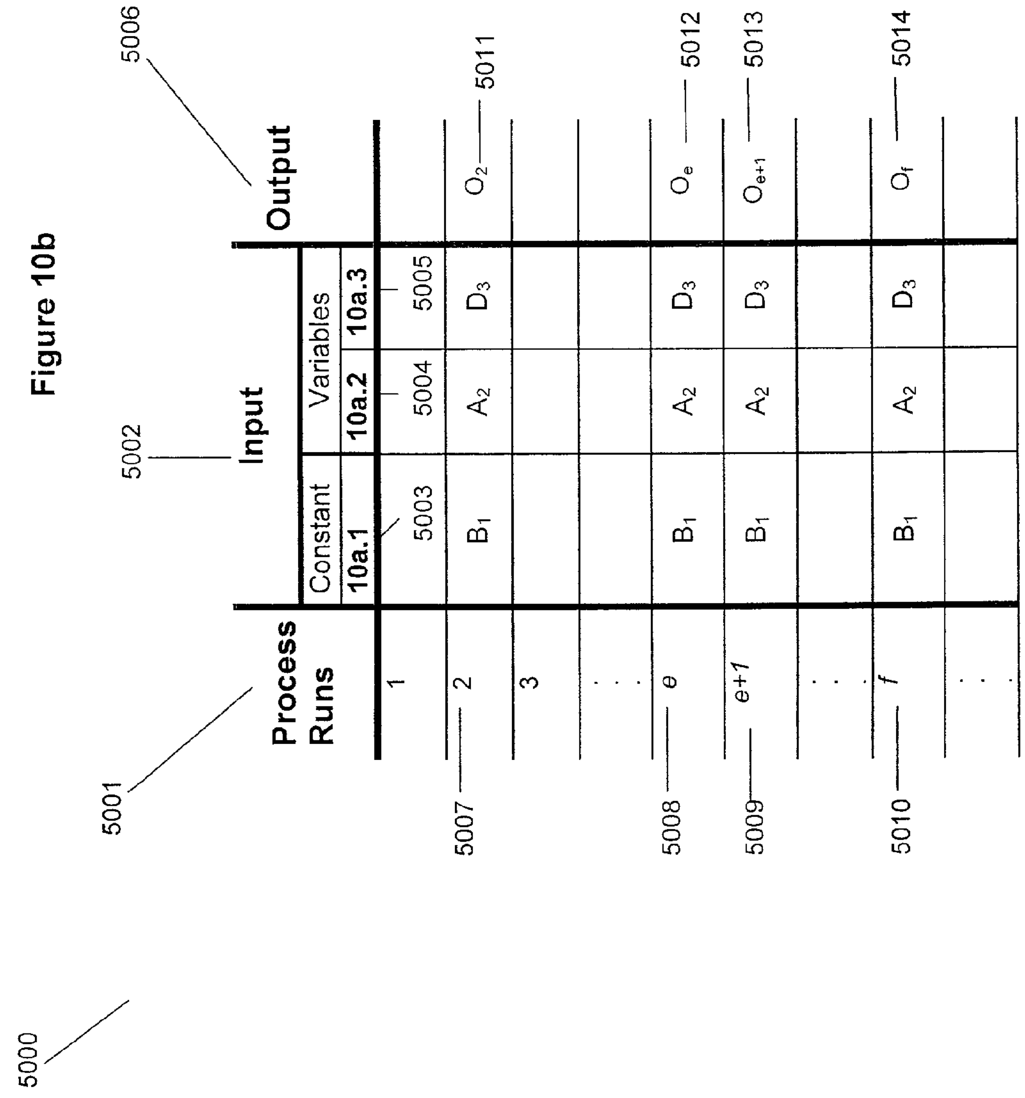
FIG. 10*b* illustrates a table of data arrays for a given stage in a process.

FIG. 10*b* illustrates a Data Arrays table of data arrays 5000 for a given stage in a process. The table is composed of a column for the number of the process run 5001, columns for process input 5002, and a column for a given process output constant 5006. The inputs at this process stage are input constant 10*a*.1 5003, input variable 10*a*.2 5004, and input variable 5005. Values for these inputs corresponding to the data vector $(B_1, A_2, D_3)$ are received at the second process run 5007, the $e^{th}$ process run 5008, the $e+1^{th}$ process run, and the $f^{th}$ process run. The value for the given output constant for the second process run is $O_2$ 5011, the value for the given output constant for the $e^{th}$ process run is $O_e$ 5012, the value for the given output constant for the $e+1^{th}$ process run is $O_{e+1}$ 5013, and the value for the given output constant for the $f^{th}$ process run is $O_f$ 5014; also ith Inputs 5002: input constant "10*a*.1" 5003, input variables "10*a*.2" 5004 and "10*a*.3" 5005 and their respective Output values 5006 make up a data array for any given Process Run(s) 5001.

If we received values of 25.01 mm for 10*a*.1, 9.98 mm for 10*a*.2, and 8.00 mm for 10*a*.3, this data corresponds to the vector $(B_1, A_2, D_3)$, according to the assigned boundary values. Referring to FIG. 10*b*, assume that the process is executed n times, and that after assigning boundary values to the data received for 10*a*.1, 10*a*.2, and 10*a*.3, values corresponding to the vector $(B_1, A_2, D_3)$ are received for process runs 2, e, e+1, and f where e is an integer whole number greater than 3 and f is an whole number integer greater than e+1 and less than or equal to n. The values $O_2$, $O_e$, $O_{e+1}$, and Of represent the output values received for a given output constant for process runs 2, e, e+1, and f respectively at the given stage in the process. The data received for any given process run, such as the value for input constant 10*a*.1 at run 2, the values for input variables 10*a*.2 and 10*a*.3 at run 2, and the value $O_2$ for the output at run 2, are referred to as a data array.

Figure 10C:
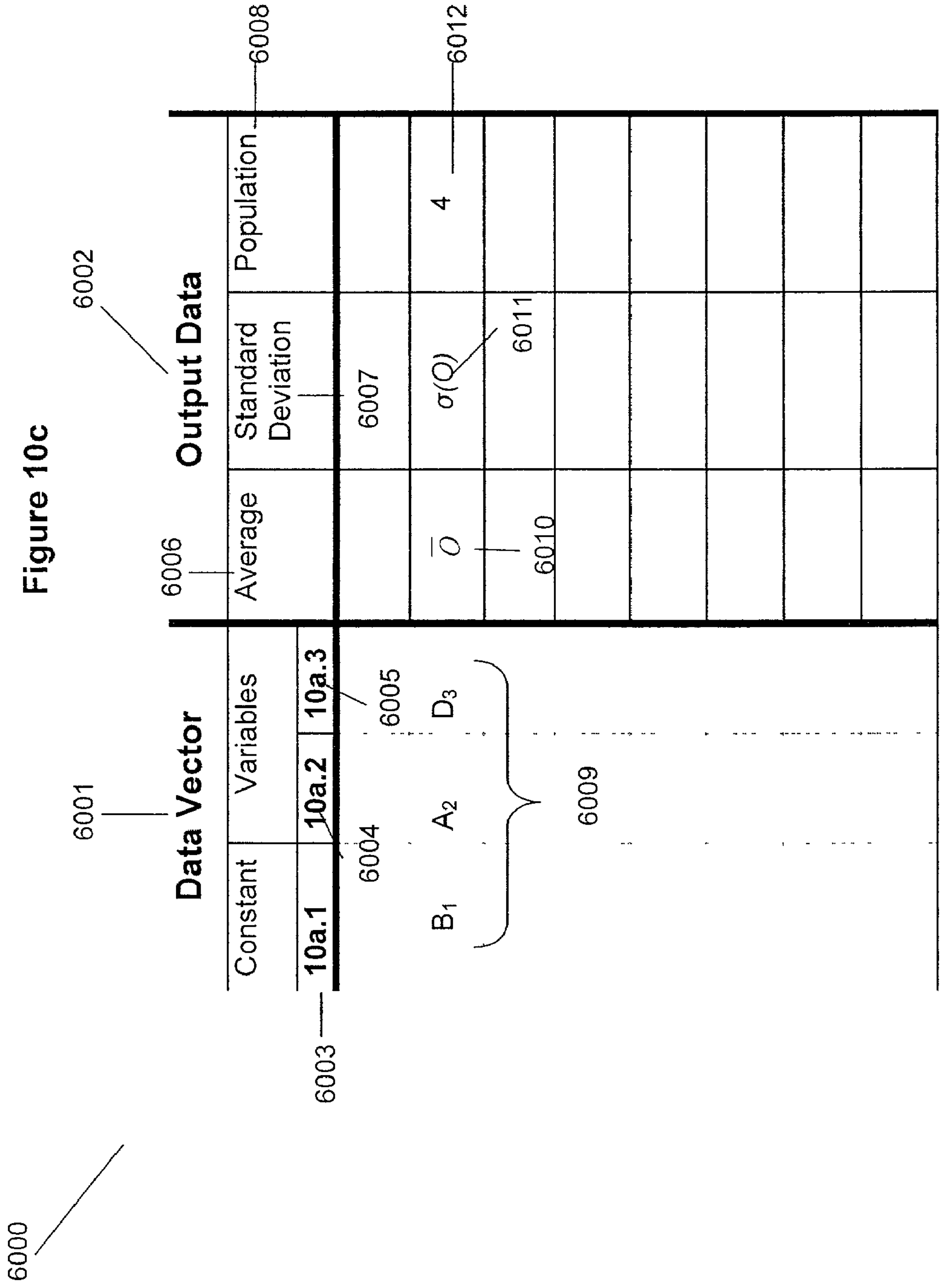
FIG. 10*c* illustrates a sample vector in a vector look-up table.

FIG. 10*c* (generally referenced as) 6000 illustrates a sample vector in a vector look-up table. The table is composed of columns for the data vector 6001 and columns for the given output constant data 6002. The entries of the vector for the sample vector depicted in this table are input constant 10*a*.1 6003, input variable 10*a*.2 6004, and input variable 10*a*.3 6005. The types of output constant data recorded in this vector look-up table are Average 6006, Standard Deviation 6007, and Population 6008. The sample vector is vector $(B_1, A_2, D_3)$ 6009. The average value for this vector for the given output constant is $\overline{O}$ 6010, the standard deviation is $\sigma(O)$ 6011, and the population number is 4 6012.

After a number of runs deemed sufficient by statistical criteria have been executed, the data arrays are sorted according to the data vectors they correspond to, and various meaningful statistical calculations are performed on the output data. For example, in FIG. 10*b*, data arrays corresponding to the vector $(B_1, A_2, D_3)$ were received for process runs 2, e, e+1, and f. In FIG. 10*c* the output data for these four process runs is taken and the average and standard deviation of these four output values is calculated. The average value $\overline{O}$, the standard deviation $\sigma(O)$, and the population number 4 are then entered in the vector look-up table in FIG. 10*c* by vector $(B_1, A_2, D_3)$. This output data is used by embodiments of the present invention for optimization of the given output constant. In addition to average, standard deviation, and population number; other types of meaningful statistical calculations are performed on output data by embodiments of the present invention, such as determining the output constant's Process Capability Ratio ($C_{pk}$), and the results of these calculations are used for process control optimization of that output. However, for the purposes of illustration, the examples that follow here refer to calculation and use of only standard deviation, average, and population number of output constant data.

In many process control situations, it is understood that not all possible combinations of boundary value ranges for input constants and variables represent actual valid process input. Therefore, for those vector input combinations that represent invalid input combinations for which the given process cannot be carried out, there will be no corresponding output data in the vector lookup table.

The conventions of assigning boundary values to input data and sorting input data into data vectors enable detection of problematic input combinations and detection of input combinations that were assumed to yield output that is out of process specification standards and actually yield output that is within process specification standards. When problematic or unusual input combinations are detected, embodiments of the present invention provide appropriate system responses. One of these responses is a self-adjusting feature, which automatically adjusts process input that is out of process specification standards to within specification standards. Other system responses include the sending of automated reports to the process engineer, or in more serious cases the sounding of an alarm or even cessation of process execution altogether.

For example, it is understood that in certain process control situations, certain vector input combinations will represent input combinations for which the current process can be carried out, however it has been determined from previous history of the given process that the a given input combination is known to yield output which is out of process specification standards, or that the a given input combination contains one or more inputs outside of process specification standards, or that this specific combination of inputs is unacceptable for reasons related to the given process. An embodiment of the present invention allows the process engineer to program the system carrying out the given process so that if input combinations or output that are considered unacceptable for either of these reasons are received during process execution, the machinery and/or mechanisms carrying out the process automatically correct the input to within process specification standards. For more serious cases of this nature, this embodiment of the present invention allows the process engineer to program the system carrying out the given process to automatically sound an alarm instead of or in addition to automatic correction, or to even automatically halt process execution altogether; or to report an unacceptable input combination or output to the process engineer, or in more serious cases an alarm is sounded or process execution is halted altogether.

Likewise, in certain process control situations, examination of data in the vector look-up table shows that certain combinations of boundary value ranges for input constants and/or variables which were assumed to yield output that is out of process specification standards do in fact yield output that is within process specification standards. Or, certain combinations of boundary value ranges for input constants and/or variables where one or more of the boundary value ranges are considered out of the specification standard for that input do in fact yield output that is within process specification standards.

For example, referring again to input constant 10*a*.1 and input variables 10*a*.2 and 10*a*.3, assume that for 10*a*.1 the boundary value range $A_1$ is considered out of process specification standards, that for 10*a*.2 the boundary value range $B_2$ is considered out of process specification standards, and that for 10*a*.3 the boundary value range $A_3$ is considered out of process specification standards. However, after applying boundary values to the input data and sorting the input data into data vectors according to the embodiments of the present invention, the resulting output is found to be within process specification standards. Despite this output, which is within specification standards, such a situation still warrants attention, as the given input combination is still considered to be out of process specification standards. In such a case, an embodiment of the present invention allows the process engineer to program the system carrying out the given process to report input combinations that are out of process specification standards and yet yield output within process specification standards. The input combination can then be analyzed to determine whether the combination constitutes a new and valid set of input or whether the combination constitutes an invalid set of input despite its output yield within process specification standards. The ability of embodiments of the present invention to determine input combinations of this nature with resulting output within process specification standards is a unique feature of the present invention that is unknown in standard methods of process control.

Design of Experiment (DOE)

Data that is categorized as input constants, output constants, input variables, or monitored parameters can be either empirical or derived. Empirical data is defined as data obtained from actual process runs. Derived data is data obtained from conjecturing or mathematical calculations. An embodiment of the present invention uses either empirical or derived data, or a combination of the two data types, for the purposes of process control optimization. A specific type of derived data that is used by an embodiment of the present invention is data derived from Design of Experiment (DOE). DOE data is obtained by first choosing a limited sample population representing the spectrum of possible values for input constants and input variables at a given stage in a process, running the process with all possible combinations of this limited sample population, and monitoring the output at the given stage for each possible combination. Based on the results of these process runs, a mathematical formula is derived that allows for interpolating or extrapolating process output for any possible combination of input constant values and input variable values, and with this formula output data is derived for the entire range of possible input constant values and input variable values. Boundary values are assigned to this data, and with the boundary value ranges the data is arranged into data vectors. These data vectors are entered into the vector look-up table in exactly the same manner as data vectors for empirical data. However, because there is no actual sample population for the derived data, no standard deviation or average value can be calculated. Instead, the output value received from the DOE formula is entered in the vector look-up table as the average output value by the appropriate vector, and a default standard deviation value is likewise entered in the vector look-up table by the appropriate vector.

Run-to-Run Process Control Mode

The preferred embodiment of the present invention is implemented in a Run-to-Run control mode. In this context, a Run-to-Run control mode relates to a process control system that determines, based on previous runs of the given process, the optimal setting of process input variable value(s) at a given process tool or module in order to obtain or proximate one or more output target values at that tool or module. Process control optimization in the Run-to-Run control mode is implemented at the given tool or module by two methods, known as the Feed Forward and Feed Back closed control loops.

When implemented in the Run-to-Run control mode, the preferred embodiment of the present invention accesses data from previous process runs and the current process run; and determines optimal settings for input variables on-line (i.e. while the process is occurring), allowing automated optimization of output for the current process run without significant delays and without halting operation of the given process.

Feed Forward Closed Control Loop

FIG. 11 (generally referenced as) 7000 illustrates a vector look-up table for an output constant "$O_1$" 7000 at a given process stage. The table is composed of columns for data vectors 7001 and columns for the output constant data for $O_1$ 7002. The entries for the vectors in the look-up table are input constant 10*a*.1 (generally referenced as) 7003, input variable 10*a*.2 (generally referenced as) 7004, and input variable 10*a*.3 (generally referenced as) 7005. The types of output constant data recorded in this vector look-up table are Average 7006, Standard Deviation 7007, and Population 7008. Output constant data is recorded in the look-up table for vectors ($A_1$, $A_2$, $C_3$) 7009, ($B_1$, $A_2$, $D_3$) 7010, ($C_1$, $A_2$, $A_3$) 7011, ($C_1$, $A_2$, $B_3$) 7012, ($C_1$, $A_2$, $C_3$) 7013, ($C_1$, $A_2$, $D_3$) 7014, and ($C_1$, $B_2$, $C_3$) 7015.

In the context of the present invention, the Feed Forward closed control loop relates to optimal correction of input variable values at a given stage in a process determined by the values of that stage's input constants for the current process run and an output target value or target value range. The first step in implementing the Feed Forward closed control loop is to choose an optimal vector from the vector look-up table. This optimal vector is chosen by first selecting vectors from the vector look-up table that have boundary value ranges for input constants that include the values of the current run's input constants. Then, from among those selected vectors, the vector with the output constant average value closest to the output target value or to the midpoint of the output target value range is chosen as the optimal vector. For example, assuming the input constants and variables from FIG. 10*a* and their boundary values, in FIG. 11 a vector look-up table is presented for output constant $O_1$ with vectors ($A_1$, $A_2$, $C_3$), ($B_1$, $A_2$, $D_3$), ($C_1$, $A_2$, $A_3$), ($C_1$, $A_2$, $B_3$), ($C_1$, $A_2$, $C_3$), ($C_1$, $A_2$, $D_3$), and ($C_1$, $B_2$, $C_3$). In the current process run, the value for input constant 10*a*.1 is 25.03 mm, which is in boundary value range $C_1$. It is clearly seen that vectors ($C_1$, $A_2$, $A_3$), ($C_1$, $A_2$, $B_3$), ($C_1$, $A_2$, $C_3$), ($C_1$, $A_2$, $D_3$), and ($C_1$, $B_2$, $C_3$) satisfy the first criterion for choosing a vector in the first step of the Feed Forward closed control loop, because the value of input constant 10*a*.1 in the current process run is in boundary value range $C_1$.

Next, it must be determined which of these five vectors has the closest average value for output constant $O_1$ to the output target value. The target value for $O_1$ is 10.00 mm. For vector ($C_1$, $A_2$, $A_3$), $\overline{O}_1$=10.02 mm; for vector ($C_1$, $A_2$, $B_3$), $\overline{O}_1$=10.04 mm; for vector ($C_1$, $A_2$, $C_3$), $\overline{O}_1$=9.96 mm; for vector ($C_1$, $A_2$, $D_3$), $\overline{O}_1$=9.98; and for vector ($C_1$, $B_2$, $C_3$), $\overline{O}_1$=10.01 mm. It is clearly seen that vector ($C_1$, $B_2$, $C_3$) satisfies the second criterion for choosing the optimal vector in the first step of the Feed Forward closed control loop, because its average value for $O_1$ is closest to the output target value.

In addition to the vector's output constant average value, the output constant standard deviation and population number are also considered when choosing the an optimal vector. For example, a vector with an average value that is only 0.01 mm from the output target value but with a large standard deviation and low population number may be less preferable than a vector with an average value that is 0.02 mm from the output target value but with a low standard deviation and high population number. In such a case, the vector with the lower standard deviation but average value farther from the output target value might be chosen as the optimal vector, and by applying an offset factor to this vector, it is possible to obtain an average output value for this vector closer to the target value. Those versed in the art will appreciate that rather than examining a vector's average and standard deviation, the easiest and most facile way of selecting an optimal vector is to choose the available vector with the highest Process Capability Ratio ($C_{pk}$). However, for the purposes of illustration, the examples presented here refer only to calculation and use of standard deviation, average, and population number of output constant data.

It should also be appreciated that there will be situations where choosing an optimal vector also depends on recently used process recipes. For example, it is possible that the vector with the highest $C_{pk}$ contains input variable boundary value ranges that significantly differ from recently used input variables values, and that due to system constraints using this vector will cause delays in reconfiguring a given process. In such a situation, a vector with a lower $C_{pk}$ but with an input combination close to or matching recently used input variables values proves to be the optimal vector since implementation of that vector avoid delays in reconfiguring the given process.

Robust Optimization

The ability to choose an optimal vector based on both average value and standard deviation $C_{pk}$ is an example demonstrates of using of robust optimization for purposes of process control, where robust optimization is defined as the ability to reduce data variance while also attempting to obtain or come as close as possible to approximating a target value. Current methods of standard process control are unable to utilize robust optimization, and the ability to utilize robust optimization with embodiments of the present invention is one of the present invention's unique features that other methods of process control do not offer.

Input Constraints

Another criterion for choosing the optimal vector is input constraints. That is, there may be certain input variable boundary value ranges that are considered unacceptable and will therefore disqualify certain vectors which otherwise meet the optimal vector criteria. For example, assume that an input constraint exists on input variable 10*a*.3 such that boundary value range $A_3$ is considered unacceptable. This would therefore disqualify vector ($C_1$, $A_2$, $A_3$). Reasons for input constraints can be cost or efficiency related, or can be related to the subjective considerations of the given process.

Vector Smoothing and Process Recipe ($C_1$, $B_2$, $C_3$) is found to be the optimal vector. However, the average value $\overline{O}_1$ for vector ($C_1$, $B_2$, $C_3$) is 10.01, and is not exactly equal to the output target value of 10.00 mm. Therefore, the second step in implementing the Feed Forward closed control loop is to find the next best optimal vector that most closely fits the criteria established for finding the optimal vector. If the output constant average value of the optimal vector is greater than the target value, then the output constant average value of the next best optimal vector must be less than the output target value. Alternatively, if the output constant average value of the optimal vector is less than the output target value, then the output constant average value of the next best optimal vector must be greater than the output target value. After choosing the next best optimal second vector, a special smoothing algorithm is applied to the two vectors which interpolates the two vectors by means of piece-wise linearization, or linear regression, or the like. The result of this algorithm is a recipe with optimal values for input variables at the given process stage that will yield the output target value.

For example, $\overline{O}_1$ for vector ($C_1$, $B_2$, $C_3$) is 10.01 mm, which is a hundredth of a millimeter greater than the output target value of 10.00. The vector with the closest average value for $O_1$ that is less than the output target value must be found. We saw previously that for vector ($C_1$, $A_2$, $D_3$), $\overline{O}_1$=9.98; and for vector ($C_1$, $A_2$, $C_3$), $\overline{O}_1$=9.96 mm. The average output value of 9.98 mm is closer to the output target value of 10.00 mm than 9.96 mm. Therefore, vector ($C_1$, $A_2$, $D_3$) is chosen as the next best optimal vector. The smoothing algorithm is then applied to vectors ($C_1$, $B_2$, $C_3$) and ($C_1$, $A_2$, $D_3$), and returns a resulting recipe for input variables 10a.2 and 10a.3 in order to receive the output target value of 10.00 mm for output constant $O_1$. Part of this smoothing algorithm involves giving greater priority to the optimal vector according to the proximity of the optimal vector's output constant average value to the output target value. The smoothing algorithm returns interpolated recipe values for input variables that are more likely to be within the boundary value ranges of the input variables in the optimal vector than in the boundary value ranges of those input variables in the next best optimal vector. For the current example, this means that the recipe value for input variable 10a.2 is more likely to be in the $B_2$ range than in the $A_2$ range, and that the recipe value for input variable 10a.3 is more likely to be in the $C_3$ range than in the $D_3$ range.

Feed Back Closed Control Loop

In the Feed Back closed control loop, optimal correction of input variable values at a given stage in a process is achieved through data analysis of the values of output constants at that stage from previous runs of the process. For example, in the present invention, if an output target value for an output constant is known and actual values of that output constant are known from previous process runs, the actual output values can be used to calculate an average offset of that output constant for the current process run. With this average offset, a new output target value is obtained, and with this new target value embodiments of the present invention automatically implement the Feed Forward closed control loop.

Multiple Outputs

An embodiment of the present invention allows for optimization of multiple outputs in the Feed Forward closed control loop. In such a case, there are two or more output constants at a given process stage, with output target value ranges for each output constant. Current methods of standard process control are substantially unable to optimize multiple outputs in the integrated fashion that the embodiment of the present invention for optimizing multiple outputs does. In this context, the present invention provides a unique and revolutionary approach to process control optimization of multiple outputs.

FIG. 12 (generally referenced as) 8000 illustrates a vector look-Up tables for multiple outputs constants $O_1$ and $O_2$ at a given process stage 8000. The table is composed of columns for data vectors 8001, columns for the output constant data for $O_1$ 8002, and columns for the output constant data for $O_2$ 8003. The entries for the vectors in the look-up table are input constant 10a.1 (generally referenced as) 8004, input variable 10a.2 (generally referenced as) 8005, and input variable 10a.3 (generally referenced as) 8006. The types of output constant data recorded for output constant $O_1$ are Average 8007, Standard Deviation 8008, and Population 8009. The types of output constant data recorded for output constant $O_2$ are Average 8010, Standard Deviation 8011, and Population 8012. Output constant data is recorded in the look-up table for vectors ($A_1$, $A_2$, $C_3$) 8013, ($B_1$, $A_2$, $D_3$) 8014, ($C_1$, $A_2$, $A_3$) 8015, ($C_1$, $A_2$, $B_3$) 8016, ($C_1$, $A_2$, $C_3$) 8017, ($C_1$, $A_2$, $D_3$) 8018, and ($C_1$, $B_2$, $C_3$) 8019. The first table is for Output Constant "O1" 8001 and the second table is for Output Constant "O2" 8002.

The embodiment of the present invention for optimizing multiple outputs carries out optimization of multiple outputs in two stages. The first stage is to try is implemented by first trying to find one or more common vectors for the multiple outputs at the given process stage. A common vector is defined as a vector with average values for the multiple output constants such that each constant's average value in the vector is within the target value range for that constant. For example, FIG. 12 presents a vector look-up table for multiple outputs based on the vector look-up table for output constant $O_1$ from FIG. 11. In FIG. 12, in addition to all the output data for output constant $O_1$ that was in the vector look-up table in FIG. 11, there is output data for an output constant $O_2$, and a vector look-up table for an output constant referred to as $O_2$. $O_1$ and $O_2$ are both output constants at one given stage in a process and the inputs to this process stage are input constant 10a.1 and input variables 10a.2 and 10a.3. As in the previous example, assume that the value for the input constant 10a.1 for the current process run is in the $C_1$ boundary value range, and that there is an input constraint on input constant 10a.3 such that such that boundary values range $A_3$ is considered unacceptable. Therefore, the possible vectors to choose from are ($C_1$, $A_2$, $B_3$), ($C_1$, $A_2$, $C_3$), ($C_1$, $A_2$, $D_3$), and ($C_1$, $B_2$, $C_3$).

Previously, an output target value of 10.00 mm was assumed for output constant $O_1$. A target value range of 9.97-10.03 mm is now assumed. Assuming the same output constant average values for vectors ($C_1$, $A_2$, $B_3$), ($C_1$, $A_2$, $C_3$), ($C_1$, $A_2$, $D_3$), and ($C_1$, $B_2$, $C_3$) that were mentioned previously, it is clearly seen that vectors ($C_1$, $A_2$, $D_3$) and ($C_1$, $B_2$, $C_3$) fall within the target value range, since for vector ($C_1$, $A_2$, $D_3$), $\overline{O}_1$=9.98; and for vector ($C_1$, $B_2$, $C_3$), $\overline{O}_1$=10.01 mm. Although vector ($C_1$, $B_2$, $C_3$) has an average value closer to the midpoint of the target value range, for the purposes of optimizing multiple outputs with the common vector embodiment of the present invention, all vectors with average values within the target value range are considered.

Assume that the output constant $O_2$ measures the density of the item produced by inputs 10a.1, 10a.2, and 10a.3 at the given process, and that output constant $O_2$ has an output target value range of 999.50-1000.50 grams/$cm^3$. For vector ($C_1$, $A_2$, $C_3$), $\overline{O}_2$=999.87 grams/$cm^3$; for vector ($C_1$, $A_2$, $D_3$), $\overline{O}_2$=1000.22 grams/$cm^3$; and for vector ($C_1$, $B_2$, $C_3$), $\overline{O}_2$=999.46 grams/$cm^3$. It is clearly seen that vectors ($C_1$, $A_2$, $C_3$) and ($C_1$, $A_2$, $D_3$) fall within the range 999.50-1000.50 grams/$cm^3$ for output constant $O_2$, and that vector ($C_1$, $B_2$, $C_3$) does not.

Output constant $O_1$ was found to have vectors ($C_1$, $A_2$, $D_3$) and ($C_1$, $B_2$, $C_3$) in its output target value range, and output constant $O_2$ was found to have vectors ($C_1$, $A_2$, $C_3$) and ($C_1$, $A_2$, $D_3$) in its output target value range. Therefore, it is clearly seen that these two output constants share the common vector ($C_1$, $A_2$, $D_3$) in their respective target value ranges. ($C_1$, $A_2$, $D_3$) is the optimal vector for output constants $O_1$ and $O_2$, and the recipe for optimizing these multiple outputs is determined by taking the midpoints of the boundary value ranges of input variables 10a.2 and 10a.3, which in this case are the midpoints of boundary value ranges $A_2$ and $D_3$. Although this example illustrates implementation of the embodiment of the present invention for optimization of multiple outputs on only two outputs, the methods presented here can be applied to any number of outputs.

Output Constraints

It is important to note that the optimal vector for multiple outputs would not necessarily be the optimal vector for each output constant if each output constant is analyzed on its own without regard to the other output constants. For example, output constant $O_1$ was found to have vectors ($C_1$, $A_2$, $D_3$) and ($C_1$, $B_2$, $C_3$) in its output target value range, with vector ($C_1$, $B_2$, $C_3$) having the closest average value to the midpoint of the target value range. If $O_1$ were analyzed on its own, ($C_1$, $B_2$, $C_3$) would be its optimal vector. However, vector ($C_1$, $B_2$, $C_3$) does not fall within the target value range for output constant $O_2$, whereas vector ($C_1$, $A_2$, $D_3$) does. Likewise, in regards to output constant $O_2$, vector ($C_1$, $A_2$, $D_3$) would not be its optimal vector if $O_2$ is analyzed on its own, since vector ($C_1$, $A_2$, $C_3$) has the closest average value to the midpoint of the target value range. However, vector ($C_1$, $A_2$, $C_3$) does not fall within the target value range for output constant $O_1$, whereas vector ($C_1$, $A_2$, $D_3$) does. Therefore, since vector ($C_1$, $A_2$, $D_3$) is the only vector to fall within the target value ranges for output constants $O_1$ and $O_2$, ($C_1$, $A_2$, $D_3$) becomes the optimal vector when both output constants are analyzed together. This situation can be understood in terms of output constraints. That is, each output presents a constraint on other outputs, such that a vector which would be considered an optimal vector for a given output when that output is analyzed independent of other outputs cannot be used because it is outside of the output target value range(s) of the other output(s); and a common vector which may not be the optimal vector for some or all of the given output constants is selected because it is within the output target value ranges for all outputs and best optimizes multiple outputs when all the various output constraints are taken into consideration.

When applying the embodiment of the present invention for optimization of multiple outputs, it is also possible that more than one common vector is shared by the multiple outputs. For example, in the previous example, an output target value range of 999.50-1000.50 grams/cm$^3$ was assumed for output constant $O_2$, with vectors ($C_1$, $A_2$, $C_3$) and ($C_1$, $A_2$, $D_3$) falling within that target value range. Assume now that the target value range is expanded to 999.45-1000.50 grams/cm$^3$. The vector ($C_1$, $B_2$, $C_3$), with an average value of 999.46 grams/cm$^3$ for $O_2$, now falls within the target value range $O_2$. Further, in the previous example the output constant $O_1$ had an output target value range of 9.97-10.03 mm and the vector ($C_1$, $B_2$, $C_3$), with an average value of 10.01 mm for $O_1$, also fell within the target value range for $O_1$. Therefore, there are now two vectors, ($C_1$, $A_2$, $D_3$) and ($C_1$, $B_2$, $C_3$), which fall in the output target value ranges for output constants $O_1$ and $O_2$. If from amongst the two or more common vectors there is one vector with average values for all of the output constants closer to the midpoint of each output target value range for the respective output constants than any of the other vectors, then that vector is clearly the optimal vector for optimizing the given multiple outputs. However, if from among the two or more common vectors there is no one vector with average values for all of the output constants closer to the midpoint of each output target value range for the respective output constants than any of the other vectors, then there is a need to determine which of the two or more common vectors will best optimize the multiple outputs. The present example illustrates this latter possibility. It was determined that both vectors ($C_1$, $A_2$, $D_3$) and ($C_1$, $B_2$, $C_3$) fall within the output target value ranges for output constants $O_1$ and $O_2$. Regarding output constant $O_1$, ($C_1$, $B_2$, $C_3$) with $\overline{O}_1$=10.01 mm is clearly preferable over vector ($C_1$, $A_2$, $D_3$) with $\overline{O}_2$=9.98 mm. However, regarding output constant $O_2$, ($C_1$, $A_2$, $D_3$) with $\overline{O}_2$=1000.22 grams/cm$^3$ is clearly preferable over ($C_1$, $B_2$, $C_3$) with $\overline{O}_2$=999.46 grams/cm$^3$.

With the present invention, optimization of multiple outputs in such a situation is done by means of a special weighting algorithm that is part of the embodiment for optimization of multiple outputs. When using this weighting algorithm, the process engineer assigns weightings to (i.e. prioritizes) the multiple outputs. The weighting assigned to each given output is then applied to the most preferable vector for that given output constant from amongst the common vectors, and the weighting algorithm derives a recipe for optimization of the multiple outputs based on each output's preferable vector and its corresponding weighting. In most cases, the recipe values for input variables will be within the input variable boundary value ranges of the vector with the greatest weight. The assignment of these weightings can also be understood in terms of output constraints. That is, the more weight (or greater priority) that is assigned to one output will place greater constraints on the optimization of the other outputs.

In our current example with common vectors ($C_1$, $A_2$, $D_3$) and ($C_1$, $B_2$, $C_3$), assume that output constant $O_2$ receives a greater weighting than $O_1$. Therefore, the greater weighting is applied to vector ($C_1$, $A_2$, $D_3$), which is $O_2$'s more preferable vector from amongst the two common vectors. $O_1$ receives the lesser weighting, and this lesser weighting is applied to vector ($C_1$, $B_2$, $C_3$), which is $O_1$'s more preferable vector from amongst the two common vectors. The two vectors have input variables 10*a*.2 and 10*a*.3. Since vector ($C_1$, $A_2$, $D_3$) receives the higher priority, the recipe value for 10*a*.2 will be in the $A_2$ boundary value range and the recipe value for 10*a*.3 will be in the $D_3$ boundary value range. The extent to which the vector ($C_1$, $A_2$, $D_3$) received a greater weighting will determine to what extent the recipe values for input variables are closer to the midpoint of the boundary value ranges of the input variables. In our current example, if ($C_1$, $A_2$, $D_3$) received a much greater weight than ($C_1$, $B_2$, $C_3$), then the recipe values for 10*a*.2 will be close to the midpoint of boundary value range $A_2$; whereas if ($C_1$, $A_2$, $D_3$) received only a slightly greater weighting than ($C_1$, $B_2$, $C_3$), then the recipe value for 10*a*.2 will still be within boundary value range $A_2$ but will be closer to the end of range $A_2$ that borders boundary value range $B_2$.

In certain situations, it is not always possible to find one or more common vectors within the output target value ranges of the multiple outputs. Optimization of any one given output at a given stage in a process presents a constraint on optimizing all other outputs constants at that given process stage, and as the number of output constants and constraints increase, so does the difficulty in finding one common vector within the output target value ranges for all the multiple outputs. In the above example, common vectors ($C_1$, $A_2$, $D_3$) and ($C_1$, $B_2$, $C_3$) were found within the two output target value ranges. If another third output constant were taken into consideration, it is possible that vectors ($C_1$, $A_2$, $D_3$) and ($C_1$, $B_2$, $C_3$) would not fall within the target value range of that third output constant, and no common vector would be found that falls within the output target value ranges for all three output constants. In such a situation, the weighting algorithm is also be applied to optimize multiple outputs.

For example, assume that in addition to the output constants $O_1$ and $O_2$ from the previous example, there is a third output constant $O_3$ at the given process stage and that the vectors ($C_1$, $A_2$, $D_3$) and ($C_1$, $B_2$, $C_3$), which were determined to fall within the output target value ranges of $O_1$ and $O_2$, do not fall within the output target value range of $O_3$. Further, assume that $O_3$ has an optimal vector ($C_1$, $A_2$, $B_3$), and that vector ($C_1$, $A_2$, $B_3$) does not fall within either of the output target value ranges for output constants $O_1$ and $O_2$. Therefore, there is no common vector that falls within the output target value ranges for the three output constants.

The weighting algorithm is applied to this situation in the same manner as it was applied in the previous example with output constants $O_1$ and $O_2$ and common vectors ($C_1$, $A_2$, $D_3$) and ($C_1$, $B_2$, $C_3$). Now, weightings must be assigned to the three vectors ($C_1$, $A_2$, $B_3$), ($C_1$, $A_2$, $D_3$) and ($C_1$, $B_2$, $C_3$). Assume now that the optimal vector for $O_3$, ($C_1$, $A_2$, $B_3$), receives the greatest weight of the three vectors, and that vector ($C_1$, $A_2$, $D_3$) receives a greater weighting than vector ($C_1$, $B_2$, $C_3$) as in the previous example. The recipe value for the input variable 10*a*.b will now very likely be close to the midpoint of boundary value $A_2$ since vector ($C_1$, $A_2$, $A_3$) (with the greatest weighting) and vector ($C_1$, $A_2$, $D_3$) (with the second greatest weighting) both have boundary value range $A_2$ for input variable 10*a*.2. The recipe value for input variable 10*a*.3 in this case will greatly depend on the degree to which vector ($C_1$, $A_2$, $B_3$) is weighted over vector ($C_1$, $A_2$, $D_3$) and the degree to which vector ($C_1$, $A_2$, $D_3$) is weighted over vector ($C_1$, $B_2$, $C_3$). If vector ($C_1$, $A_2$, $B_3$) has a much greater weight than vector ($C_1$, $A_2$, $D_3$), then the recipe value is likely to be somewhere in the $B_3$ range; whereas if the weighting for ($C_1$, $A_2$, $B_3$) is only slightly greater than the weighting for vector ($C_1$, $A_2$, $D_3$) and the weighting for ($C_1$, $A_2$, $D_3$) is much greater than the weighting for vector ($C_1$, $B_2$, $C_3$), the recipe value for 10*a*.3 is likely to be somewhere in the $C_3$ range.

CMP Example

Figure 13:
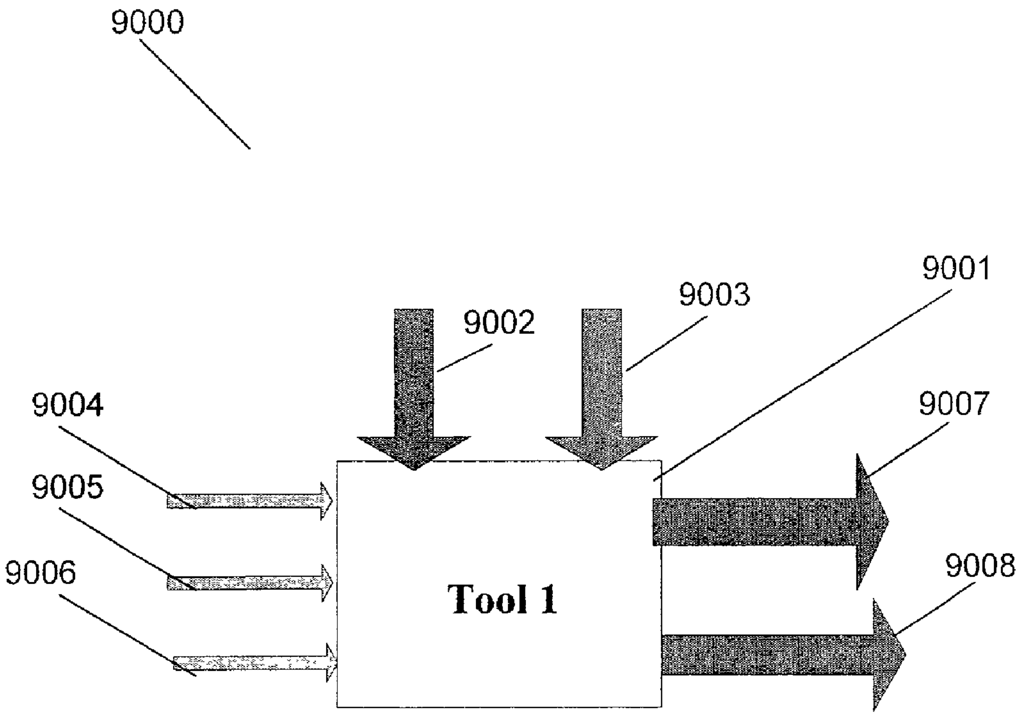
FIG. 13 illustrates a schematic diagram in the Chemical/Mechanical Polishing process of silicon wafers at "Tool 1"

The schematic diagram in FIG. 13 (generally referenced as) 9000 illustrates in a schematic diagram a stage in the Chemical/Mechanical Polishing process of a silicon wafers at "Tool "1" 9001. The Inputs constants at "Tool-1" are: Thickness-In 9002, and Pad Life 9003, Input variables at "Tool-1" are Time 9004, Pressure 9005, and Speed 9006; output constants at "Tool-1" are Uniformity 9007 and Final-Thickness 9008.

The following example illustrates how embodiments of the present invention are applied in the Chemical/Mechanical Polishing (CMP) of silicon wafers. A stage in the CMP process is depicted in FIG. 13, with the following inputs:

1. Thickness-In (Constant)
2. Pad Life (Constant)
3. Pressure (Variable)
4. Time (Variable)
5. Speed (Variable)

and two output constants Final-Thickness and Uniformity. It is clearly seen in FIG. 13 that these two output constants are dependent on the 5 inputs.

Embodiments of the present invention are applied in the APC Run-to-Run algorithm mode is applied to this process and calculates the Feed Back and Feed Forward corrections Closed Control Loops are implemented for process run n as follows:

1. Calculate the offset average for the output constant Final-Thickness for run n for the last m previous runs, where m is any number from 1 to n−1, as follows:

$$\text{Final\_Thickness}(\Delta_n) = \left[\frac{\sum_{j=1}^{m} \frac{Actual(n-j) - Model_{pred}(n-j)}{\sigma_{n-j}}}{m}\right]P$$

Where:

Actual(n−j) is the actual measured value of output constant Final-Thickness at run (n−j), $Model_{pred}$(n−j) is the model predicted value of output constant Final-Thickness at run (n−j), which is the average value for output constant Final-Thickness taken from the vector look-up table for process run (n−j).

$\sigma_{n-j}$ is the standard deviation of output constant Final-Thickness at run (n−j), taken from the vector look-up table for process run (n−j).

P is a correction coefficient used to correct discernible deviation trends.

2. With Final-Thickness($\Delta_n$), calculate the adjusted output target value range Adj. $Target_n$ for output constant Final-Thickness according to the following formula:

$$\text{Adj. Target}_n = \text{Target}_n - \text{Final-Thickness}(\Delta_n)$$

Where $Target_n$ is the original output target value range for output constant Final-Thickness. In the event that the adjusted target value range goes above the UCL (Upper Control Limit) or below the LCL (Lower Control Limit) for output constant Final-Thickness, the system will cease operation.

3. Repeat steps 1 and 2 for the output constant Uniformity, calculating the offset average for Uniformity at run n with the formula from Step 1 that was used to calculate the average offset for Final-Thickness, and using the offset average for Uniformity at run n to determine the adjusted output target value range for Uniformity.
4. With the adjusted output target value ranges for Uniformity and Final-Thickness and the values of input constants Thickness-In and Pad Life for the current process run, refer to the vector look-up table for Uniformity and Final-Thickness to find vectors within the respective adjusted output target value ranges.
5. With the two groups of vectors obtained in step 4, look for common vectors in the two groups.

At this step, there are three possible results:

i. One common vector is found—use this vector to determine the process recipe. The recipe will be determined by taking the midpoints of the boundary value ranges in the vector for input variables Pressure, Time, and Speed.

ii. More than one common vector is found—from the common vectors found, determine the preferable vector for Uniformity and the preferable vector for Final-Thickness. Assign weightings to Uniformity and Final-Thickness and apply the weighting algorithm to their preferable vectors to obtain the process recipe for input variables Pressure. Time, and Speed.

iii. No common vector is found—Determine the optimal vector for Uniformity and the optimal vector for Final-Thickness. Assign weightings to Uniformity and Final-Thickness and apply the weighting algorithm to their optimal vectors to obtain the process recipe for input variables Pressure, Time, and Speed.

In the above example, the determination of optimal values for input variables is based on both output values from previous runs, and the values of input constants for the current process run. That is, the calculation of the average offset for Uniformity and Final-Thickness and their new output target value ranges for run n is a case of using output values from previous runs to determine optimal values of input variables for run n; and the selection of optimal vectors from the vector look-up table is a case of using the values of input constants for the current process run to determine the optimal values of input variables. Simply stated, the Feed Back and Feed Forward closed control loops are implemented together. The preferred embodiment of the present invention implements both control loops together.

However, it should be noted that both control loops can be implemented independent of the other. For example, in an embodiment of the present invention, input constant data for the current process run is used to determine the optimal values for input variables without known output data, thus operating only in the Feed Forward closed control loop and not the Feed Back closed control loop. Likewise, in another embodiment of the present invention, output value data is used to determine the optimal values for input variables without using input constant data, thus operating only in the Feed Back closed control loop and not the Feed Forward closed control loop.

Self-Correcting, Adaptive System

An embodiment of the present invention allows for updating the data stored in the vector look-up table. Every time a process run is executed, the data for that run is processed according to the various methods that have been described up to this point, and with that data, the vector look-up table is eventually updated. The ability for the look-up table to be updated is of particular significance when data in the look-up table has been generated through Design of Experiment (DOE). Because the data from DOE is almost entirely derived data, output data derived from DOE is inherently less accurate than output data obtained from recording the results of actual process runs. Therefore, the ability to update a look-up table containing DOE data with data from actual process runs is essential. The embodiment of the present invention for updating the look-up table with recent empirical data is designed so that the process engineer can determine with what frequency the look-up table will automatically be updated. In many process control situations, it is neither efficient nor desirable to update the look-up table after every process run or even after every few process runs, and it is necessary to allow the process engineer to set the frequency for updating the look-up table based on the specific requirements of and constraints on the given process. This frequency can sometimes be even periods of weeks or months.

Other embodiments of the present invention allow for analysis of output data in the look-up table and correction of model predicted output values. According to one of these embodiments, the actual values of output constants recorded during recent process runs are compared with the model predicted values for that output constant according to the vector look-up table. Recent process runs are defined as process runs whose data has not been used to update the vector look-up table. The differences, hereinafter residuals, between the actual values and the model predicted values of the output constant are calculated, and the residuals for each vector are examined. If, for all the residual values calculated, a common residual value is observed; then this common residual value is used to correct the model predicted output values.

FIG. 14 (generally referenced as) 10,000 illustrates a vector look-up table 10,001 for output constant $O_1$ at a given process stage, an Actual Values column 10,002 which is not part of the vector look-up table, and a Residual Values column 10,003 which is not part of the vector look-up table. The vector look-up table 10,001 is composed of columns for data vectors 10,004 and columns for the output constant data for $O_1$ 10,005. The entries for the vectors in the look-up table are input constant 10$a$.1 (generally referenced as) 10,006, input variable 10$a$.2 (generally referenced as) 10,007, and input variable 10$a$.3 (generally referenced as) 10,008. The types of output constant data recorded in this vector look-up table are Average 10,009, Standard Deviation 10,010, and Population 10,011. Output constant data is recorded in the look-up table for vectors $(A_1, A_2, C_3)$ 10,012, $(B_1, A_2, D_3)$ 10,013, $(C_1, A_2, A_3)$ 10,014, $(C_1, A_2, B_3)$ 10,015, $(C_1, A_2, C_3)$ 10,016, $(C_1, A_2, D_3)$ 10,017, and $(C_1, B_2, C_3)$ 10,018. The Actual Values column 10,002 contains values $Act_{O1}(A_1, A_2, C_3)$ 10,019, $Act_{O1}(B_1, A_2, D_3)$ 10,020, $Act_{O1}(C_1, A_2, A_3)$ 10,021, $Act_{O1}(C_1, A_2, B_3)$ 10,022, $Act_{O1}(C_1, A_2, C_3)$ 10,023, $Act_{O1}(C_1, A_2, D_3)$ 10,024, and $Act_{O1}(C_1, B_2, C_3)$ 10,025. The Residual Values column 10,003 contains values $\Delta_{O1}(A_1, A_2, C_3)$ 10,026, $\Delta_{O1}(B_1, A_2, D_3)$ 10,027, $\Delta_{O1}(C_1, A_2, A_3)$ 10,028, $\Delta_{O1}(C_1, A_2, B_3)$ 10,029, $\Delta_{O1}(C_1, A_2, C_3)$ 10,030, $\Delta_{O1}(C_1, A_2, D_3)$ 10,031, $\Delta_{O1}(C_1, B_2, C_3)$ 10,032. The Actual Values 10,002 are compared with the predicted values according to the Vector Look-Up Table for Output Constant "O1" 10,001 and the calculated difference between them is the Residual Value 10,003.

For example, referring to FIG. 14, depicted is the vector look-up table for output constant $O_1$ at a given process stage which has been seen previously in FIGS. 11 and 12, with the noticeable difference that the population numbers for each vector are much greater now than they were in FIGS. 11 and 12. Assume that the process is now executed another 70 times with varying input combinations that correspond to the vectors in the look-up table depicted in FIG. 14. The values for $O_1$ for these 70 process runs are recorded but the look-up table is not updated with these values. The column to the right of the look-up table contains the average of the actual values of $O_1$ received during the 70 recent process runs for each vector in the look-up table, and the column on the far right contains the residual values of $O_1$ for each vector in the look-up table. That is, assume that during the 70 recent process runs, the process was executed 10 times for each vector in the look-up table.

Therefore the value $Act_{O1}(A_1, A_2, C_3)$ is the average of the 10 values received for $O_1$ the when the process was executed with input combinations corresponding to the boundary value ranges $A_1$, $A_2$, and $C_3$; the value $Act_{O1}(B_1, A_2, D_3)$ is the average of the 10 values received for $O_1$ when the process was executed with input combinations corresponding to the boundary value ranges $B_1$, $A_2$, and $D_3$, and likewise preferably for all the values listed in the Actual Values column.

The column on the far right contains the residual values of $O_1$ for each vector in the look-up table. That is the value $\Delta O1(A_1, A_2, C_3)$ in the first row of the residual values column is the difference between $\overline{O}_1$ of vector $(A_1, A_2, C_3)$ and $Act_{O1}(A_1, A_2, C_3)$; $\Delta_{O1}(B_1, A_2, D_3)$ is the difference between $\overline{O}_1$ of vector $(B_1, A_2, D_3)$ and $Act_{O1}(B_1, A_2, D_3)$; etc. Assume that for vector $(A_1, A_2, C_3)$, $\overline{O}_1$=9.99 mm; for vector $(B_1, A_2, D_3)$, $\overline{O}_1$=10.00 mm; for vector for vector $(C_1, A_2, A_3)$, $\overline{O}_1$=10.02 mm; for vector $(C_1, A_2, B_3)$, $\overline{O}_1$=10.04 mm; for vector $(C_1, A_2, C_3)$, $\overline{O}_1$=9.96 mm; for vector $(C_1, A_2, D_3)$, $\overline{O}_1$=9.98; and for vector $(C_1, B_2, C_3)$, $\overline{O}_1$=10.01 mm. Further, assume that $Act_{O1}(A_1, A_2, C_3)$=9.97 mm, $Act_{O1}(B_1, A_2, D_3)$=9.98 mm, $Act_{O1}(C_1, A_2, A_3)$=10.00 mm, $Act_{O1}(C_1, A_2, B_3)$=10.02 mm, $Act_{O1}(C_1, A_2, C_3)$=9.94 mm, $Act_{O1}(C_1, A_2, D_3)$=9.96 mm, and $Act_{O1}(C_1, B_2, C_3)$=9.99 mm. It is clearly seen that there is a common residual value for each vector in the look-up table of 0.02 mm. Because there is a common residual value, the model predicted output values for $O_1$ are decreased by 0.02 mm, and these adjusted predicted values will be used for the purposes of process control optimization at the given process stage in the future. The example here presents a simple case of detecting an exact common residual value for all vectors in the look-up table. However, in practice, a significant range for residual values will likely be determined such that even if residual values are not exactly equal, if residual values fall within the significant range, then a common residual value is considered to have been detected and the model predicted output values will be corrected by the average value of those residual values.

Another embodiment of the present invention analyzes respective residuals and their corresponding model predicted values for each vector in the output constant's vector look-up table to determine whether a functional relationship exists between the output constant's model predicted values and the corresponding residual value. If a functional relationship is determined, then that functional relationship is used to correct the model predicted output values for all vectors of the given output constant.

It is also possible that residual values will be analyzed and that no common residual value is detected, nor is any functional relationship determined between model predicted output values and their corresponding residual values. This can also be true even when applying a significant range, and not an exact value, to detect common residuals. In such a situation, if it is determined that the residual values are significant enough to warrant correction of model predicted output values, then the vector look-up table must be disregarded and a new vector look-up is calculated according to the embodiments of the present invention previously described here.

APC—The Present Invention on the Module Level

The description of the embodiments of the present invention, up to this point, has focused on implementation of these embodiments at the process stage, or tool, level. It should be recalled that the tool level is the highest level of resolution in process control, such that process control optimization focuses on optimization of output at only one given stage in a process and no more. However, the embodiments of the present invention described here are also applied to process control optimization on the module level, where a module is defined as two or more contiguous tools in a process. In the simplest case, a module consists of two contiguous tools. In such a case, there is some output from the first tool that is input to the second tool. Process control optimization with embodiments of the present invention in such a case focuses on optimizing output at the second tool in the module by means of the input variables and constants of the first tool in the module.

Figure 15:
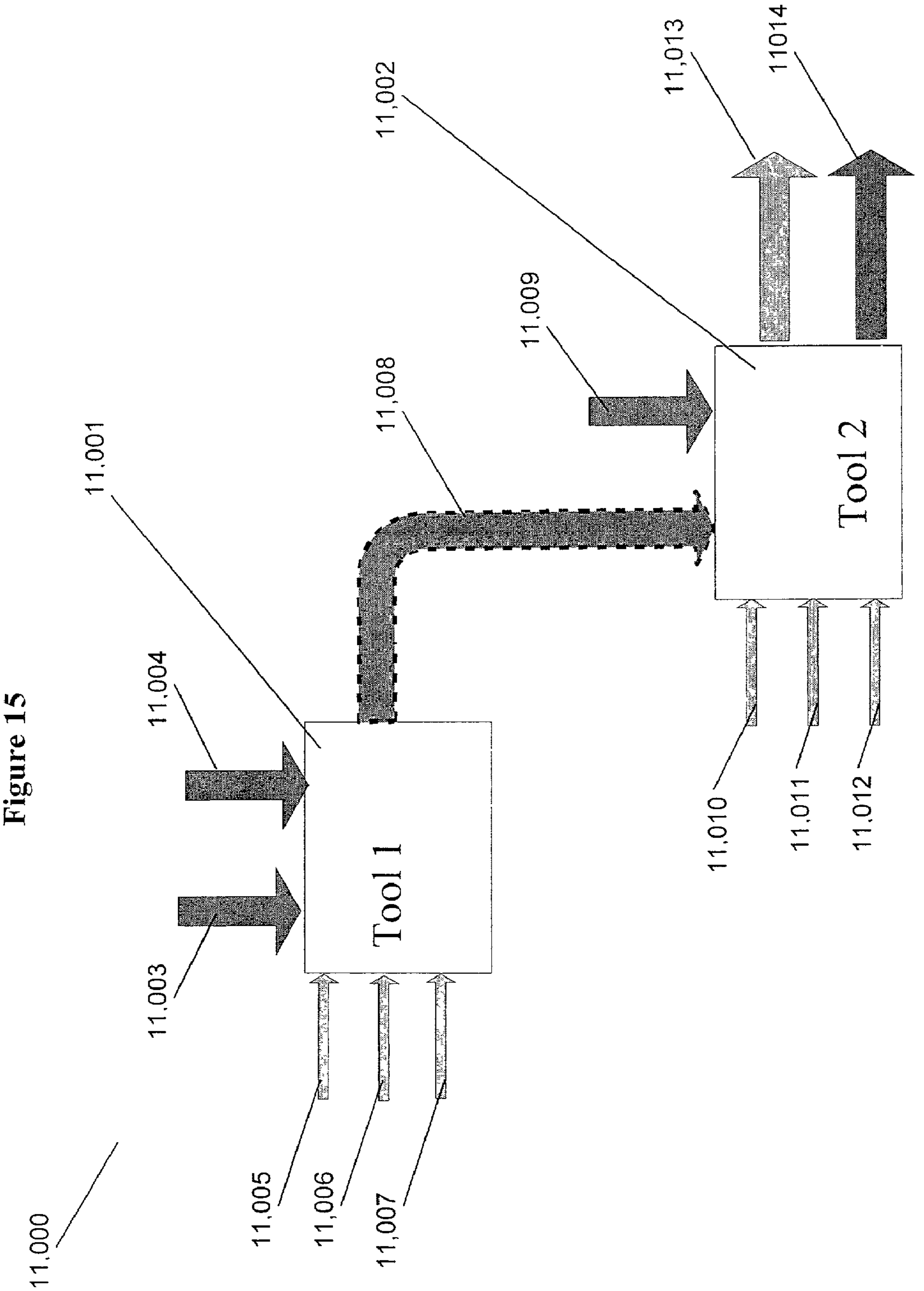
FIG. 15 illustrates a schematic diagram of a process module of two tools, "Tool 1" and "Tool 2"

The schematic diagram in FIG. 15 (generally referenced as) 11,000 illustrates a process module of two tools, a schematic diagram for APC on a Module Level 11,000. "Tool "1" 11,001 and "Tool-2" 11,002. "Tool-1" has input constants Thickness-in 11,003 and Pad Life-111,004; has inputs variables: "Time-1" 11,005, "Pressure-1" 11,006, and "Speed-1" 11,007, and input constants (whose values are used in feed forward 11,001 to adjust the aforementioned input variable values): "Pad Life 1" 11,003, and Thickness-in 11,004; and output constant Thickness-out 11,008. "Tool-2" has input constants Thickness-out 11,008 (which is also an output constant from "Tool-1") and Pad Life-2 11,009; input variables Time-2 11,010, Pressure-2 11,011, and Speed-2 11,012; and output constants Uniformity 11,013 and Final-Thickness 11,014.

For example, FIG. 15 presents a process module of two tools, labeled Tool-1 and Tool-2. Tool-1 has input variables Time-1, Pressure-1, and Speed-1, input constants Pad Life-1 and Thickness-in, and output constant Thickness-out, which is also an input constant to Tool-2. Tool-2 has input variables Time-2, Pressure-2, and Speed-2, input constants Pad Life-2 and Thickness-out (the output constant from Tool-1), and two output constants Uniformity and Final-Thickness. Embodiments of the present invention can be applied to a process module such as the one depicted in FIG. 15 for optimization of the output constants Uniformity and Final-Thickness at Tool-2 by means of the input constants and variables at Tool-1. Assume that a recipe of input values at Tool-2 has been determined for the optimization of the multiple outputs constants Uniformity and Final-Thickness. This recipe contains a specific value or value range for the input constant Thickness-out at Tool-2. Because Thickness-out is also an output constant for Tool-1, embodiments of the present invention are applied to Tool-1 to determine a recipe for the output target value or target value range of Thickness-out, where the output target value or target value range for Thickness-out is the input constant value or value range of Thickness-out in the recipe for optimizing multiple outputs Uniformity and Final-Thickness. That is, the recipe value of Thickness-out when optimizing multiple outputs constants Final-Thickness and Uniformity serves as the output target value for the recipe at Tool-1.

The example illustrated in FIG. 15 presents a simple case of applying embodiments of the present invention on the module level. However, it should be noted that embodiments of the present invention are applied on the module level where the module is any number or configuration of contiguous or non-contiguous tools. For example, assume a module of five sequential tools. If each tool in the module has one or more output constants that are inputs to the next tool in module, then a recipe for obtaining one or more output target values or target value ranges at the fifth tool in the module will serve as the basis for determining the recipe of input variables at the first tool in the module. The embodiments of the present invention are applied at each tool in the module starting from the last tool and working back to the first tool. At each tool, starting from the second to last tool in the module, target values or target value ranges for the output constants in the recipe at that tool will be the recipe values or value ranges that those output constants have as input constants in the recipe for the immediately following tool in the module, until a recipe is received for input values at the process engineer the first tool in the module.

Figure 16:
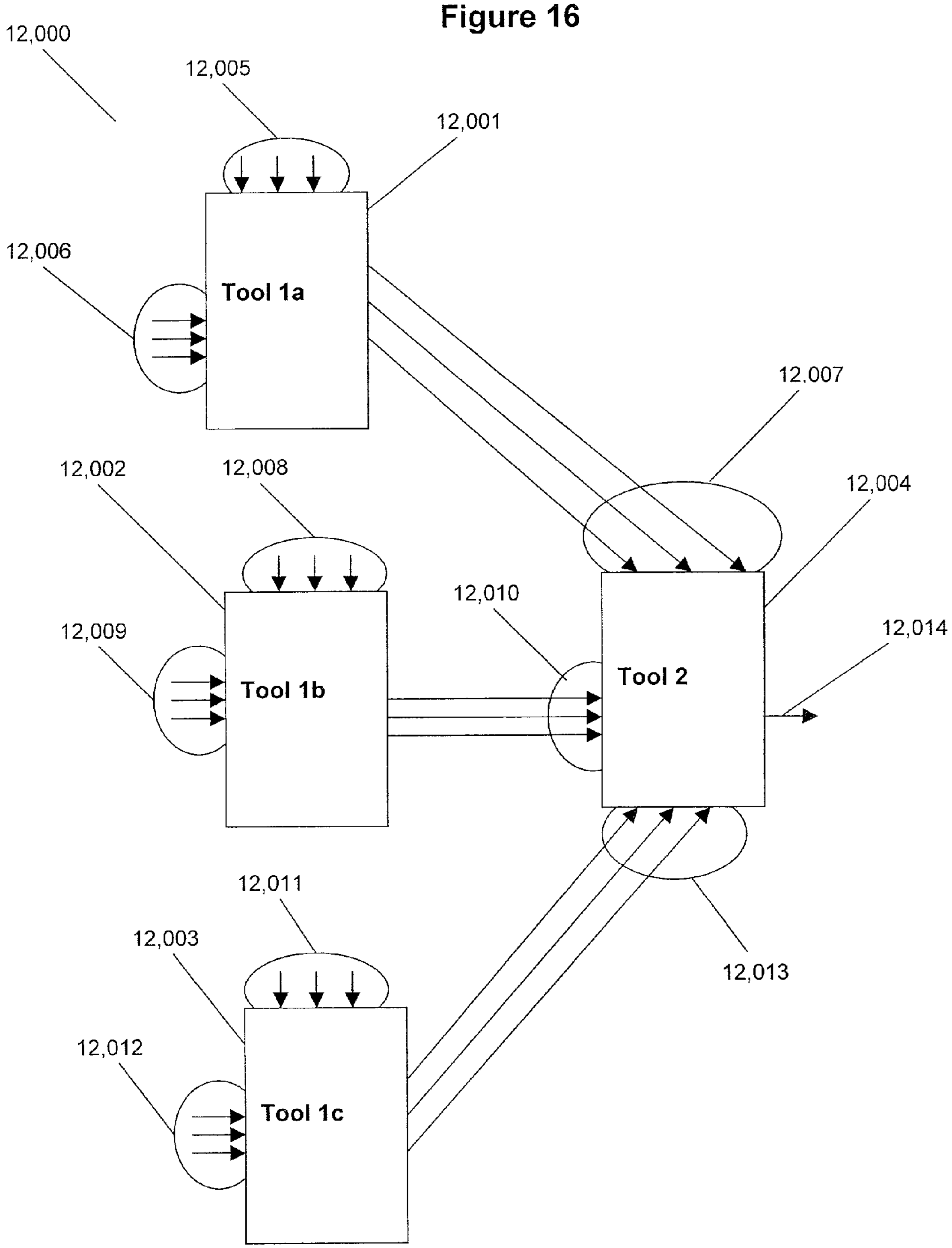
FIG. 16 illustrates a schematic diagram of a module of four tools in a non-sequential configuration.

FIG. 16 (generally referenced as) 12,000 illustrates a schematic diagram of a module of four tools in a non-sequential configuration. "Tool-1*a*" 12,001, "Tool-1*b*" 12,002, and "Tool-1*c*" 12,003 are parallel tools which run in either a simultaneous or alternate manner and send output to "Tool-2" 12,004.

"Tool-1*a*" has input constants 12,005, input variables 12,006, and output constants 12,007 which are also input constants to "Tool-2". "Tool-1*b*" has input constants 12,008, input variables 12,009, and output constants 12,010 which are also input constants to "Tool-2". "Tool-1*c*" has input constants 12,011, input variables 12,012, and output constants 12,013 which are also input constants to "Tool-2". "Tool-2" has input constants 12,007, 12,010, and 12,013, and the output constant Final Output 12,014.

Likewise, embodiments of the present invention can be applied on non-sequential module configurations such as the module depicted in FIG. 16. FIG. 16 depicts a module of four tools, where Tools 1*a*, 1*b*, 1*c* run parallel to each other in either a simultaneous or alternate manner and send output to Tool-2. The output constants of Tools 1*a*, 1*b*, and 1*c* are input constants to Tool-2. Assume that an output target value is known for the output constant Final Output at Tool-2. A recipe for receiving the target value of Final Output is obtained using embodiments of the present invention. The values of the input constants in the recipe for Final Output at Tool-2 then serve as the output constant target values for the recipes at Tools 1*a*, 1*b*, and 1*c*. On the basis of the recipe at Tool-2, this embodiment of the present invention determines the output target values at each of the parallel tools and then determines the recipe for input variables and constants at each parallel tool.

The invention claimed is:

1. A method for automatic adaptive control of a predetermined multi-stage manufacturing process, said multi-stage manufacturing process being defined by process stages, the method comprising A. defining an interconnection cell in association with one of said process stages, said interconnection cell having associated therewith I. at least one set of input data representing said manufacturing process or at least one set of manufacturing process control parameters, and II. at least one set of output data, usable for predicting the process output for a given setting;

B. for the interconnection cell, processing data from said at least one set of input data and from at least one set of output data, using a predetermined prediction model into respective corresponding data record clusters; thereby to associate settings for respective process stages of said multi-stage process to respective outputs of said process stages or said process.

2. The method according to claim 1 wherein defining an interconnection cell includes representing the interconnection cell as corresponding to a single one of said process stages in a process map.

3. The method according to claim 1 wherein defining an interconnection cell includes representing the interconnection cell as corresponding to a group of contiguous ones of said process stages in a process map.

4. The method according to claim 1 wherein defining an interconnection cell includes representing the interconnection cell as corresponding to a group of non contiguous ones of said process stages in a process map.

5. The method according to claim 1 wherein defining an interconnection cell includes representing the interconnection cell as corresponding to a group of cells in a process map which includes therein substantially every one of said process stages in the process map.

6. The method according to claim 1 wherein defining an interconnection cell includes representing the interconnection cell as corresponding to at least two interrelated interconnection cells in a process map.

7. The method according to claim 1 wherein said at least one input data set includes historical empiric data obtained from a previously performed like-process.

8. The method according to claim 1 wherein said at least one input data set includes data currently being obtained from a substantially presently ongoing like-process.

9. The method according to claim 1 wherein defining the interconnection cell includes associating therewith derived data.

10. The method according to claim 1 wherein defining the interconnection cell includes associating therewith values generated by a Design-Of-Experiments assessment of the predetermined process juncture; to be used for initialization of a like-process.

11. The method according to claim 1 wherein defining the interconnection cell includes associating therewith values computed using at least one predetermined formula.

12. The method according to claim 1 wherein defining the interconnection cell includes validating at least one set of the at least one set of input data to the interconnection cell as respectively having a substantially significant correlation with a set of the at least one set of output data.

13. The method according to claim 12, wherein said validating includes calculating a correlation coefficient between a selected set of the at least one set of input data, and the at least one set of output data; for the interconnection cell.

14. The method according to claim 1 wherein assigning at least one boundary value includes analyzing data in the respective set wherein the at least one boundary value is to be assigned.

15. The method according to claim 14 wherein analyzing data in the respective set includes examining the data according to at least one predetermined criterion.

16. The method according to claim 15 wherein examining the data according to at least one predetermined criterion includes electing a criterion selected from the list of:

A. Input constraints—

I. within a specification limit,

II. within a range of values,

III. below an upper limit,

IV. above a lower limit,

V. closest to a mid-range value,

VI. closest to a previously used value;

B. Process constraints—

I. closest recipe to most recent recipe,

II. within a specification limit,

III. within a range of values,

IV. below an upper limit,

V. above a lower limit,

VI. closest to a mid-range value; or

C. Output goals—

I. within a specification limit,

II. within a range of values,

III. a predetermined target value,

IV. an upper specification limit,

V. a lower specification limit,

VI. below an upper limit,

VII. above a lower limit,

VIII. closest to a mid-range value.

17. The method according to claim 1 wherein processing includes summarizing data in each respective corresponding data record cluster.

18. The method according to claim 1 wherein processing includes implementing a Run-to-Run process control mode.

19. The method according to claim 1 wherein processing includes running a feed back closed control loop.

20. The method according to claim 1 wherein processing includes running a feed forward closed control loop.

21. The method according to claim 20 wherein running a feed forward closed control loop includes substantial optimization of multiple outputs.

22. The method according to claim 21 wherein said multiple outputs are optimized by multiplying weighing constants, obtained by a predetermined mathematical function.

23. The method according to claim 1 wherein processing includes transforming each summarized respective corresponding data record cluster into a sub-manifold of a multivariate data manifold.

24. The method according to claim 1 wherein processing includes transforming each summarized respective corresponding data record cluster into a search-space vector.

25. The method according to claim 24 wherein transforming each summarized respective corresponding data record cluster into a search-space vector includes arranging at least one search-space vector into a vector look-up table.

26. The method according to claim 25 wherein the at least one search-space vector—having been arranged into a vector look-up table—is updated by using a self-correcting adaptive system.

27. The method according to claim 1 wherein processing includes:

A. for at least one process control parameter of the at least one set of process control parameters, prescribing at least one process control recipe element for use in the predetermined process juncture; and B. designating the prescribed at least one process control recipe element for use in the predetermined process juncture.

28. The method according to claim 1 wherein said processing includes using robust optimization.

29. The method according to claim 1 wherein said processing includes characterizing data in substantially each respective corresponding data record cluster by using a statistical calculation.

30. The method according to claim 29 wherein said using a statistical calculation includes calculating a process capability ratio.

31. The method according to claim 29 wherein characterizing data in substantially each respective corresponding data record cluster by using a statistical calculation includes arranging the characterized data into a look-up table.

32. The method according to claim 31 wherein arranging the characterized data into a look-up table includes using the look-up table and therewith designating at least one process control recipe for use at the predetermined process juncture.

33. The method according to claim 32 wherein using the characterized data in the look-up table includes smoothing the data.

34. The method according to claims 31, 32, or 33 wherein arranging the smoothed characterized data into a look-up table includes using the look-up table for designating at least one process control recipe for use at the predetermined process juncture.

35. The method according to claim 34 wherein using the look-up table for designating at least one process control recipe for use at the predetermined process juncture includes updating said look-up table by using a self-correcting adaptive system.

36. The method according to claim 32 wherein using the look-up table for designating at least one process control recipe for use at the predetermined process juncture includes selecting a best available vector and therewith deriving a process control recipe.

37. The method according to claim 36 wherein selecting a best available vector for use with the process control recipe includes running a feed forward closed control loop.

38. The method according to claim 1 wherein processing includes—to the predetermined process juncture associated with the interconnection cell—applying at least one of the respective corresponding data record clusters to the process occurring at that juncture.

39. The method according to claim 38 wherein at least one of the respective corresponding data record clusters is updated by using a self-correcting adaptive system.

40. The method according to claim 39 wherein applying at least one of the respective corresponding data record clusters includes reporting a process status, and wherein said reporting is initiated according to predetermined conditions.

41. The method for process control according to claim 1 wherein the steps of the method are applied for optimizing a Chemical/Mechanical Polishing processing of silicon wafers.

42. The method according to claim 1 wherein processing data from the plurality of respective formed set combinations into respective corresponding data record clusters includes installing at least one data record cluster correspondence as a front end to a neural network, wherein the neural network is used for controlling an aspect of the process at the predetermined process juncture.

43. The method according to claim 1 wherein adaptive process control parameters are obtained by running a feed back process control loop.

44. The method according to claim 43 wherein adaptive process control is based on measuring parameters of multiple product lots.

45. The method according to claim 43 wherein adaptive process control is based on measuring parameters of a single previous product lot.

46. A method for automatic programming for adaptive control of a predetermined multi-stage manufacturing process said manufacturing process being defined by process stages, the method comprising A. using a mapped plurality of graph-directed expertise-suggested interconnection cell relationships, defining a map referenced interconnection cell therein, said interconnection cell being associated with one of said process stages, said interconnection cell having associated therewith I. at least one set of input data representing said predetermined multi-stage industrial process or at least one set of industrial process control parameters, and II. at least one set of output data, usable for predicting the process or stage output for a given setting of said associated process stage; and B. using the map referenced interconnection cell, designating at least one process control recipe and applying settings to said process as defined by said recipe for the industrial process, thereby to apply control to said multi-stage manufacturing process.

47. The method according to claim 46 wherein defining includes, for the map referenced interconnection cell, validating at least one of the mapped plurality of graph-directed expertise-suggested interconnection cell relationships.

48. The method according to claim 47 wherein defining the map referenced interconnection cell includes for an n-tuple of directed graph components of the mapped interconnection cell validating the map referenced interconnection cell by measuring if each of the at least one set of input data to the map referenced interconnection cell significantly contributes to that map referenced interconnection cell's output, wherein a predetermined convolution of these measurements constitutes an acceptable validity-metric.

49. The method according to claim 46 wherein defining the map referenced interconnection cell includes validating the map referenced interconnection cell by simulating a validity-metric for an n-tuple of directed graph components of the map referenced interconnection cell.

50. The method according to claim 46 wherein designating at least one process control recipe includes choosing another process control recipe whenever a particular obtained output value differs from a predetermined target value, by at least a predetermined value, thereby obtaining a new subsequent offset goal value closer to a predetermined target value.

51. The method according to claim 50 wherein obtaining a new offset goal value includes basing the value upon at least one output value from a previous similar process.

52. The method according to claim 51 wherein basing a new offset goal value includes analyzing the at least one output value from a previous similar process by running a feed back closed control loop.

53. The method according to claim 46 wherein defining a map referenced interconnection cell includes forming at least two search-space vectors.

54. An article of manufacture including a computer usable medium having computer readable program code embodied therein for performing multi-stage adaptive process control at a predetermined process juncture, the computer readable program code in said article of manufacture including:

A. first computer readable program code for causing a computer to define an interconnection cell associated with said process juncture and having associated therewith I. at least one set of input data representing an industrial process or at least one set of industrial process control parameters, and II. at least one set of output data, predictive of the industrial process output of said process juncture for a given setting;

and

B. tied to the first computer readable program code, an output unit for using said at least one set of input data and at least one set of output data, according to a predetermined prediction model, to apply settings to said industrial process to produce a desired output.

55. The article of manufacture according to claim 54 having computer readable program code embodied therein for causing a computer to arrange the respective corresponding data record clusters into a look-up table, for the interconnection cell.

56. The article of manufacture according to claim 54 including a computer usable medium having computer readable program code embodied therein for performing strategic process control at a predetermined process juncture, the computer readable program code in said article of manufacture including: tied to the third computer readable program code, fourth computer readable program code for causing a computer to process data from the plurality of respective formed set combinations into respective corresponding data record clusters, for the interconnection cell.

57. A computer comprising a program storage device readable by the computer, tangibly embodying a program of instructions executable by the computer to perform method steps for performing an industrial process control on a manufacturing process, said method steps including:

A. for a predetermined process juncture, defining an interconnection cell associated with said juncture, having associated therewith I. at least one set of input data representing an industrial process or at least one set of industrial process control parameters, and II. at least one set of output data, predictive of the process output for a given setting;

B. for the predetermined process juncture, for the interconnection cell, processing data from said at least one set of input data and from at least one set of output data, according to a predetermined prediction model, into respective corresponding data record clusters;

C. for the predetermined process juncture, predicting the process output associated with said juncture, according to said data clusters, therewith to define settings for said process to produce a desired output therefrom, and D applying said defined settings to said process.

58. The program storage device according to claim 57 including therein a method step whereby respective corresponding data record clusters are arranged into a look-up table.

59. A computer system for performing control of predetermined adaptive process at a predetermined process juncture including:

A. apparatus for delineating an interconnection cell, said interconnection cell being associated with said juncture and having associated therewith I. at least one set of input data representing an industrial process or at least one set of industrial process control parameters, and II. at least one set of output data, usable for predicting the industrial process output for a given setting;

B. a processor for processing data from said at least one set of input data and from said at least one set of output data, according to a predetermined prediction model, into respective corresponding data record clusters, predictive of the industrial process output, and C. An output unit for using said data clusters to provide settings to said industrial process, said settings being physically applied to said industrial process to achieve a desired output, said settings being selected from said record clusters as those settings corresponding to said desired output.

60. The system according to claim 59 wherein the processor includes attached thereto an applier for applying at least one of the respective corresponding data record clusters.

61. The system according to claim 59 wherein the computer includes attached therewith at least one sensor for providing an input or output datum to the respective set of input or output data.

62. The system according to claim 59 wherein the computer includes attached therewith at least one actuator for providing a process control parameter setting from the respective set of process control parameters, and the provided process control parameter setting is assigned according to a predetermined discrete respective set combination.

63. The system according to claim 59 wherein the processor includes attached therewith at least one actuator for providing a process control parameter setting from the respective set of process control parameters, and the provided process control parameter setting is assigned according to a predetermined discrete respective set combination.

64. An article of manufacture including a computer usable medium having computer readable program code embodied therein for performing a predetermined multi-stage adaptive process control at a predetermined process juncture, the computer readable program code in said article of manufacture including:

A. first computer readable program code for causing a computer to define a map referenced interconnection cell for association with at least one stage in said multi-stage adaptive process, said interconnection cell having therein a mapped plurality of graph-directed expertise-suggested interconnection cell relationships with neighboring cells associated with neighboring stages, and further having associated therewith I. at least one set of input data representing an industrial process or at least one set of industrial process control parameters, and II. at least one set of output data, usable for predicting the process output for a given setting for at least one of said manufacturing stages;

B. tied to the first computer readable program code, second computer readable program code for causing a computer to use the map referenced interconnection cell to designate at least one process control recipe for the industrial process, therewith to physically apply settings to said industrial process defined in said recipe, thereby to provide adaptive control to said process.

65. A computer comprising a program storage device readable by the computer, tangibly embodying a program of instructions executable by the computer to perform method steps for performing industrial process control of a manufacturing process, said method steps including:

A. for a predetermined process juncture of said manufacturing process, using a mapped plurality of graph-directed expertise-suggested interconnection cell relationships, defining a map referenced interconnection cell therein having associated therewith I. at least one set of input data representing said manufacturing process or at least one set of manufacturing process control parameters, and II. at least one set of output data, usable for predicting the process output associated with said juncture or said manufacturing process for a given setting; and B. for the predetermined process juncture, using the map referenced interconnection cell, designating at least one process control recipe for the industrial process, and physically applying settings to said industrial process in accordance with said recipe.

66. A method for automatic adaptive control of a predetermined multi-stage manufacturing process said manufacturing process being defined by process junctures, the method comprising processing at a predetermined process juncture, the processing comprising:

A. defining an interconnection cell at said juncture having associated therewith:

I. at least one set of input data, representing said manufacturing process and

II. at least one set of output data, usable for predicting the process output at said juncture for a given setting;

B. defining a model to describe a correlation between said at least one set of input data and said at least one set of output data;

C. using said model to obtain an input set combination to provide a predetermined output value for the manufacturing process, and D. physically applying said input combination as settings for said manufacturing process in order to achieve said predetermined output value.

67. The method of claim 66, wherein said at least one set of input data is selected from the group consisting of at least one controllable input and at least one measurable input.

68. The method of claim 67, wherein said model comprises a function.

69. The method of claim 68, wherein said function is derived using at least one item selected from the group consisting of expert suggested advice, data derived functions and Design of Experiment.

70. The method of claim 69, wherein said model obtains said input set combination using at least one item selected from the group consisting of a neural network, Process Output Empirical Modeler and a numerical solver.

71. The method of claim 70, wherein said input set combination is comprised of at least one item selected from the group consisting of said at least one controllable input and said at least one measurable input, wherein said model controls said at least one controllable input.

72. The method of claim 67, further comprising the further step of using said model to predict an output value within constraints of said at least one set of input data.

73. The method of claim 67, wherein said model comprises an algorithm.

* * * * *